(12) United States Patent
Mitsuhashi

(10) Patent No.: US 8,521,910 B2
(45) Date of Patent: Aug. 27, 2013

(54) DATA COLLECTION SYSTEM, DATA COLLECTION METHOD AND DATA COLLECTION PROGRAM TO REDUCE THE COMMUNICATION TIME

(75) Inventor: Akitake Mitsuhashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/446,113

(22) Filed: Apr. 13, 2012

(65) Prior Publication Data

US 2012/0265739 A1 Oct. 18, 2012

Related U.S. Application Data

(62) Division of application No. 12/528,587, filed on Aug. 25, 2009, now Pat. No. 8,214,530.

(30) Foreign Application Priority Data

Feb. 27, 2007 (JP) .................................. 2007-047118

(51) Int. Cl.
*G06F 15/16* (2006.01)

(52) U.S. Cl.
USPC ............ 709/247; 709/240; 709/242; 709/246

(58) Field of Classification Search
USPC .................................. 709/247, 246, 240, 242
See application file for complete search history.

(56) References Cited

U.S. PATENT DOCUMENTS

| 6,385,656 | B1 * | 5/2002 | Appelman | 709/247 |
|---|---|---|---|---|
| 7,301,945 | B1 * | 11/2007 | Ooms et al. | 370/390 |
| 7,420,992 | B1 * | 9/2008 | Fang et al. | 370/477 |
| 2002/0058501 | A1 * | 5/2002 | Hannu et al. | 455/422 |
| 2006/0034191 | A1 * | 2/2006 | Sahinoglu et al. | 370/254 |

* cited by examiner

Primary Examiner — Nicholas Taylor

(57) ABSTRACT

It is an object to provide a data collection system that is configured to reduce a communication amount, etc. at the time when data are collected from devices, so as to reduce a communication amount attended by the collection of data without increasing processing loads imposed on devices. The data collecting device comprises a code operating means for deriving a frequency of the symbol for each symbol corresponding to the code being contained in the already compressed data based upon the data analysis result being contained in the received already compressed data, and a code operation developing means for adding the frequency of the description format, out of the frequencies obtained by the code operating means, to the frequency of the basic symbol corresponding to the above description format, and adding the frequency of the derivative symbol to the frequency of each basic symbol constituting the derivative symbol.

4 Claims, 30 Drawing Sheets

FIG. 19

ONE EXAMPLE OF ALREADY SORTED FREQUENCY LIST

| RANK | SYMBOL | FREQUENCY |
|---|---|---|
| 1 | 1111 | 400 |
| 2 | 1001 | 400 |
| 3 | 0110 | 100 |
| 4 | 00001111 | 50 |
| 5 | 0000 | 50 |

FIG. 20

ONE EXAMPLE OF ALREADY SORTED DATA RELAYING DEVICE LIST

| RANK | DATA RELAYING DEVICE IDENTIFICATION INFORMATION | COMMUNICATION SPEED +PROCESSING SPEED (Mbps) | TOTAL NUMBER OF TRANSFER-TARGET SYMBOLS |
|---|---|---|---|
| 1 | 2,1 | 210 | 0 |
| 2 | 2,3 | 168 | 0 |
| 3 | 2,2 | 42 | 0 |

FIG. 21

ONE EXAMPLE OF FIRST-ORDER
DIFFERENTIAL VALUE LIST

| RANK | FIRST-ORDER DIFFERENTIAL VALUE |
|---|---|
| 1 | 0 |
| 2 | -300 |
| 3 | -50 |
| 4 | 0 |

FIG. 22

ONE EXAMPLE OF SECOND-ORDER
DIFFERENTIAL VALUE LIST

| RANK | SECOND-ORDER DIFFERENTIAL VALUE |
|---|---|
| 1 | -300 |
| 2 | 250 |
| 3 | 50 |

FIG. 23

ONE EXAMPLE OF INFLECTION POINT LIST

| RANK | INFLECTION POINT |
|---|---|
| 1 | 2 |

FIG. 24

DATA

DICTIONARY DATA

| NUMBER | SYMBOL |
|---|---|
| 1 | 0000 |
| 2 | 1111 |
| 3 | 0110 |
| 4 | 1001 |
| 5 | 00001111 |

FIG. 26

(a) CODE DATA

01101010...

(b) DATA ANALYSIS RESULT

| SYMBOL | FREQUENCY |
|---|---|
| 0000 | 26 |
| 1111 | 145 |
| 00001111 | 29 |

(c) DATA CONVERSION INFORMATION

| SYMBOL | CODE |
|---|---|
| 0000 | 00 |
| 1111 | 1 |
| 00001111 | 01 |

DATA CONVERSION INFORMATION A1

| SYMBOL | CODE |
|---|---|
| 0000 | 0110 |
| 1111 | 1 |
| 00001111 | 0111 |
| 0110 | 010 |
| 1001 | 00 |

DATA ANALYSIS RESULT A1

| SYMBOL | FREQUENCY |
|---|---|
| 0000 | 5 |
| 1111 | 40 |
| 00001111 | 5 |
| 0110 | 10 |
| 1001 | 40 |

(b)

DATA CONVERSION INFORMATION A2

| SYMBOL | CODE |
|---|---|
| 0000 | 1010 |
| 1111 | 11 |
| 00001111 | 1011 |
| 0110 | 100 |
| 1001 | 0 |

DATA ANALYSIS RESULT A2

| SYMBOL | FREQUENCY |
|---|---|
| 0000 | 21 |
| 1111 | 105 |
| 00001111 | 24 |
| 0110 | 30 |
| 1001 | 120 |

FIG. 28

TRANSFER DESTINATION INFORMATION
(HIERARCHY NUMBER 1)

(a)

| SYMBOL AGGREGATION | DATA RELAYING DEVICE DESTINATION INFORMATION |
|---|---|
| 0000, 1111, 00001111 | 192.168.0.1:5060 |
| 0110 | 192.168.0.1:5060 |
| 1001 | 192.168.0.1:5060 |

TRANSFER DESTINATION INFORMATION
(HIERARCHY NUMBER 2)

(b)

| SYMBOL AGGREGATION | DATA RELAYING DEVICE DESTINATION INFORMATION |
|---|---|
| 0000, 1111, 00001111 | 192.168.1.1:5060 |
| 0110 | 192.168.1.2:5060 |
| 1001 | 192.168.1.2:5060 |

TRANSFER DESTINATION INFORMATION
(HIERARCHY NUMBER 3)

(c)

| SYMBOL AGGREGATION | DATA RELAYING DEVICE DESTINATION INFORMATION |
|---|---|
| 0000, 1111, 00001111 | 192.168.2.1:5060 |
| 0110 | 192.168.2.2:5060 |
| 1001 | 192.168.2.3:5060 |

FIG. 31

DATA ANALYSIS RESULT B3

| SYMBOL | FREQUENCY |
|---|---|
| 0110 | 40 |

DATA CONVERSION INFORMATION B3

| SYMBOL | CODE |
|---|---|
| 0110 | 0 |

DATA ANALYSIS RESULT C3

| SYMBOL | FREQUENCY |
|---|---|
| 1001 | 160 |

DATA CONVERSION INFORMATION C3

| SYMBOL | CODE |
|---|---|
| 1001 | 1 |

FIG. 32

(a) DATA ANALYSIS RESULT A4

| SYMBOL | FREQUENCY |
|---|---|
| 0000 | 200 |
| 1111 | 700 |
| 00001111 | 100 |

(b) DATA ANALYSIS RESULT B4

| SYMBOL | FREQUENCY |
|---|---|
| 0110 | 300 |

(c) DATA ANALYSIS RESULT C4

| SYMBOL | FREQUENCY |
|---|---|
| 1001 | 200 |

FIG. 33

BASIC SYMBOL DESCRIPTION INFORMATION

| SYMBOL | DESCRIPTION FORMAT |
|---|---|
| 0110 | 1001 |

FIG. 34

DERIVATIVE SYMBOL CONFIGURATION INFORMATION

| SYMBOL | DESCRIPTION FORMAT |
|---|---|
| 00001111 | 0000,1111 |

FREQUENCY TABLE 1 OF SYMBOL (a)

| SYMBOL | NUMBER OF PIECES |
|---|---|
| 0000 | 200 |
| 1111 | 700 |
| 00001111 | 100 |
| 0110 | 300 |
| 1001 | 200 |

FREQUENCY TABLE 2 OF SYMBOL (b)

| SYMBOL | NUMBER OF PIECES |
|---|---|
| 0000 | 200 |
| 1111 | 700 |
| 00001111 | 100 |
| 0110 | 500 |

FREQUENCY TABLE 3 OF SYMBOL (c)

| SYMBOL | NUMBER OF PIECES |
|---|---|
| 0000 | 300 |
| 1111 | 800 |
| 0110 | 500 |

FIG. 37

EXECUTION HISTORY INFORMATION

| HIERARCHY NUMBER | DATA RELAYING DEVICE IDENTIFICATION INFORMATION | COMMUNICATION SPEED | RECOMPRESSING PROCESS TIME | SIZE OF ALREADY COMPRESSED DATA | DATA ANALYSIS RESULT |
|---|---|---|---|---|---|
| 3 | 3, 1 | 50 Mbps | 50 ms | 8,000 Kbit | |

| SYMBOL | FREQUENCY |
|---|---|
| 0000 | 6 |
| 1111 | 48 |
| 00001111 | 6 |
| 0110 | 12 |
| 1001 | 48 |

FREQUENCY TABLE 4 OF SYMBOL

| SYMBOL | FREQUENCY |
|---|---|
| 0000 | 6 |
| 1111 | 48 |
| 00001111 | 6 |
| 0110 | 12 |
| 1001 | 48 |

FIG. 39

| HIERARCHY NUMBER | DATA RELAYING DEVICE IDENTIFICATION INFORMATION | COMMUNICATION SPEED (Mbps) | PROCESSING SPEED (Mbps) |
|---|---|---|---|
| 2 | 2,1 | 50 | 160 |
| 2 | 2,2 | 10 | 32 |
| 2 | 2,3 | 40 | 128 |
| 1 | 1,1 | 100 | 100 |
| ... | ... | ... | ... |

FIG. 40

FREQUENCY TABLE OF SYMBOL

| SYMBOL | FREQUENCY |
|---|---|
| 0000 | 50 |
| 1111 | 400 |
| 00001111 | 50 |
| 0110 | 100 |
| 1001 | 400 |

FIG. 41

SYMBOL CLUSTER INFORMATION

| HIERARCHY NUMBER | SYMBOL AGGREGATION | DAT RELAYING DEVICE IDENTIFICATION INFORMATION |
|---|---|---|
| 3 | 0000,1111, 00001111 | 2,1 |
| 3 | 0110 | 2,2 |
| 3 | 1001 | 2,3 |
| 2 | 0000,1111, 00001111 | 1,1 |
| 2 | 0110 | 1,2 |
| ... | ... | ... |

FIG. 42

DATA RELAYING DEVICE INFORMATION

| HIERARCHY NUMBER | DATA RELAYING DEVICE IDENTIFICATION INFORMATION | DESTINATION INFORMATION |
|---|---|---|
| 0 | 0,0 | 192.168.0.1:5060 |
| 1 | 1,1 | 192.168.1.1:5060 |
| 1 | 1,2 | 192.168.1.2:5060 |
| 2 | 2,1 | 192.168.2.1:5060 |
| 2 | 2,2 | 192.168.2.2:5060 |
| 2 | 2,3 | 192.168.2.3:5060 |
| 3 | 3,1 | 192.168.3.1:5060 |
| 3 | 3,2 | 192.168.3.2:5060 |
| 3 | 3,3 | 192.168.3.3:5060 |
| 3 | 3,4 | 192.168.3.4:5060 |
| 3 | 3,5 | 192.168.3.5:5060 |

DATA COLLECTION SYSTEM, DATA COLLECTION METHOD AND DATA COLLECTION PROGRAM TO REDUCE THE COMMUNICATION TIME

REFERENCE TO RELATED APPLICATION

This is a divisional application of U.S. patent application Ser. No. 12/528,587, filed Aug. 25, 2009, issued as U.S. Pat. No. 8,214,530 on Jul. 3, 2012, and claims the benefit of its priority.

APPLICABLE FIELD IN THE INDUSTRY

The present invention relates to a data collection system for collecting data via a communication network and a data collection method as well as a data relaying device, a transfer destination information updating device, a data collecting device, a data relaying program, a transfer destination information update program, and a data collection program each of which is applied for the data collection system, and more particularly to a data collection system for classifying communication data by employing a statistical special feature of the data in some cases, recompressing the data by employing an analysis result of the data in a compressing process in some cases, and further, operating the compressed data by employing the analysis result of the data in the compressing process in some cases, and a data collection method as well as a data relaying device, a transfer destination information updating device, a data collecting device, a data relay program, a transfer destination information update program, and a data collection program each of which is applied for the data collection system.

BACKGROUND ART

As an example of a system for collecting data via a communication network, the data collection system for collecting the data from a plurality of RFID (Radio Frequency Identification) readers can be listed. Further, there exists the system for collecting information of probe cars in GPS (Global Positioning System) or ITS (Intelligent Transport System), the system for collecting operational information on communication appliances and facilities of a power system via a communication network from a plurality of devices, or the like. Additionally, the probe car is a vehicle capable of acquiring and transmitting position information and speed information. The communication data compression technique that is employed in such a data collection system is a technique of compressing data communication path by communication path.

In Patent document 1, the data transfer method of compressing communication data and transferring it to a server has been disclosed. In the data transfer method disclosed in the Patent document 1, a client compresses data, and in addition, divides it for each specified size. The client transmits divided files one file by one file to the server, and the server couples and defrosts a plurality of pieces of the received data.

Further, in Patent document 2, the equipment control system provided with an equipment controlling means for receiving equipment registration via a home network communicating means has been disclosed. Further, in Patent document 3, the data transfer method has been disclosed of deciding a transfer destination of data responding to a genre code when having received data including the genre code.

Patent document 1: JP-P2005-011119A (paragraphs 0019 to 0028)

Patent document 2: JP-P2005-310022A (paragraph 0015)
Patent document 3: JP-P2006-228201A (paragraph 0018)

DISCLOSURE OF THE INVENTION

Problems to be Solved by the Invention

Conventionally, collecting data from a plurality of appliances has led to a decline in a compression ratio of the data because the data is compressed communication path by communication path, and as a result, a communication time required for data collection has been lengthened.

Further, the compressed data is recompressed in some cases in order to curtail a communication amount attended by the collection at the moment of collecting data from a plurality of appliances. At this time, only recompressing a plurality of pieces of the compressed data together in a simplified manner does not yield the sufficient compression. For this, as a rule, after expanding the compressed data and coupling a plurality of pieces of the expanded data into one piece of the data, the above data is compressed, thereby allowing the data to be recompressed. However, the process of, after expanding each compressed data to the original data, and coupling the above data, compressing it once again causes the processing load to be increased. That is, there is a problem that recompressing the data for a purpose of curtailing the communication amount causes the processing load to be increased.

Further, the data collecting device for collecting the data from a plurality of devices, as a rule, operates the collected data. At this time, the load imposed upon the data collecting device is raised because it expands the collected compressed data to the original data, and operates the after-expansion data.

Thereupon, the present invention has an object of reducing the communication amount at the moment of collecting the data from a plurality of the appliances. Further, the present invention has an object of making a speed of the recompressing process at the moment of furthermore recompressing the compressed data being collected fast. Further, the present invention has an object of enhancing a speed of the collecting process of the data and a speed of the operating process of the collected data.

Means to Solve the Problem

The data collection system of the present invention, which includes a plurality of data compressing devices for compressing data, a plurality of data relaying devices for relaying the data, and a data collecting device for collecting the data, is characterized in that: the data relaying device includes: a data analysis result synthesizing means for deriving a new data analysis result from a data analysis result being contained in the received already compressed data; a data conversion information preparing means for generating new data conversion information indicative of a correspondence relation between a symbol and a new code responding to the foregoing new data analysis result; and a data converting means for converting the codes being contained in the already compressed data into the new codes being contained in the foregoing new data conversion information so as to recompress the data, and generating the already compressed data containing the foregoing new code, the new data conversion information, and the after-recompression code; and the data relaying devices are arranged hierarchy by hierarchy responding to the number of hops or a round trip time up to the data collecting device so that the smaller the number of the hops or the round trip time of the data relaying device up to the data collecting device is, the higher the hierarchy of the data relaying device becomes.

Further, the data collection system of the present invention, which includes a plurality of data compressing devices for compressing data, a plurality of data relaying devices for relaying the data, and a data collecting device for collecting the data, is characterized in that: the data relaying devices are arranged hierarchy by hierarchy responding to the number of hops or a round trip time up to the data collecting device so that the smaller the number of the hops or the round trip time of the data relaying device up to the data collecting device is, the higher the hierarchy of the data relaying device becomes; the data compressing device includes: a data compressing means for deriving the data analysis result, being an analysis result of a statistical special feature of the data that is a target of compression, converting the symbol, being a before-compression bit string, into the code, being an after-compression bit string, responding to the analysis result so as to compress the data, and generating the already compressed data containing the data conversion information indicative of a correspondence between the symbol and the code, the code, and the data analysis result; and a communicating means (for example, a communicating means 31) for transmitting the already compressed data to the data relaying devices of a lowest-place hierarchy; the data relaying device includes: a data analysis result synthesizing means for deriving a new data analysis result from the data analysis result being contained in each of pieces of the received already compressed data; a data conversion information preparing means for generating new data conversion information indicative of a correspondence relation between the symbol and the new code responding to the foregoing new data analysis result; and a data converting means for converting the codes being contained in the already compressed data into the new codes being contained in the foregoing new data conversion information so as to recompress the data, and generating the already compressed data containing the foregoing new code, the new data conversion information, the after-recompression code; the data relaying devices of a highest-place hierarchy transmit the already compressed data to the data collecting device; and the data relaying devices except the data relaying devices of the highest-place hierarchy transmit the already compressed data to the data relaying devices that rank higher by one hierarchy.

Further, the data collection system of the present invention for including a plurality of data compressing devices for compressing data, a plurality of data relaying devices for relaying the data, and a data collecting device for collecting the data, in which the data relaying devices are arranged hierarchy by hierarchy responding to the number of hops or a round trip time up to the data collecting device so that the smaller the number of the hops or the round trip time of the data relaying device up to the data collecting device is, the higher the hierarchy of the data relaying device becomes, and each data relaying device receives already compressed data containing the data analysis result, being an analysis result of a statistical special feature of the data that is a target of compression, a code that is decided for a symbol, being a before-compression bit string, responding to the analysis result, and data conversion information indicative of a correspondence between the symbol and the code from the devices that rank lower by one hierarchy, and transmits the new already compressed data to the devices that rank higher by one hierarchy, is characterized in that the data relaying device includes; a transfer destination information recording means for storing transfer destination information in which a symbol aggregation decided for each device that ranks higher by one hierarchy, being a transfer destination of the already compressed data, and destination information of the foregoing device that ranks higher by one hierarchy have been caused to correspond to each other; a symbol classifying means for classifying the already compressed data received from the devices that rank lower by one hierarchy based upon the symbol aggregation being contained in the transfer destination information; a data analysis result synthesizing means for deriving a new data analysis result symbol aggregation by symbol aggregation from the data analysis result being contained in each of pieces of the received already compressed data; a data conversion information preparing means for generating new data conversion information indicative of a correspondence relation between the symbol and the new code symbol aggregation by symbol aggregation responding to the foregoing new data analysis result; and a data converting means for converting the codes being contained in the already compressed data into the new codes being contained in the foregoing new data conversion information so as to recompress the data, and generating the already compressed data containing the foregoing new code, the new data conversion information, and the after-recompression code.

The data collection system of the present invention may be configured so that: it includes a transfer destination information updating device for updating the transfer destination information of the data relaying devices of each hierarchy; and the transfer destination information updating device includes: a data relaying device information recording means for storing data relaying device information in which identification information of the data relaying device and the destination information have been caused to correspond to each other for each data relaying device; a receiving means (for example, a communicating means 51) for receiving the identification information of the data relaying device, a communication speed at the moment that the data relaying device transmits the already compressed data to the devices that rank higher by one hierarchy, a processing speed at the time of recompression, and a frequency table, being information indicative of a frequency of each symbol corresponding to the code being contained in the already compressed data from the data relaying devices of each hierarchy; a symbol distribution generating means for synthesizing the frequency tables received from each data relaying device of the identical hierarchy into one frequency table; a symbol cluster information generating means (for example, a symbol aggregation clustering means 54) for generating symbol cluster information in which a hierarchy number indicative of the hierarchy, the symbol aggregation, and the data relaying device identification information have been caused to correspond to each other based upon the frequency table synthesized by the symbol distribution generating means, the identification information of the data relaying device, the communication speed and the processing speed; and a transfer destination information generating means for generating transfer destination information of each hierarch from the symbol cluster information and the data relaying device information.

Further, the data collection system of the present invention including a plurality of data compressing devices for compressing data, a plurality of data relaying devices for relaying the data, and a data collecting device for collecting the data, in which the data relaying devices are arranged hierarchy by hierarchy responding to the number of hops or a round trip time up to the data collecting device so that the smaller the number of the hops or the round trip time of the data relaying device up to the data collecting device is, the higher the hierarchy of the data relaying device becomes, and the data collecting device receives the already compressed data containing a data analysis result, being an analysis result of a statistical special feature of the data that is a target of compression, a code that is decided for a symbol, being a before-compression bit string, responding to the analysis result, and data conversion information indicative of a correspondence between the symbol and the code from each relaying device of a highest-place hierarchy, is characterized in that the data collecting device includes; a basic symbol description format recording means for storing symbol description information in which a basic symbol, being a symbol divided into a minimum unit, and a description format in which the basic symbol has been expressed with other formats have been caused to correspond to each other; a derivative symbol format recording means for storing information in which a derivative symbol, being a symbol in which the basic symbols have been combined, and an aggregation of the basic symbols constituting the derivative symbol have been caused to correspond to each other; a code operating means for deriving a frequency of the symbol for each symbol that corresponds to the code being contained in the already compressed data based upon the data analysis result being contained in each of pieces of the received already compressed data; and a code operation developing means for adding the frequency of the description format, out of the frequencies obtained by the code operating means, to the frequency of the basic symbol that corresponds to the above description format, and adding the frequency of the derivative symbol to the frequency of each basic symbol constituting the derivative symbol.

Further, the data collection method of the present invention, which is applied for a data collection system including: a plurality of data compressing devices for compressing data; a data collecting device for collecting the data: and data relaying devices that are arranged hierarchy by hierarchy responding to the number of hops or a round trip time up to the data collecting device so that the smaller the number of the hops or the round trip time of the data relaying device up to the data collecting device is, the higher the hierarchy of the data relaying device becomes, is characterized in that: the data relaying device derives a new data analysis result from a data analysis result being contained in each of pieces of the received already compressed data; the data relaying device generates new data conversion information indicative of a correspondence relation between a symbol and a new code responding to the foregoing new data analysis result; the data relaying device converts the codes being contained in the already compressed data into the new codes being contained in the foregoing new data conversion information so as recompress the data, and generates the already compressed data containing the foregoing new code, the new data conversion information, and the after-recompression code; and the data relaying devices transmits the already compressed data to the devices that rank higher by one hierarchy.

Further, the data collection method of the present invention, which is applied for a data collection system including: a plurality of data compressing devices for compressing data; a data collecting device for collecting the data; and data relaying devices that are arranged hierarchy by hierarchy responding to the number of hops or a round trip time up to the data collecting device so that the smaller the number of the hops or the round trip time of the data relaying device up to the data collecting device is, the higher the hierarchy of the data relaying device becomes, is characterized in that: the data compressing device derives the data analysis result, being an analysis result of a statistical special feature of the data that is a target of compression, converts the symbol, being a before-compression bit string, into the code, being an after-compression bit string, responding to the analysis result so as to compress the data, and generates the already compressed data containing the data conversion information indicative of a correspondence between the symbol and the code, the code, and the data analysis result; the data compressing device transmits the already compressed data to the data relaying devices of a lowest-place hierarchy; the data relaying device derives a new data analysis result from the data analysis result being contained in each of pieces of the received already compressed data; the data relaying device generates new data conversion information indicative of a correspondence relation between the symbol and the new code responding to the foregoing new data analysis result; the data relaying device converts the codes being contained in the already compressed data into the new codes being contained in the foregoing new data conversion information so as to recompress the data, and generating the already compressed data containing the foregoing new code, the new data conversion information, the after-recompression code; the data relaying devices of the highest-place hierarchy transmit the already compressed data to the data collecting device; and the data relaying devices except the data relaying devices of the highest-place hierarchy transmit the already compressed data to the data relaying devices that rank higher by one hierarchy.

Further, the data collection method of the present invention, which is applied for a data collection system including: a plurality of data compressing devices for compressing data; a data collecting device for collecting the data; and data relaying devices that are arranged hierarchy by hierarchy responding to the number of hops or a round trip time up to the data collecting device so that the smaller the number of the hops or the round trip time of the data relaying device up to the data collecting device is, the higher the hierarchy of the data relaying device becomes, is characterized in that: the data relaying device pre-stores transfer destination information in which a symbol aggregation decided for each device that ranks higher by one hierarchy, being a transfer destination of the already compressed data, and destination information of the foregoing device that ranks higher by one hierarchy have been caused to correspond to each other; the data relaying device receives the already compressed data containing the data analysis result, being an analysis result of a statistical special feature of the data that is a target of compression, the code that is decided for the symbol, being a before-compression bit string, responding to the analysis result, and data conversion information indicative of a correspondence between the symbol and the code from the devices that rank lower by one hierarchy; the data relaying device classifies the already compressed data received from the devices that rank lower by one hierarchy, based upon the symbol aggregation being contained in the transfer destination information; the data relaying device derives a new data analysis result symbol aggregation by symbol aggregation from the data analysis result being contained in each of pieces of the received already compressed data; the data relaying device generates new data conversion information indicative of a correspondence relation between the symbol and the new code symbol aggregation by symbol aggregation responding to the foregoing new data analysis result; the data relaying device converts the codes being contained in the already compressed data into the new codes being contained in the foregoing new data conversion information so as to recompress the data, and generates the already compressed data containing the foregoing new code, the new data conversion information, and the after-recompression code; and the data relaying device transmits the already compressed data to the devices that rank higher by one hierarchy.

Further, the data collection method of the present invention, which is applied for a data collection system including: a plurality of data compressing devices for compressing data; a data collecting device for collecting the data, which receives already compressed data containing a data analysis result, being an analysis result of a statistical special feature of the data that is a target of compression, a code that is decided for a symbol, being a before-compression bit string, responding to the analysis result, and data conversion information indicative of a correspondence between the symbol and the code from each relaying device of a highest-place hierarchy; and data relaying devices, which are arranged hierarchy by hierarchy responding to the number of hops or a round trip time up to the data collecting device so that the smaller the number of the hops or the round trip time of the data relaying device up to the data collecting device is, the higher the hierarchy of the data relaying device becomes, is characterized in that: the data collecting device stores symbol description information in which a basic symbol, being a symbol divided into a minimum unit, and a description format in which the basic symbol has been expressed with other formats have been caused to correspond to each other; the data collecting device stores information in which a derivative symbol, being a symbol in which the basic symbols have been combined, and an aggregation of the basic symbols constituting the derivative symbol have been caused to correspond to each other; the data collecting device derives a frequency of the symbol for each symbol that corresponds to the code being contained in the already compressed data, based upon the data analysis result being contained in the received already compressed data; and the data collecting device adds the frequency of the description format, out of the frequencies, to the frequency of the basic symbol that corresponds to the above description format, and adds the frequency of the derivative symbol to the frequency of each basic symbol constituting the derivative symbol.

Further, the data relaying device of the present invention for receiving already compressed data containing a data analysis result, being an analysis result of a statistical special feature of the data that is a target of compression, a code that is decided for a symbol, being a before-compression bit string, responding to the analysis result, and data conversion information indicative of a correspondence between the symbol and the code, which is applied for a data collection system including: a plurality of data compressing devices for compressing data; a data collecting device for collecting the data; and data relaying devices that are arranged hierarchy by hierarchy responding to the number of hops or a round trip time up to the data collecting device so that the smaller the number of the hops or the round trip time of the data relaying device up to the data collecting device is, the higher the hierarchy of the data relaying device becomes, is characterized in including: a data analysis result synthesizing means for deriving a new data analysis result from the data analysis result being contained in each of pieces of the received already compressed data; a data conversion information preparing means for generating new data conversion information indicative of a correspondence relation between the symbol and the new code responding to the foregoing new data analysis result; and a data converting means for converting the codes being contained in the already compressed data into the new codes being contained in the foregoing new data conversion information so as to recompress the data, and generating the already compressed data containing the foregoing new code, the new data conversion information, and the after-recompression code.

Further, the transfer destination information updating device of the present invention for updating transfer destination information in which a symbol aggregation decided for each device that ranks higher by one hierarchy, being a transfer destination of already compressed data, and destination information of the foregoing device ranking higher by one hierarchy have been caused to correspond to each other, which is stored by data relaying devices being arranged hierarchy by hierarchy responding to the number of hops or a round trip time up to a data collecting device so that the smaller the number of the hops or the round trip time of the data relaying device up to a predetermined device is, the higher the hierarchy of the data relaying device becomes, is characterized in including: a data relaying device information recording means for storing data relaying device information in which identification information of the data relaying device and the destination information have been caused to correspond to each other for each data relaying device; a receiving means (for example, a communicating means 51) for receiving the identification information of the data relaying device, a communication speed at the moment that the data relaying device transmits the already compressed data to the devices that rank higher by one hierarchy, a processing speed at the time of recompression, and a frequency table, being information indicative of a frequency of each symbol corresponding to the code being contained in the already compressed data from the data relaying devices of each hierarchy; a symbol distribution generating means for synthesizing the frequency tables received from each data relaying device of the identical hierarchy into one frequency table; a symbol cluster information generating means (for example, a symbol aggregation clustering means 54) for generating symbol cluster information in which a hierarchy number indicative of the hierarchy, the symbol aggregation, and the data relaying device identification information have been caused to correspond to each other based upon the frequency table synthesized by the symbol distribution generating means, the identification information of the data relaying device, the communication speed and the processing speed; and a transfer destination information generating means for generating the transfer destination information of each hierarch from the symbol cluster information and the data relaying device information.

Further, the data collecting device of the present invention, which collects already compressed data containing a data analysis result, being an analysis result of a statistical special feature of data that is a target of compression, a code that is decided for a symbol, being a before-compression bit string, responding to the analysis result, and data conversion information indicative of a correspondence between the symbol and the code, is characterized in including: a basic symbol description format recording means for storing symbol description information in which a basic symbol, being a symbol divided into a minimum unit, and a description format in which the basic symbol has been expressed with other formats have been caused to correspond to each other; a derivative symbol format recording means for storing information in which a derivative symbol, being a symbol in which the basic symbols have been combined, and an aggregation of the basic symbols constituting the derivative symbol have been caused to correspond to each other; a code operating means for deriving a frequency of the symbol for each symbol that corresponds to the code being contained in the already compressed data based upon the data analysis result being contained in the received already compressed data; and a code operation developing means for adding the frequency of the description format, out of the frequencies obtained by the code operating means, to the frequency of the basic symbol corresponding to the above description format, and adding the frequency of the derivative symbol to the frequency of each basic symbol constituting the derivative symbol.

Further, the data relay program of the present invention, which is installed into a computer for receiving already compressed data containing a data analysis result, being an analysis result of a statistical special feature of data that is a target of compression, a code that is decided for a symbol, being a before-compression bit string, responding to the analysis result, and data conversion information indicative of a correspondence between the symbol and the code, generating new already compressed data, and relaying it to other devices, is characterized in causing the computer to execute: a data analysis result synthesizing process of deriving a new data analysis result from the data analysis result being contained in each of pieces of the received already compressed data; a data conversion information preparing process of generating new data conversion information indicative of a correspondence relation between the symbol and the new code responding to the foregoing new data analysis result; and a data converting process of converting the codes being contained in the already compressed data into the new codes being contained in the foregoing new data conversion information so as to recompress the data, and generating the already compressed data containing the foregoing new code, the new data conversion information, and the after-recompression code.

Further, the transfer destination information update program of the present invention, which is installed into a computer including a data relaying device information recording means for updating transfer destination information in which a symbol aggregation decided for each device that ranks higher by one hierarchy, being a transfer destination of already compressed data, and destination information of the foregoing device ranking higher by one hierarchy have been caused to correspond to each other, which is stored by data relaying devices being arranged hierarchy by hierarchy responding to the number of hops or a round trip time up to a data collecting device so that the smaller the number of the hops or the round trip time of the data relaying device up to a predetermined device is, the higher the hierarchy of the data relaying device becomes, and storing data relaying device information in which identification information of the data relaying device and the destination information have been caused to correspond to each other for each data relaying device, is characterized in causing the foregoing computer to execute: a receiving process of receiving the identification information of the data relaying device, a communication speed at the moment that the data relaying device transmits the already compressed data to the devices that rank higher by one hierarchy, a processing speed at the time of recompression, and a frequency table, being information indicative of a frequency of each symbol corresponding to the code being contained in the already compressed data from the data relaying devices of each hierarchy; a symbol distribution generating process of synthesizing the frequency tables received from each data relaying device of the identical hierarchy into one frequency table; a symbol cluster information generating process of generating symbol cluster information in which a hierarchy number indicative of the hierarchy, the symbol aggregation, and the data relaying device identification information have been caused to correspond to each other based upon the frequency table synthesized in the symbol distribution generating process, the identification information of the data relaying device, and the communication speed and the processing speed; and a transfer destination information generating process of generating the transfer destination information of each hierarch from the symbol cluster information and the data relaying device information.

Further, the data collection program of the present invention is characterized in causing a computer including: a basic symbol description format recording means for collecting already compressed data containing a data analysis result, being an analysis result of a statistical special feature of data that is a target of compression, a code that is decided for a symbol, being a before-compression bit string, responding to the analysis result, and data conversion information indicative of a correspondence between the symbol and the code, and storing symbol description information in which a basic symbol, being a symbol divided into a minimum unit, and a description format in which the basic symbol has been expressed with other formats have been caused to correspond to each other; and a derivative symbol format recording means for storing information in which a derivative symbol, being a symbol in which the basic symbols have been combined, and an aggregation of the basic symbols constituting the derivative symbol have been caused to correspond to each other to execute: a code operating process of deriving a frequency of the symbol for each symbol corresponding to the code being contained in the already compressed data, based upon the data analysis result being contained in the received already compressed data; and a code operation developing process of adding the frequency of the description format, out of the frequencies obtained in the code operating process, to the frequency of the basic symbol corresponding to the above description format, and adding the frequency of the derivative symbol to the frequency of each basic symbol constituting the derivative symbol.

An Advantageous Effect of the Invention

The present invention makes it possible to curtail the processing load, which is imposed upon the device for performing the compressing process at the moment of compressing the data with the communicating device over a communication path for a purpose of curtailing the communication amount attended by the collection of the data from a plurality of the appliances because the data relaying device includes the data converting means for converting the codes being contained in the already compressed data into the new codes being contained in the new data conversion information so as to recompress the data, and generating the already compressed data containing the new code, the new data conversion information, the after-recompression code.

Further, the present invention makes it possible to shorten the communication time at the moment of collecting the data from a plurality of the appliances because the data relaying device includes: the transfer destination information recording means for storing the transfer destination information in which the symbol aggregation decided for each device that ranks higher by one hierarchy, being a transfer destination of the already compressed data, and the destination information of the device that ranks higher by one hierarchy have been caused to correspond to each other; the symbol classifying means for classifying the already compressed data received from the devices that rank lower by one hierarchy based upon the symbol aggregation being contained in the transfer destination information; the data analysis result synthesizing means for deriving the new data analysis result symbol aggregation by symbol aggregation from the data analysis result being contained in each of pieces of the received already compressed data; the data conversion information preparing means for generating the new data conversion information indicative of a correspondence relation between the symbol and the new code symbol aggregation by symbol aggregation responding to the above new data analysis result; and the data converting means for converting the codes being contained in the already compressed data into the new codes being contained in the above new data conversion information so as to recompress the data, and generating the already compressed data containing the above new code, the new data conversion information, and the after-recompression code.

Further, the present invention makes it possible to suppress an increase in the operation processing load imposed upon the data collecting device because the data collecting device includes the code operating means for deriving a frequency of the symbol for each symbol that corresponds to the code being contained in the already compressed data based upon the data analysis result being contained in the received already compressed data; and the code operation developing means for adding the frequency of the description format, out of the frequencies obtained by the code operating means, to the frequency of the basic symbol that corresponds to the above description format, and adding the frequency of the derivative symbol to the frequency of each basic symbol constituting the derivative symbol.

BRIEF DESCRIPTION OF THE DRAWINGS

FIG. 19 is an explanatory view illustrating an example of an already sorted frequency list.

FIG. 20 is an explanatory view illustrating an example of an already sorted data relaying device list.

FIG. 21 is an explanatory view illustrating an example of a first-order differential value list.

FIG. 22 is an explanatory view illustrating an example of a second-order differential value list.

FIG. 23 is an explanatory view illustrating one example of an inflection point list.

FIG. 24 is an explanatory view illustrating an example of data being generated by each data generating device.

FIG. 25 is an explanatory view illustrating an example of dictionary data.

FIG. 26 is an explanatory view illustrating an example of the data analysis result and the data conversion information.

FIG. 27 is an explanatory view illustrating an example of the data analysis result and the data conversion information generated by a plurality of the data compressing devices.

FIG. 28 is an explanatory view illustrating an example of the transfer destination information.

FIG. 31 is an explanatory view illustrating an example of the recompression.

FIG. 32 is an explanatory view illustrating an example of the data analysis result.

FIG. 33 is an explanatory view illustrating an example of the symbol description information.

FIG. 34 is an explanatory view illustrating an example of the derivative symbol configuration information.

FIG. 37 is an explanatory view illustrating an example of the execution history information.

FIG. 38 is an explanatory view illustrating an example of the frequency table of the symbol.

FIG. 39 is an explanatory view illustrating an example of the communication speed, the processing speed, the hierarchy number, and the data relaying device identification information that the transfer destination information updating device receives.

FIG. 40 is an explanatory view illustrating an example of the frequency table obtained by adding a total of the by-symbol numbers of times of appearances.

FIG. 41 is an explanatory view illustrating an example of the symbol cluster information.

FIG. 42 is an explanatory view illustrating an example of the data relaying device information.

Figure 1:
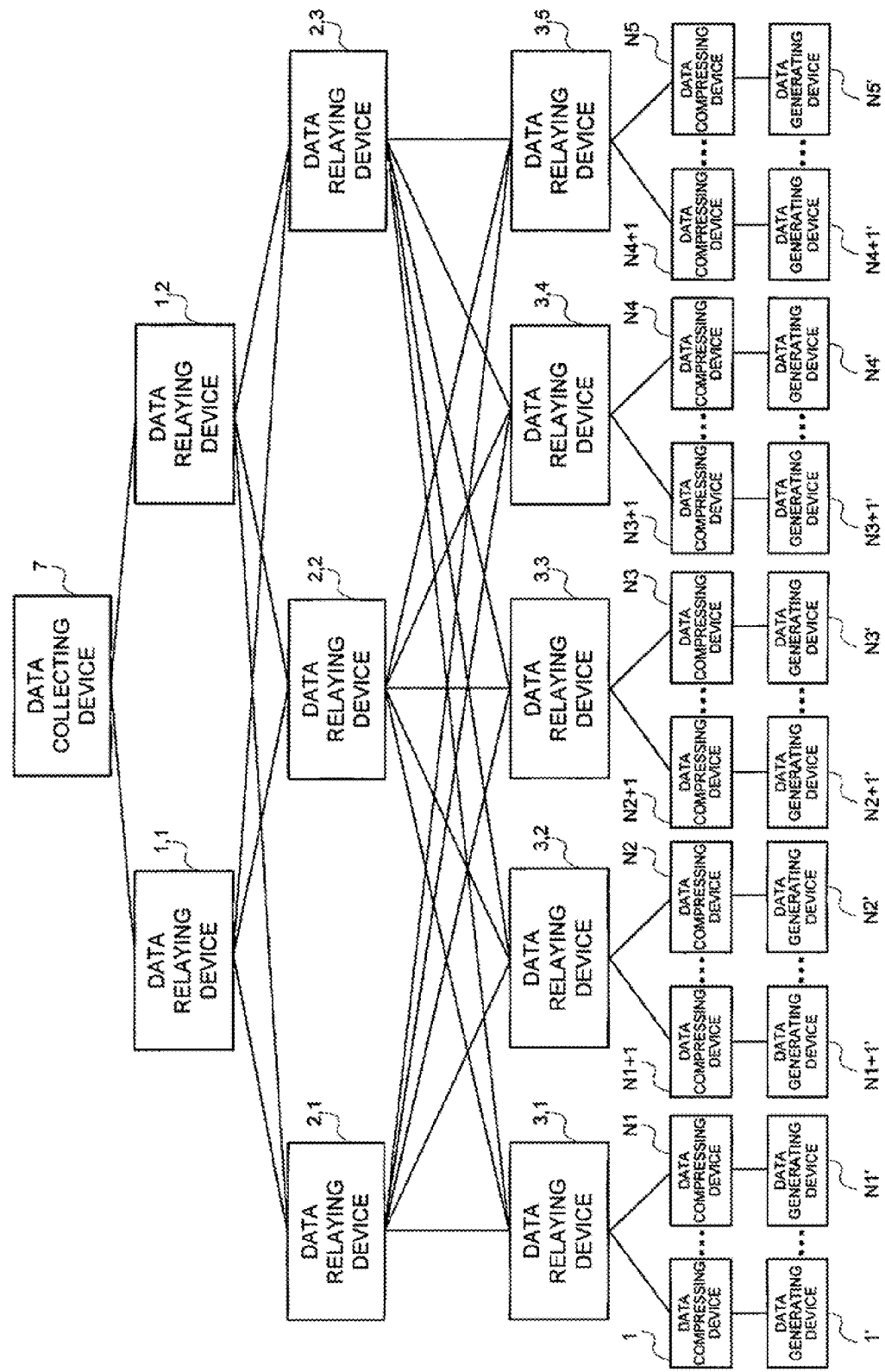
FIG. 1 is an explanatory view illustrating a configuration example of the data collection system of the present invention.

DESCRIPTION OF NUMERALS 1 to N5 data compressing devices
1' to N5' data generating devices
1,1 to 3,5 data relaying devices
5 transfer destination information updating device
7 data collecting device
11 communicating means
12 received data recording means
13 data analysis result acquiring means
14 code operating means
15 basic symbol description format recording means 16 code operation developing means
17 derivative symbol description format recording means
18 operation result recording means
41 communicating means
42 received data recording means
43 symbol classifying means
44 data recompressing means
45 transfer destination information recording means
46 transfer destination deciding means
47 symbol aggregation clustering information acquiring means
51 communicating means
52 distance parameter acquiring means
53 symbol distribution generating means
54 symbol aggregation clustering means
55 transfer destination information generating means
56 data relaying device information recording means

BEST MODE FOR CARRYING OUT THE INVENTION

Hereinafter, an embodiment of the present invention will be explained by making a reference to the accompanied drawings.

FIG. 1 is an explanatory view illustrating a configuration example of the data collection system of the present invention. The data collection system shown in FIG. 1 includes data generating devices 1' to N5' for generating the data, being an arbitrary bit string, data compressing devices 1 to N5 for collecting the data generated by the data generating device for a constant time, and compressing it, a data collecting device 7 for collecting the data, a plurality of data relaying devices (a data relaying devices 1,1 to data relaying devices K,J), and a transfer destination information updating device 5 (not shown in FIG. 1. See FIG. 7). The data relaying device receives the compressed data from the data compressing device or the other data relaying devices, recompresses the compressed data, and transfers the after-recompression data to other relaying devices or the data collecting device 7. The data relaying device stores (records) the transfer destination information for deciding the data relaying device, being a transfer destination of the recompressed data. The transfer destination information updating device 5 updates the transfer destination information stored in each data relaying device.

Each of the data relaying devices (the data relaying devices 1,1 to the data relaying devices K,J) is arranged over a communication network such as Internet constructed between each of the data generating devices 1' to N5' and the data collecting device 7. A hierarchy number is allotted to each of the data relaying devices (the data relaying devices 1,1 to the data relaying devices K,J). In the explanation of this embodiment, "X" in the inscription of "the data relaying device X,Y" signifies the hierarchy number. The number of the communicating devices through which a certain communicating device makes communication with another communicating device is called the number of hops. Further, the time in which a packet makes a round trip between a certain communicating device and another communicating device is called a round trip time. The so-called data relaying device belonging to the identical hierarchy is a data relaying device of which the number of the hops (the round trip time may be employed) at the time of making communication with the data collecting device 7 is identical, and the identical hierarchy number is allotted to the data relaying device belonging to the identical hierarchy. For example, the data relaying device 1,1 and the data relaying device 1,2 shown in FIG. 1, which are identical to each other in the number of the hops at the time of making communication with the data collecting device 7, belong to the common first hierarchy. "Y" in the inscription of "the data relaying device X,Y" is a number allotted to each data relaying device belonging to the identical hierarchy.

Further, it is assumed that the larger the number of the hops at the time of making communication with the data collecting device 7 is, the larger the hierarchy number becomes. Each data relaying device receives the data from the data relaying devices of which the hierarchy number is larger by one (1). Further, the data relaying devices of which the hierarchy number is largest receives the data from the data compressing device. The data relaying devices of which the hierarchy number is one (1) transmit the data received from the data relaying devices of which the hierarchy number is larger by one (the data relaying devices of which the hierarchy number is two (2)) to the data collecting device 7. Further, each data relaying device recompresses the received compressed-data, and transmits it to the other data relaying devices or the data collecting device 7.

In the following explanation, a plurality of the data relaying devices of which the hierarchy number is smaller by one (1) than that of a certain data relaying device are referred to as an upper-place data relaying device group, and a plurality of the data relaying devices of which the hierarchy number is larger by one (1) are referred to as a low-place data relaying device group.

Individual data generating devices P' (P'=1' to N5' in an example shown in FIG. 1) make communication with the corresponding data compressing devices P (P=1 to N5 in an example shown in FIG. 1), respectively. For example, the data generating device 1' transmits the data to the data compressing device 1.

Each of the data compressing devices 1 to N5 receives the data from the corresponding data generating device. And, it compresses the received data, and transmits the compressed data to one of the data relaying devices of the lowest-place hierarchy (the data relaying devices having the hierarchy number 3 in an example shown in FIG. 1).

In an example shown in FIG. 1, the hierarchy number of the data relaying device is three. And, the data collecting system includes two devices, i.e. the data relaying device 1,1 and the data relaying device 1,2 as a data relaying device having the hierarchy number 1. Further, it includes three devices, i.e. the data relaying device 2,1 to the data relaying device 2,3 as a data relaying device having the hierarchy number 2, and five devices, i.e. the data relaying device 3,1 to the data relaying device 3,5 as a data relaying device having the hierarchy number 3. Further, an example shown in FIG. 1 shows the case that the data relaying device 3,1 makes communication with the data compressing devices 1 to N1, the data relaying device 3,2 makes communication with the data compressing devices N1+1 to N2, the data relaying device 3,3 makes communication with the data compressing devices N2+1 to N3, the data relaying device 3,4 makes communication with the data compressing devices N3+1 to N4, and the data relaying device 3,5 makes communication with the data compressing devices N4+1 to N5.

In addition, FIG. 1 shows the case that the data compressing device P (P=1 to N5) is connected to the data generating device P' (P'=1' to N5') one versus one, and receives the data from the data generating device to which a connection has been made. It is assumed that the codes shown in FIG. 1, i.e. N1, N2, N3, N4, and N5 are natural numbers, and N1>1, N2>N1+1, N3>N2+1, N4>N3+1, and N5>N4+1.

Figure 2:
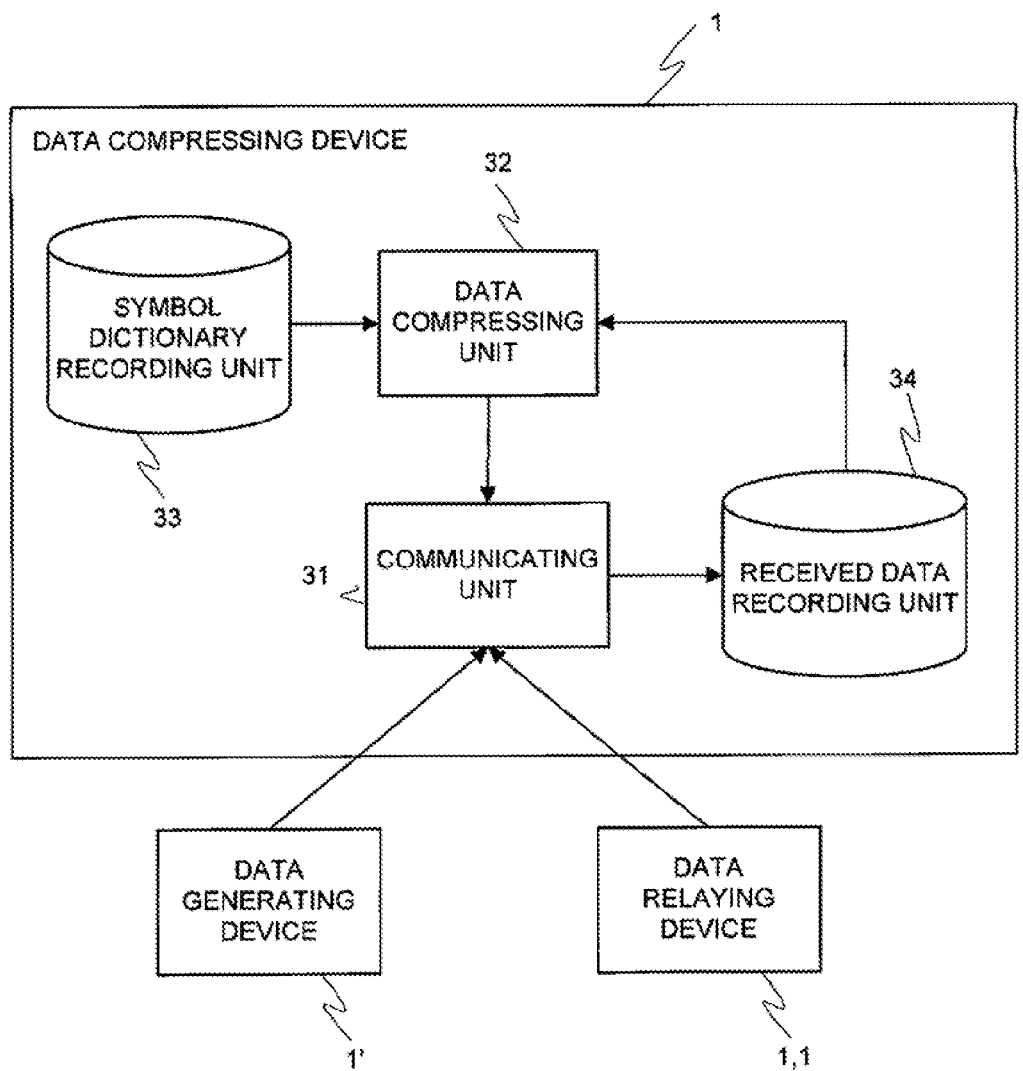
FIG. 2 is a block diagram illustrating a configuration example of the data compressing device.

FIG. 2 is a block diagram illustrating a configuration example of the data compressing device. Each of the data compressing devices 1 to N5 includes a communicating unit

31, a received data recording unit 34, a data compressing unit 32, and a symbol dictionary recording unit 33. FIG. 2 shows the data compressing device 1, out of the data compressing devices 1 to N5 shown in FIG. 1, which are similar to each other in the configuration.

The communicating unit 31 is a device for transmitting/receiving the data such as ETHERNET®. The communicating unit 31 receives the data from one data generating device and transmits the data to a plurality of the data relaying devices.

The received data recording unit 34 is a storing device for recording the data received from the data generating device by the communicating unit 31.

In the following explanation, the arbitrary bit string in the data generated by the data generating device is expressed as "a symbol".

The data compressing unit 32 performs a compressing process for the data recorded in the received data recording unit 34. This compressing process is realized with a data analyzing process and a data converting process. The data analyzing process is a process of analyzing a statistical special feature of the data that is a target of the compression. The information containing the result analyzed in this data analyzing process is referred to as a data analysis result. As an example of an analysis of the statistical special feature, derivation of the appearance frequency (the number of times of the appearances) of each symbol within the data that is a target of compression can be listed. Hereinafter, for convenience, derivation of the appearance frequency of each symbol is referred to as preparation of a frequency table in some cases. Further, the information indicative of the appearance frequency of each symbol is referred to as a frequency table in some cases.

Herein, the statistical special feature, being a target of analysis in the data analyzing process of the compressing process, will be explained. This statistical special feature is a statistical special feature having the characteristic that "the analysis result of the statistical special feature of the third aggregation that is comprised of all of the elements of the first aggregation and the elements of the second aggregation can be computed from the analysis result derived as a statistical special feature of the first aggregation (the first analysis result), and the analysis result derived as a statistical special feature of the second aggregation (the second analysis result) without the elements of the third aggregation listed". That is, the statistical special feature has the characteristic that the analysis result of the statistical special feature of the third aggregation can be derived from the first analysis result and the second analysis result even though the individual elements of the third aggregation are not specified when the first analysis result and the second analysis result have been derived. Herein, the element of the first aggregation and the element of the second aggregation are symbols. Also with the above-mentioned appearance frequency of the symbol, the analysis result of the third aggregation (the appearance frequency of each symbol) can be derived even though each of the elements of the first and second aggregations is not recognized at all when the appearance frequency of each symbol in the first aggregation and the appearance frequency of each symbol in the second aggregation are obtained. That is, a sum of the number of times of the appearances of each symbol in the first aggregation and the number of times of the appearances of each symbol in the second aggregation is computed for each symbol. Thus, the appearance frequency (frequency table) is equivalent to the statistical special feature having the foregoing characteristic. As another example of such a statistical special feature, a combination of an average value and the number of the elements, a combination of the maximum value and the minimum value of the element, or the like can be listed.

Owing to the characteristic of the statistical special feature as mentioned above, in the data analyzing process, the data analysis result of the data (the elements of the third aggregation) in which an arbitrary pieces of the data (the elements of the first aggregation and the second aggregation) have been coupled can be generated from the data analysis results (the data analysis results of the first aggregation and the second aggregation) that are obtained by performing the data analyzing process for individual pieces of the data. Additionally, in such a manner, the process of deriving the analysis result of the third aggregation from the data analysis results of the first aggregation and the second aggregation is performed by the data relaying device.

The data converting process is a process of converting the data, being a target of compression, into the compressed data of which the size is small by employing the data analysis result. For example, it is assumed that the data compressing unit 32 performs the process of deriving the appearance frequency of each symbol being contained in the data received from the data generating device as a data analyzing process. The data compressing unit 32 performs, for example, the process of replacing each symbol with a Huffman code of each symbol being derived based upon the appearance frequency as a data converting process subsequent to the above data analyzing process.

In the following explanation, a unit of the bit string (i.e. the bit string after the data converting process) obtained in the data converting process of the compressing process is referred to as "a code". In the above-mentioned example, the Huffman code corresponding to each symbol is equivalent to "a code". Further, information in which each symbol before the data converting process and each code replacing the above symbol have been caused to correspond one versus one is referred to as "data conversion information". As an example of the data conversion information, a code table in which the symbol and the code have been caused to correspond to each other, or the like can be listed.

Further, in the following explanation, the bit string in which the data conversion information and the data analysis result have been added to the code generated in the compressing process is referred to as already compressed data.

The data compressing unit 32 generates the already compressed data by adding the data conversion information and the data analysis result to the code generated in the compressing process, and transmits the above already compressed data to the data relaying device by employing the communicating unit 31. The transfer destination information governs which data relaying device, out of the data relaying devices that rank higher by one hierarchy, the already compressed data is transmitted to.

The symbol dictionary recording unit 33 records the dictionary data for defining the symbol, being a target of analysis in the data analyzing process of the compressing process, and the symbol, being a target of conversion in the data converting process of the compressing process. For example, when the frequency table is prepared as a data analyzing process, and a conversion to the Huffman code is made as a data converting process, the symbol dictionary recording unit 33 records information (dictionary data) for deciding the symbol for which the frequency table is prepared, or a conversion to the Huffman code is made, out of the symbols being contained in the data received from the data generating device. Additionally, when the frequency table is prepared as a data analyzing process, and a conversion to the Huffman code is made as a data converting process like the case of the above-mentioned example, the symbol, being a target of analysis in the data analyzing process, and the symbol, being a target of conversion in the data converting process, are identical to each other.

The symbol dictionary recording unit 33 and the received data recording unit 34 are realized with the storing device. The data compressing unit 32 may be realized, for example, with CPU that operates according to a program. This CPU may execute an operation of causing the received data recording unit 34 to store the data received by the communicating unit 31. Further, the data compressing unit 32 (CPU) may load the program stored in the storing device that the data compressing device includes to perform the compressing process (the data analyzing process and the data converting process) according to the above program. Further, whenever performing the data analyzing process, the data compressing unit 32 may copy a program for executing the data analyzing process to its own storing device from the outside of the data compressing device so as to perform the data analyzing process according to the above program.

Further, as an example of the data analyzing process of the statistical special feature, the preparation of the frequency table, the derivation of the number of the elements and the average value, the derivation of the maximum value and the minimum value, or the like can be listed; however, the data compressing unit 32 does not need to perform all of the various data analyzing processes, but performs the data analyzing of one kind. For example, the data compressing unit 32 may be configured to prepare the frequency table and not to perform the derivation of the number of the elements and the average value and the derivation of the maximum value and the minimum value. When the data compressing unit 32 is configured to perform plural kinds of the data analyzing processes, it may load a program responding to the kind of the data analyzing process so as to perform the data analyzing process according to the above program.

The data compressing unit 32, when preparing the frequency table, counts the number of the symbols being contained in the data received from the data generating device for each symbol decided in the dictionary data stored in the symbol dictionary recording unit 33, and defines an aggregation of sets of the symbol and the counting result of the symbol to be a data analysis result.

Further, when a combination of the average value and the number of the elements is employed as a statistical special feature, the data compressing unit 32 numerically expresses the element of the data so as to obtain the average value, and counts the number of the elements. Further, when the maximum value and the minimum value are employed as a statistical special feature, the data compressing unit 32 searches for the maximum value and the minimum value that are obtained at the case of numerically expressing the element of the data so as to obtain the maximum value and the minimum value. As a technique of numerically expressing the element being contained in the data, there exists the technique of alternatively reading the bit string signifying each element by means of the binary digit; however the element may be numerically expressed with the other techniques. The statistical special feature and the data analyzing process thereof listed herein are only exemplification, and the data analyzing process may be performed by employing the other statistical special features.

Figure 3:
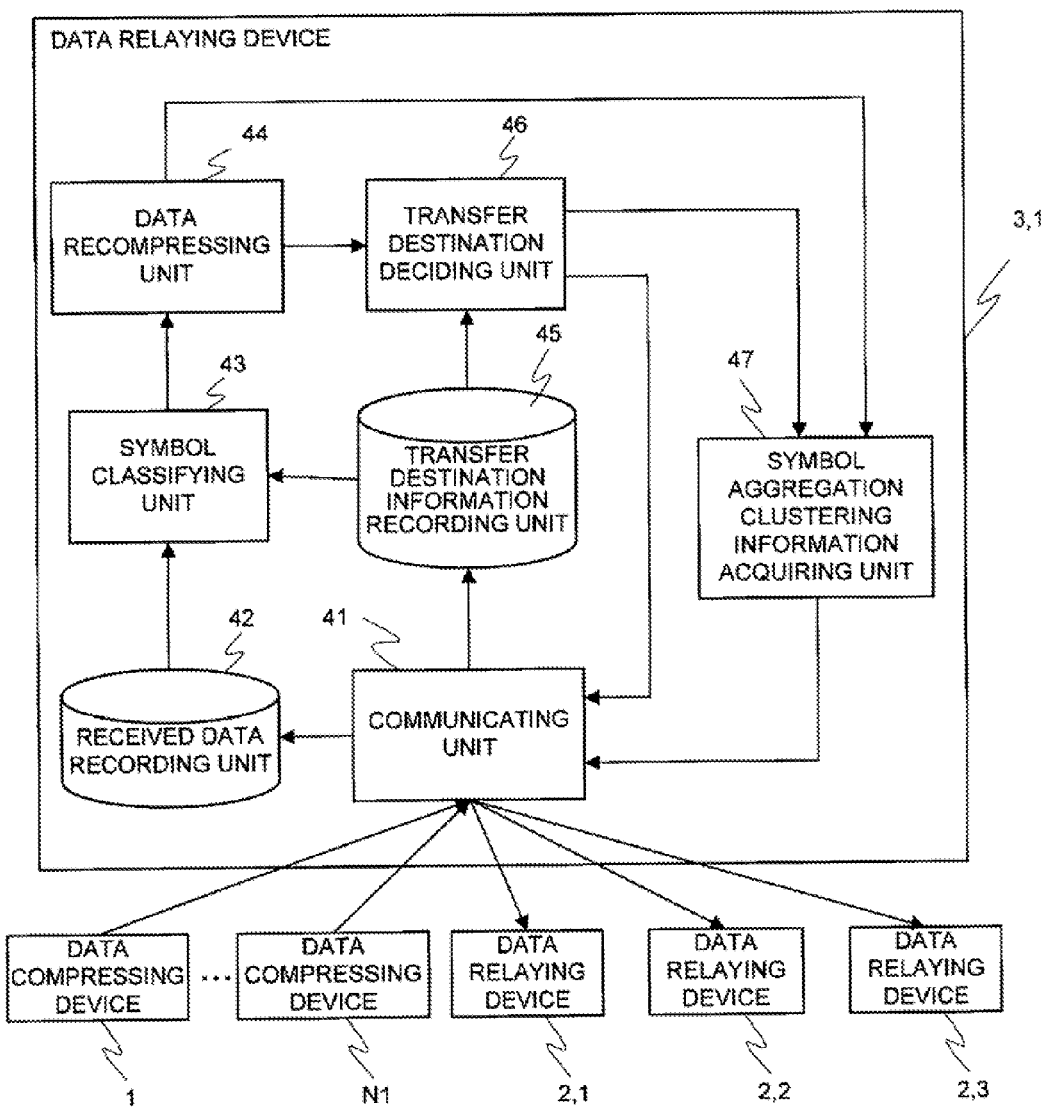
FIG. 3 is a block diagram illustrating a configuration example of the data relaying device.

FIG. 3 is a block diagram illustrating a configuration example of the data relaying device. Each of the data relaying devices (the data relaying device 1,1 to the data relaying device 3,5 in an example shown in FIG. 1) includes a communicating unit 41, a received data recording unit 42, a transfer destination information recording unit 45, a symbol classifying unit 43, a data recompressing unit 44, a transfer destination deciding unit 46, and a symbol aggregation clustering information acquiring unit 47. While FIG. 3 shows the data relaying device 3,1, out of the respective data relaying devices shown in FIG. 1, each of the data relaying devices except the devices for transmitting the data to its own device (the data compressing devices 1 to N1 shown in FIG. 3), and the devices (the data relaying devices 2,1 to the data relaying device 2,3 shown in FIG. 3), being a data transfer destination, is identical to the other in the configuration. For example, the data relaying devices of the first hierarchy, which receive the data from the data relaying devices of the second hierarchy, and transfer the data to the data collecting device 7, are configured similarly to the data relaying device shown in FIG. 3.

The communicating unit 41 is a device for transmitting/receiving the data such as ETHERNET®. The communicating unit 41 receives the data from a plurality of the data compressing devices or the data relaying devices. The received data recording unit 42 is a device for recording the data in which the receiving time has been additionally affixed to the data received by the communicating unit 41 (each piece of the data received from a plurality of the data compressing devices or the data relaying device). The process of additionally affixing the receiving time to the data received by the communicating unit 41, and causing the received data recording unit 42 to store it is performed, for example, by the CPU for realizing each unit of the data relaying device.

The data recompressing unit 44 recompresses the already compressed data. The data recompressing unit 44 realizes the recompression of the data by replacing the code being contained in the received already compressed data with other codes. At this time, while the compressed code is converted into the symbol by the symbol classifying unit 43, it is not that the data recompressing unit 44 compresses this symbol. That is, it is not that the data recompressing unit 44 expands the compressed data, and recompresses the expanded data. While the process of returning the code to the symbol is performed, the data recompressing unit 44 realizes the recompression by converting the code itself into another code. Thus, the load required for the recompressing process can be reduced, and further, the process time of the recompression can be made short. A configuration of the data recompressing unit 44 will be described later.

The transfer destination information recording unit 45 records the transfer destination information in which a range of the aggregation of the symbols defined for each the upper-place data relaying device, being a transfer destination, and the destination information of each data relaying device being contained in the upper-place data relaying device group have been caused to correspond to each other. The so-called range of the aggregation of the symbols is a range of the symbols decided for each data relaying device that ranks higher by one hierarchy. For example, when the data relaying devices that rank higher by one hierarchy are the data relaying device 2,1 to the data relaying device 2,3 and that symbols "0000", "1111", and "00001111" are destined to be transmitted to the data relaying device 2,1 (more specifically, the data obtained by compressing these symbols is destined to be transmitted), these three symbols become a range of the aggregation of the symbols. Likewise, when a symbol "0110" is destined to be transmitted to the data relaying device 2,2 (more specifically, the data obtained by compressing this symbol is destined to be transmitted), the symbol "0110" becomes a range of the symbol aggregation. The transfer destination information is decided for each hierarchy of the data relaying device, and the transfer destination information recording units 45 of the data relaying device belonging to the identical hierarchy stores the common transfer destination information. Hereinafter, the range of the aggregation of the symbols decided for each upper-place data relaying device, being a data transfer destination, is referred to as a symbol aggregation.

The transfer destination information is generated by the transfer destination information updating device 5 to be later described (not shown in FIG. 1. See FIG. 7), and is recorded by the transfer destination information recording unit 45 via the communicating unit 41.

The symbol classifying unit 43 converts the code into the symbol by employing the data conversion information within the already compressed data recorded in the received data recording unit 42. The symbol classifying unit 43 classifies each symbol obtained by the conversion according to the symbol aggregation decided for each data relaying device, being a transfer destination, by employing the transfer destination information recorded in the transfer destination information recording unit 45, and transmits it to the data recompressing unit 44. For example, the symbol classifying unit 43 previously divides a storage region of the storing device (an already-compressed data recording unit 441 that the data recompressing unit 44 includes. See FIG. 5) that the data relaying device includes for each symbol aggregation decided for each data relaying device, and causes the region of the symbol aggregation to which the symbol belongs to store each symbol obtained by the conversion and the already compressed data. The symbol classifying unit 43 classifies the code as well corresponding to each symbol obtained by the conversion, being a code contained in the already compressed data, in line with the symbol, and transmits it to the data recompressing unit 44. Further, it also classifies the data conversion information and the data analysis result contained in the already compressed data in line with the symbol, and transmits it to the data recompressing unit 44.

Further, the symbol classifying unit 43 prepares a frequency table of the symbol obtained by converting the compressed code into the symbol. That is, it counts the number of times of the appearances of the symbol for each symbol obtained by converting the code, and generates information (a frequency table) in which the symbol and the number of times of the appearances of the symbol has been caused to correspond to each other. The symbol classifying unit 43 causes an execution history recording unit 471 that the symbol aggregation clustering information acquiring unit 47 includes to store the above frequency table. Herein, when the frequency table has been prepared in the data analyzing process that is performed at the time that the data compressing device compress the data, and has been already contained in the already compressed data, the symbol classifying unit 43 does not need to prepare the frequency table, and to cause the execution history recording unit 471 to store it. When the frequency table has been contained in the already compressed data as a data analysis result, the transfer destination deciding unit 46 causes the execution history recording unit 471 to store the frequency table contained in the already compressed data, which has been caused to be contained in the execution history information. The execution history recording unit 471 will be described later by making a reference to FIG. 4. The execution history information will be also described later.

The transfer destination deciding unit 46 decides the data relaying device, being a transmission destination of the already compressed data generated by the data recompressing unit 44, by employing the transfer destination information stored in the transfer destination information recording unit 45. And, the transfer destination deciding unit 46 transmits the already compressed data to the decided data relaying device by employing the communicating unit 41.

Figure 4:
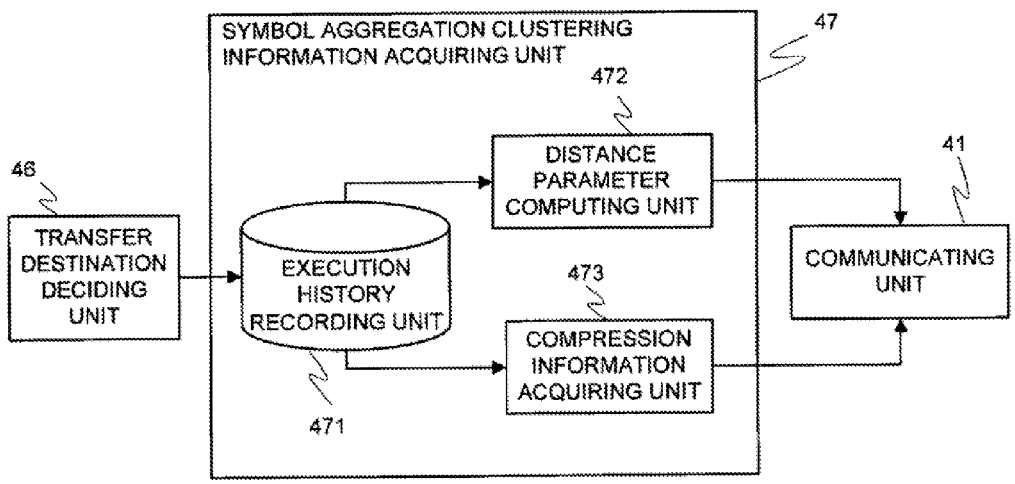
FIG. 4 is a block diagram illustrating the symbol aggregation clustering information acquiring means.

FIG. 4 is a block diagram illustrating the symbol aggregation clustering information acquiring unit 47. The symbol aggregation clustering information acquiring unit 47 includes the execution history recording unit 471, a distance parameter computing unit 472, and a compression information acquiring unit 473.

The execution history information is recorded in the execution history recording unit 471. The execution history information contains the communication speed of the already compressed data transferred by the transfer destination deciding unit 46, the time required for the recompressing process by the data recompressing unit 44, the size of the already compressed data generated in the recompressing process, the data analysis result being contained in the already compressed data, the data relaying device identification information allotted for each data relaying device, and the hierarchy number. A specific example of the execution history information will be described later by making a reference to FIG. 37. The recording of the execution history information into the execution history recording unit 471 is carried out by the transfer destination deciding unit 46. The hierarchy number and the data relaying device identification information being contained in the execution history information stored by the execution history recording unit 471 is the hierarch number and the identification information of the data relaying device itself storing the above execution history information.

The distance parameter computing unit 472 loads the communication speed of the already compressed data transferred by the transfer destination deciding unit 46, out of the execution history information recorded in the execution history recording unit 471. Further, the distance parameter computing unit 472 makes a reference to the execution history information recorded in the execution history recording unit 471, and computes the processing speed in the recompressing process by dividing the size of the already compressed data by the time required for the recompressing process. Next, the distance parameter computing unit 472 transmits the loaded communication speed, the computed processing speed, the data relaying device identification information being contained in the execution history information, and the hierarchy number to the transfer destination information updating device 5.

The compression information acquiring unit 473 loads the frequency table of the symbol recorded in the execution history recording unit 471, and transmits the above frequency table to the transfer destination information updating device 5. Additionally, when the frequency table has been contained in the already compressed data as a data analysis result, and the above frequency table has been recorded as one part of the execution history information, the compression information acquiring unit 473 loads the frequency table recorded as one part of the execution history information. When the data analysis result contained in the already compressed data is not a frequency table, the symbol classifying unit 43 generates the frequency table, and causes the execution history recording unit 471 to store it, whereby the compression information acquiring unit 473 loads the above frequency table and transmits it to the transfer destination information updating device 5.

Additionally, each of the distance parameter computing unit 472 and the compression information acquiring unit 473 transmits the information to the transfer destination information updating device 5 via the communicating unit 41.

Figure 5:
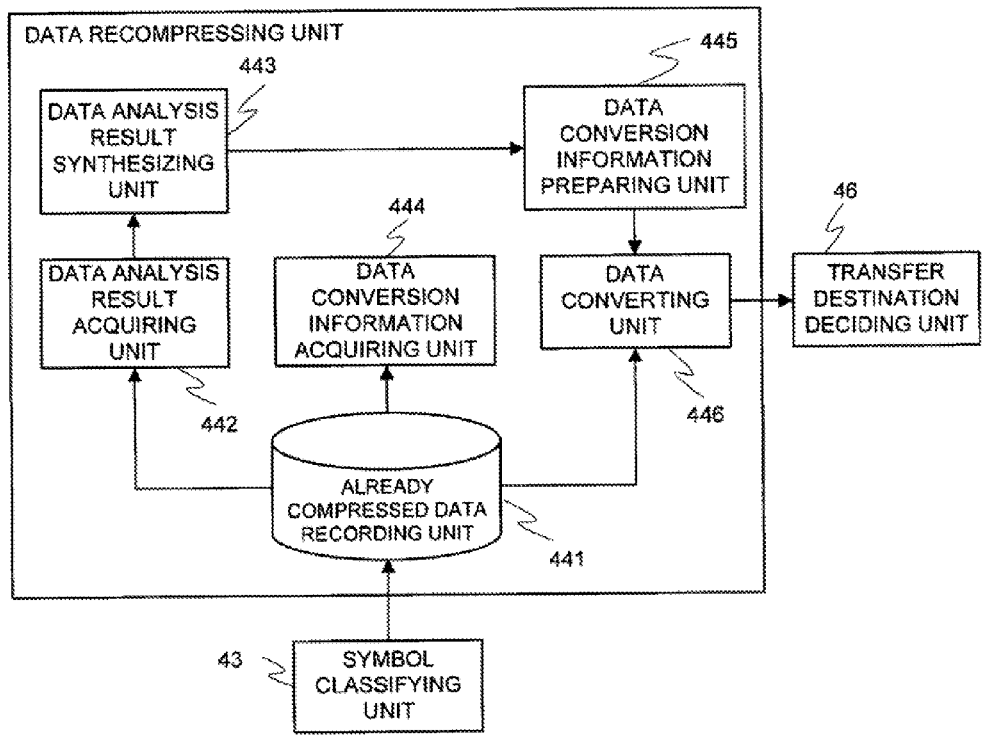
FIG. 5 is a block diagram illustrating the data recompressing means.

FIG. 5 is a block diagram illustrating the data recompressing unit 44. The data recompressing unit 44 includes an already compressed data recording unit 441, a data analysis result acquiring unit 442, a data analysis result synthesizing unit 443, a data conversion information acquiring unit 444, a data conversion information preparing unit 445, and a data converting unit 446.

The already compressed data recording unit 441 is a storing device for recording the already compressed data that is sent from the symbol classifying unit 43, being the already compressed data transmitted from the other plural data relaying devices. The already compressed data is classified for each symbol aggregation by the symbol classifying unit 43, and stored in the already compressed data recording unit 441.

The data analysis result acquiring unit 442 acquires the data analysis result from the already compressed data stored in the already compressed data recording unit 441 for each symbol aggregation.

The data analysis result synthesizing unit 443 generates the by-symbol-aggregation data analysis result of the entirety of the already compressed data by employing the by-symbol-aggregation data analysis result acquired by the data analysis result acquiring unit 442. As explained already, the statistical special feature, being a target of analysis in the data analyzing process of the compressing process, has the characteristic that "the analysis result of the statistical special feature of the third aggregation that is comprised of all of the elements of the first aggregation and the elements of the second aggregation can be computed from the analysis result derived as a statistical special feature of the first aggregation (the first analysis result), and the analysis result derived as a statistical special feature of the second aggregation (the second analysis result) without the elements of the third aggregation listed". Thus, the data analysis result synthesizing unit 443 can generate the by-symbol-aggregation data analysis result of the entirety of the already compressed data from the by-symbol-aggregation data analysis result.

The data conversion information acquiring unit 444 acquires the data conversion information symbol aggregation by symbol aggregation from the already compressed data stored in the already compressed data recording unit 441.

The data conversion information preparing unit 445 prepares the data conversion information symbol aggregation by symbol aggregation by employing the by-symbol-aggregation data analysis result of the entirety of the already compressed data recomputed by the data analysis result synthesizing unit 443.

For example, it is assumed that plural kinds of the data analysis results have been stored in the already compressed data recording unit 441 as a result of having received the already compressed data from the a plurality of the relaying devices. Further, it is assumed that the above data analysis result is a frequency table. The data analysis result synthesizing unit 443 prepares the data analysis result (frequency table) of the entirety of the already compressed data storage aggregation by storage aggregation from each data analysis result (frequency table). The data conversion information preparing unit 445 prepares the data conversion information symbol aggregation by symbol aggregation from this entire data analysis result. For example, when the data analysis result is a frequency table, the data conversion information preparing unit 445 derives the Huffman codes of individual symbols based upon the entire data analysis result (frequency table), and defines the information in which the above Huffman code and the symbol have been caused to correspond to each other to be new data conversion information.

The data converting unit 446 converts the codes of the already compressed data received from the already compressed data recording unit 441 into the codes within the data conversion information generated by the data conversion information preparing unit 445 from the data conversion information acquired by the data conversion information acquiring unit 444, and the data conversion information generated by the data conversion information preparing unit 445, and transmits it to the transfer destination deciding unit 46. The data conversion information acquired by the data conversion information acquiring unit 444 is data conversion information contained in the already compressed data received by the data relaying device. For example, it is assumed that the symbol "0000" and a code "0110" have been caused to correspond to each other in this data conversion information. Further, it is assumed that the symbol "0000" and a code "00" have been caused to correspond to each other in the data conversion information generated by the data conversion information preparing unit 445. In this case, the data converting unit 446 converts the code "0110" within the already compressed data corresponding to the symbol "0000" into "00" according to data conversion information generated by the data conversion information preparing unit 445 so as to recompress the data. The data conversion information acquired by the data conversion information acquiring unit 444 is referred to as old data conversion information, and the data conversion information generated by the data conversion information preparing unit 445 is referred to as new data conversion information. Like the case of the above-mentioned example, the original symbol has been uniquely decided from the code within the already compressed data owing to the old data conversion information. Further, the new code corresponding to the symbol has been decided in the new data conversion information. The data converting unit 446 retrieves the symbol caused to correspond to the code within the already compressed data from the old data conversion information, further, retrieves the code caused to correspond to the above symbol from the new data conversion information, and replaces the code within the already compressed data with the above code. In such a manner, it is not that the data converting unit 446 performs the recompressing process for the symbol recovered from the code, but that it replaces the code within the already compressed data with the another code so as to recompress the data. And, the data converting unit 446 generates the already compressed information containing the after-recompression code, the new data conversion information, and the new data analysis result prepared by the data analysis result synthesizing unit 443.

The symbol classifying unit 43, the transfer destination deciding unit 46, the distance parameter computing unit 472, the compression information acquiring unit 473, the data analysis result acquiring unit 442, the data analysis result synthesizing unit 443, the data conversion information acquiring unit 444, the data conversion information preparing unit 445, and the data converting unit 446 of the data relaying device are realized, for example, with the CPU that operates according to the program.

Figure 6:
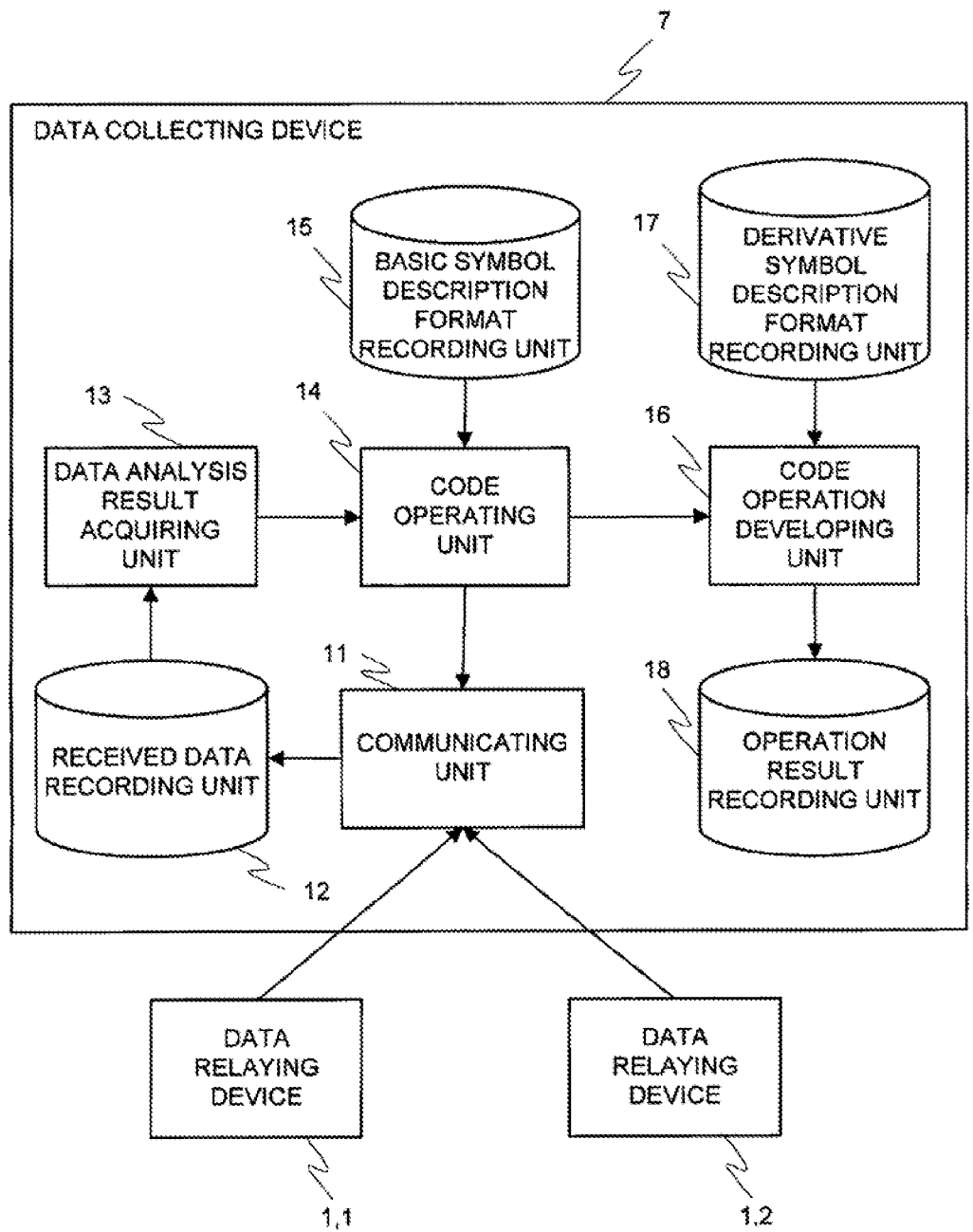
FIG. 6 is a block diagram illustrating a configuration example of the data collecting device.

FIG. 6 is a block diagram illustrating a configuration example of the data collecting device 7. The data collecting device 7 includes a communicating unit 11, a received data recording unit 12, a data analysis result acquiring unit 13, a basic symbol description format recording unit 15, a derivative symbol description format recording unit 17, a code operating unit 14, a code operation developing unit 16, and an operation result recording unit 18.

The communicating unit 11, similarly to the communicating unit 14 that each data relaying device includes, is a device for receiving the data from the data relaying device. The received data recording unit 12 is a storing device similar to the received data recording unit 42 that each data relaying device includes.

The data analysis result acquiring unit 13 acquires the data analysis result symbol aggregation by symbol aggregation from the already compressed data stored in the received data recording unit 12. Further, it acquires the data conversion information symbol aggregation by symbol aggregation from the already compressed data stored in the received data recording unit 12. That is, the data analysis result acquiring unit 13 acquires information similar to the information that the data analysis result acquiring unit 442 and the data conversion information acquiring unit 444, which each data relaying device includes, acquire.

The basic symbol description format recording unit 15 is a storing device for recording symbol description information of the symbol recorded in the dictionary data recorded in the symbol dictionary recording unit 33 of the each of the data compressing devices 1 to N5, being a description format. In the basic symbol description format recording unit 15, the basic symbol, out of the symbols decided in the dictionary data of the symbol dictionary recording unit 33 of each of the data compressing device 1 to N5, and the format description of the above basic symbol have been pre-stored correspondingly to each other. The basic symbol is a symbol that cannot be divided beyond it (for example, the symbol expressing one character). The description format being contained in the symbol description information is a symbol in which the basic symbol has been described in another expression. For example, when the character code differs, the bit string expressing the common character also differs. Upon taking a specific example, the character of shift JIS and the character of another character code differ from each other in the bit string even though these characters are identical. The description format being contained in the symbol description information is a symbol in which the basic symbol is expressed with a different bit string in such a manner. Such symbol description information makes it possible to unify the identical character expressed with a different bit string into a character having a bit string in line with one specification (character code). Additionally, the symbol description information has been pre-decided.

Further, the symbol that is obtained by combining the basic symbols is referred to as a derivative symbol. For example, the symbol signifying the character string having two characters or more that is obtained by combining the basic symbols is equivalent to the derivative symbol. Further, the so-called description format of the derivative symbol is an aggregation of individual basic symbols constituting the derivative symbol. The derivative symbol description format recording unit 17 is a storing device for storing derivative symbol configuration information in which the derivative symbol that is configured of a plurality of the basic symbols, and a set of a plurality of the basic symbols constituting the above derivative symbol (the description format of the derivative symbol) have been caused to correspond to each other.

The basic symbol being contained the symbol description information and the description format of the basic symbol differs from each other, for example, in the specification such as the character code. On the other hand, the specification of the derivative symbol being contained in the derivative symbol configuration information and that of the description format of the derivative symbol are common because the derivative symbol is a basic symbol obtained in which the basic symbols have been combined, and the description format of the derivative symbol is an aggregation of the basic symbols constituting the derivative symbol in the derivative symbol configuration information.

The code operating unit 14 derives a statistical value of the basic symbols converted into the codes within the already compressed data (for example, the frequency table of the basic symbol), and a statistical value of the derivative symbols (for example, the frequency table of the derivative symbol) by employing the data analysis result acquired by the data analysis result acquiring unit 13, and the symbol description information acquired from the basic symbol description format recording unit 15.

The code operation developing unit 16 computes the statistical value of the basic symbols constituting the derivative symbol from a combination of the basic symbols constituting the derivative symbol acquired from the derivative symbol description format recording unit 17, and the statistical value of the derivative symbols computed by the code operating unit 14. The code operation developing unit 16 newly computes the statistical value of the basic symbols by coupling the above statistical value of the basic symbols, and the statistical value of the basic symbols computed by the code operating unit 14. The operation result recording unit 18 is a storing device for storing the statistical value of the basic symbols computed by the code operation developing unit 16.

The data analysis result acquiring unit 13, the code operating unit 14, and the code operation developing unit 16 are realized, for example, with the CPU that operates according to the program.

Figure 7:
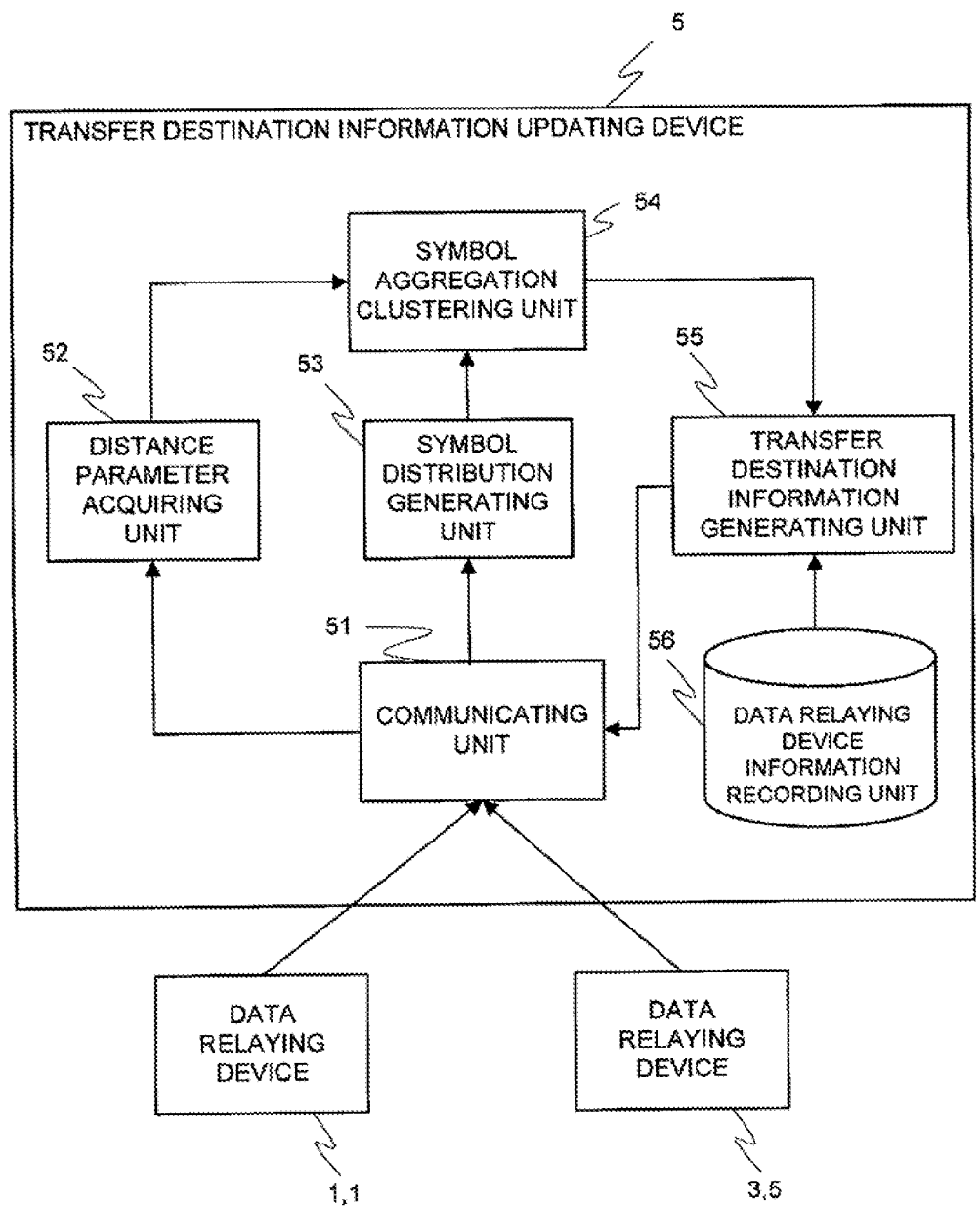
FIG. 7 is a block diagram illustrating a configuration example of the transfer destination information updating device.

FIG. 7 is a block diagram illustrating a configuration example of the transfer destination information updating device 5. The transfer destination information updating device 5 includes a communicating unit 51, a symbol distribution generating unit 53, a distance parameter acquiring unit 52, a symbol aggregation clustering unit 54, a data relaying device information recording unit 56, and a transfer destination information generating unit 55.

The communicating unit 51 is a device similar to the communicating unit 41 that each data relaying device includes. The communicating unit 51 receives the frequency table of the symbol, the processing speed in the recompressing process and the communication speed being contained in the execution history information, the data relaying device identification information, and the hierarchy number from symbol aggregation clustering information acquiring unit 47 of each data relaying device. Further, the communicating unit 51 transmits the transfer destination information to each data relaying device.

The symbol distribution generating unit 53 acquires the frequency table from the compression information acquiring unit 473 within each data relaying device via the communicating unit 51. And, the symbol distribution generating unit 53 prepares a frequency table of the symbol within the data received from the other data relaying devices or the data compressing device for a constant time by all data relaying devices by employing the frequency table acquired from the compression information acquiring unit 473 within each data relaying device.

The distance parameter acquiring unit 52 acquires the processing speed of the recompressing process in each data relaying device, the communication speed contained in the execution history information, the data relaying device identification information, and the hierarchy number from the distance parameter computing unit 472 within each data relaying device via the communicating unit 51.

The symbol aggregation clustering unit 54 classifies the symbols within the data received for a constant time by the data relaying device for each hierarchy of the data relaying device by employing the communication speed and the processing speed (the processing speed of the recompressing process in each data relaying device) received from the distance parameter acquiring unit 52, and the frequency table of the symbol within the data received for a constant time by all data relaying devices, which has been prepared by the symbol distribution generating unit 53. And, the symbol aggregation clustering unit 54 allots the identification information of the data relaying devices of the upper-place hierarchy to the classified group hierarchy by hierarchy. In addition, the symbol aggregation clustering unit 54 generates the information hierarchy by hierarchy in which the aggregation of the symbols (equivalent to the symbol aggregation already explained) belonging to each group, and the identification information of the data relaying devices of the upper-place hierarchy allotted to each group have been caused to correspond to each other. The information in which this symbol aggregation and the identification information of the data relaying devices of the upper-place hierarchy have been caused to correspond to each other is referred to as symbol cluster information. When the symbol aggregation clustering unit 54 classifies the symbols within the data and generates the symbol cluster information, it generates the symbol cluster information so that the following two conditions are satisfied.

A first condition is that a deviation of the frequency table of the symbol within the group becomes larger than that of the frequency table of the symbol generated by the symbol distribution generating unit 53. A second condition is that a magnitude relation, which is obtained at the time of comparing the total number of the frequencies of respective symbols belonging to the group (the total number of times of the appearances of respective symbols belonging to the group) group by group, coincides with a magnitude relation of a sum of the communication speed and the processing speed of the data relaying device (the data relaying device of the upper-place hierarchy) allotted to each group. For example, it is assumed that when the symbols are classified into group A, group B, and group C, the total number of times of the appearances of each symbol belonging to each group is a, b, and c, respectively, and a<b<c. It is assumed that the data relaying devices of the upper-place hierarchy that are allotted to the groups A, B, and C are P, Q, and R, respectively, and the sum of the communication speed and the processing speed of each of the data relaying devices P, Q, and R is p, q, and r, respectively. At this time, if a<b<c, the data relaying devices of the upper-place hierarchy are allotted to each group so that p<q<r holds. Further, the so-called deviation of the frequency table in the first condition is a ratio of the appearance frequency of the symbol of which the appearance frequency (the number of times of the appearances) is largest to all frequencies (the number of times of the appearances of all symbols) within the frequency table.

The data relaying device information recording unit 56 is a storing device for storing data relaying device information. The so-called data relaying device information is information in which the identification information of the data relaying device, the destination information of the data relaying device (for example, an IP address, a port number, etc.), and the hierarchy number of the data relaying device have been caused to correspond to each other for each data relaying device.

The transfer destination information generating unit 55 loads the data relaying device information from the data relaying device information recording unit 56. Further, the transfer destination information generating unit 55 acquires the symbol cluster information from the symbol aggregation clustering unit 54. And, the transfer destination information generating unit 55 generates the transfer destination information in which the destination information of the upper-place data relaying device, out of the data relaying devices of each hierarchy, and the aggregation of the symbols being transmitted to the upper-place data relaying device have been caused to correspond to each other from the data relaying device information and the symbol cluster information. The transfer destination information generating unit 55 transmits the transfer destination information generated hierarchy by hierarchy to the data relaying devices of each hierarchy via the communicating unit 51. At this time, it transmits to each data relaying device the transfer destination information responding to the hierarchy to which the above data relaying device belongs. Additionally, the data relaying device, upon receipt of the transfer destination information, causes the transfer destination recording unit 45 to store the above transfer destination information.

The distance parameter acquiring unit 52, the symbol distribution generating unit 53, the symbol aggregation clustering unit 54, and the transfer destination information generating unit 55 are realized, for example, with the CPU that operates according to the program.

Next, an operation will be explained.

Figure 8:
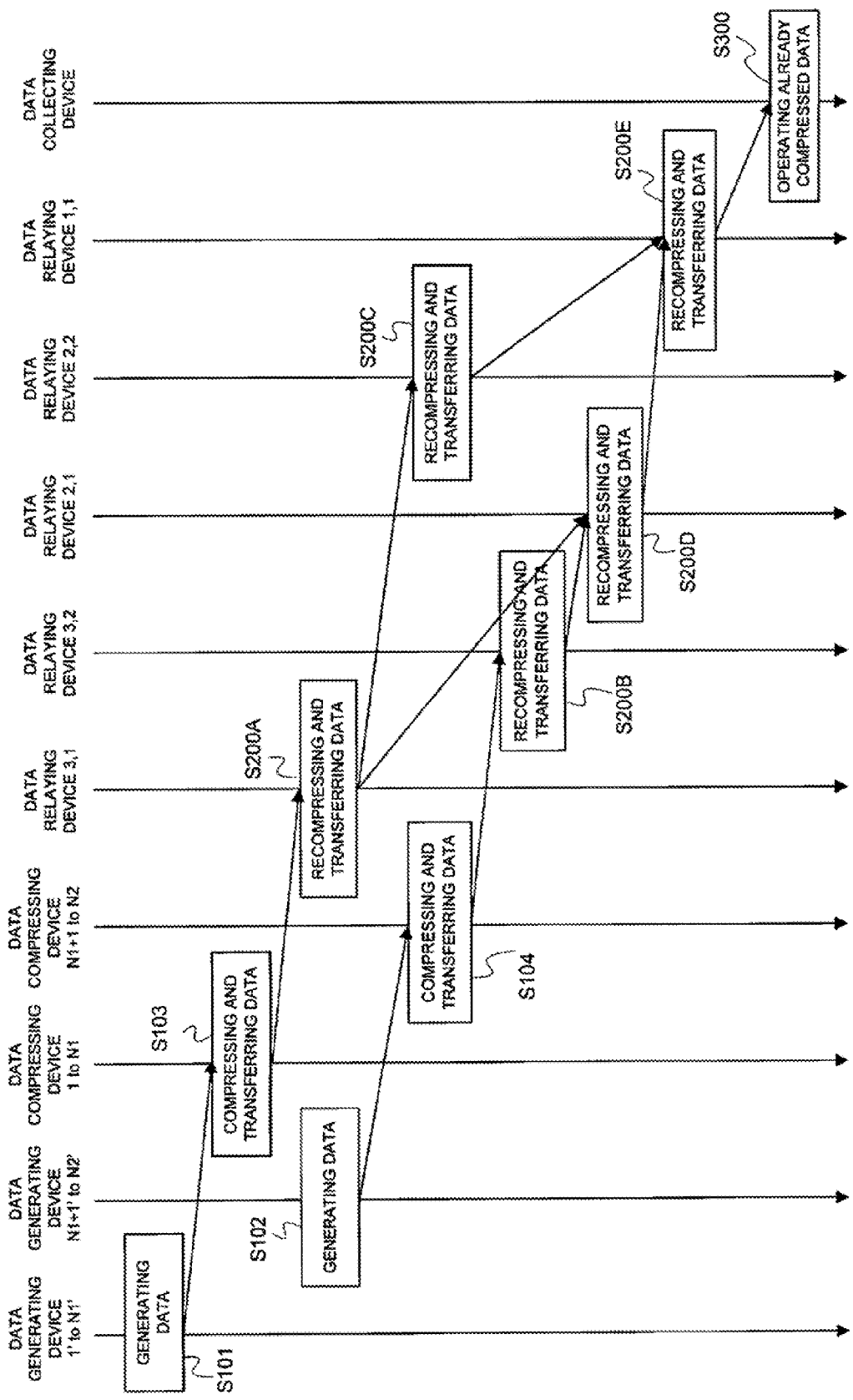
FIG. 8 is a flowchart illustrating an example of an operation of the data collection system of the present invention.

FIG. 8 is a flowchart illustrating an example of an operation of the data collection system of the present invention. An operation of collecting the data by the data collection system including each data generating device, each compressing device, each data relaying device, and the data collecting device 7 will be explained by making a reference to FIG. 1 and FIG. 8.

FIG. 8 exemplifies an operation of the case that the data generating devices 1' to N1', and the data generating devices N1+1' to N2 generate the data, and the data relaying device 3,1, the data relaying device 3,2, the data relaying device 2,1, the data relaying device 2,2, and the data relaying device 1,1 transfer the data; however an operation of other data generating devices and the other data relaying devices is also similar.

Each of the data generating device 1' to the data generating device N1', and the data generating device N1+1' to the data generating device N2' includes, for example, an RFID reader, and generates the data such as a tag ID by reading off a tag ID etc. from an RFID tag. In the following explanation, the case that each data generating device includes the RFID reader for reading off the data from the RFID tag so as to generate the data is exemplified. The data generating device 1' to the data generating device N1' transmit the generated data to corresponding data compressing devices 1 to N1, respectively, and the data generating device N1+1' to the data generating device N2' as well similarly transmit the generated data to corresponding data compressing devices N1+1 to N2, respectively (steps S101 and S102).

Next, the data compressing device 1 to N1 compress the data received in S101, and transmit the already compressed data (the data in which the data conversion information and the data analysis result have been added to the code obtained by the compression) to the data relaying device 3,1 (step S103). Likewise, the data compressing device N+1 to N2 compress the data received in S102, and transmit the already compressed data to the data relaying device 3,2 (step S104).

Next, the data relaying device 3,1 recompresses the already compressed data received in the step S103 from the data compressing devices 1 to N1, and transmits the already compressed data to the upper-place data relaying device group (in this example, the data relaying device 2,1 and the data relaying device 2,2)(step S200A). The data relaying device 3,2 recompresses the already compressed data received in the step S104 from the data compressing devices N1+1 to N2, and transmits the already compressed data to the upper-place data relaying device group (step S200B). The data relaying device 2,1 and the data relaying device 2,2 transmit the already compressed data received from the low-place data relaying device group to the upper-place data relaying device group (in this example, the data relaying device 1,1) (steps S200C and S200D).

Next, the data relaying device 1,1 recompresses the already compressed data received from the data relaying device 2,1 and the data relaying device 2,2 each of which is a low-place data relaying device group, and transmits the already compressed data to the data collecting device 7 (step S200E).

The data collecting device 7 performs an operating process for the already compressed data received from the data relaying device 1,1 (step S300). For example, it obtains the number of times of the appearances of each symbol converted into the code being contained in the already compressed data.

Figure 9:
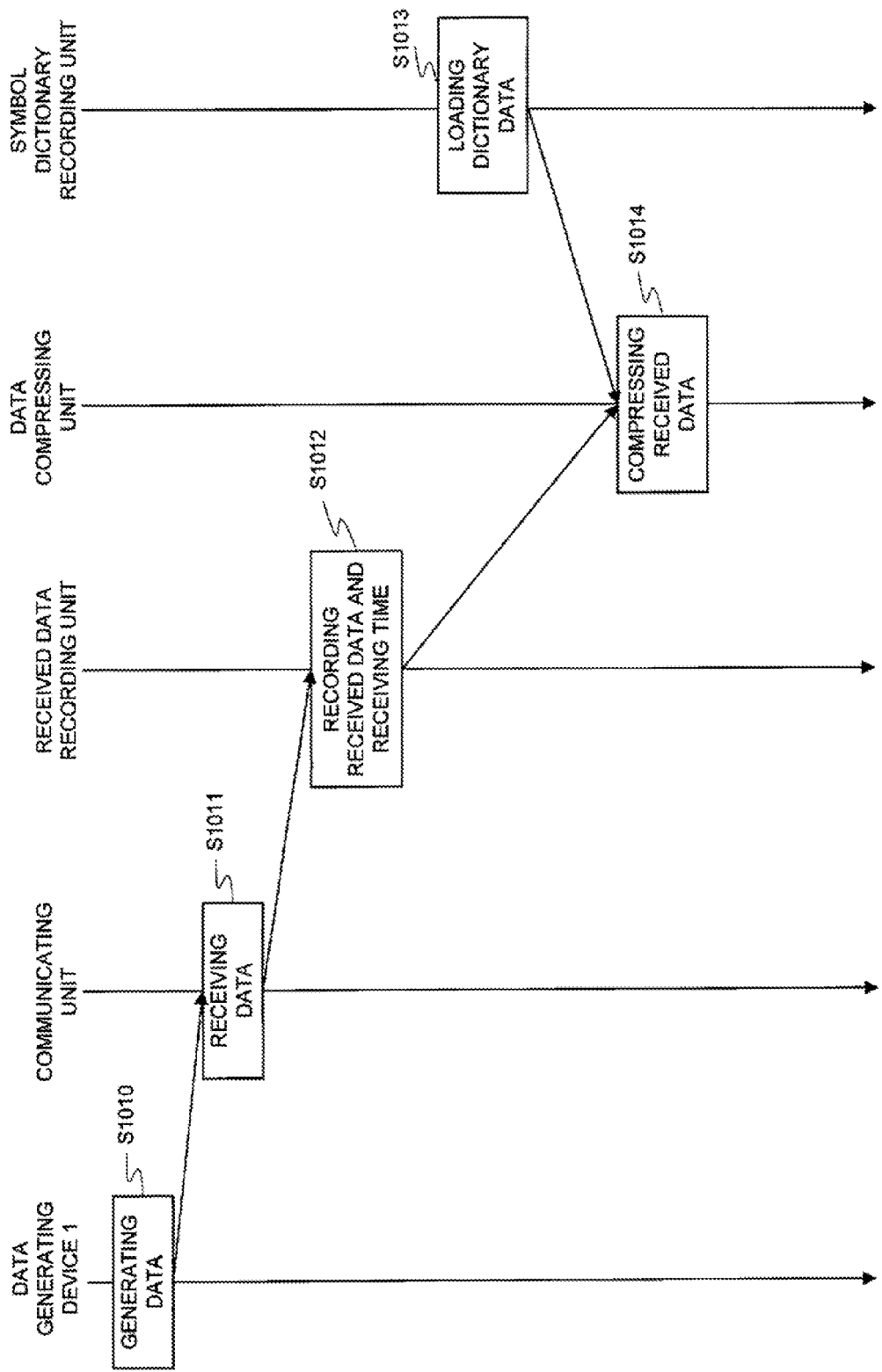
FIG. 9 is a flowchart illustrating an example of an operation of the data compressing device.

Next, an operation of the data compressing device will be explained by making a reference to FIG. 2 and FIG. 9. FIG. 9 is a flowchart illustrating an example of an operation of the data compressing device. Herein, the case that the data generating device 1' generates the data, and the data compressing device 1 compresses the data will be exemplified for explanation; however an operation of the other data generating devices and the other data compressing devices is also similar.

At first, the data generating device 1' reads off the data such as the tag ID from the RFID tag with the RFID reader, generates the data such as the tag ID, and transmits the above data to the data compressing device 1 (step S1010). Next, the communicating unit 31 that the data compressing device 1 includes receives the data transmitted in S1010 (Step S1011).

Next, the data compressing device 1 causes the received data recording unit 34 that the data compressing device 1 includes to store the data received in S1011 by the communicating unit 31 (step S1012). This operation is performed, for example, by the CPU that the data compressing device includes. Further, this CPU may causes the received data recording unit 34 to store the receiving time as well together with the received data.

After the step S1012, the data compressing unit 32 loads the dictionary data from the symbol dictionary recording unit 33 (step S1013). Next, the data compressing unit 32 compresses the data recorded in S1012 by the received data recording unit 34 by employing the dictionary data acquired in S1013 (step S1014). In this compressing process, the data analyzing process and the data converting process are performed. The symbol, being a target of analysis in the data analyzing process of the compressing process, and the symbol, being a target of conversion in the data converting process of the compressing process, have been decided by the dictionary data loaded in the step S1013. As an example of the data analyzing process, for example, the process in which the data compressing unit 32 counts the number of times of the appearances within the received data for each decided symbol, and derives the Huffman code of each symbol based upon its result can be listed. In this case, the data compressing unit 32 converts each symbol into the derived Huffman code in the data converting process. The data analyzing process and the data converting process shown herein are only exemplification, and the compression may be carried out in other aspects.

Figure 10:
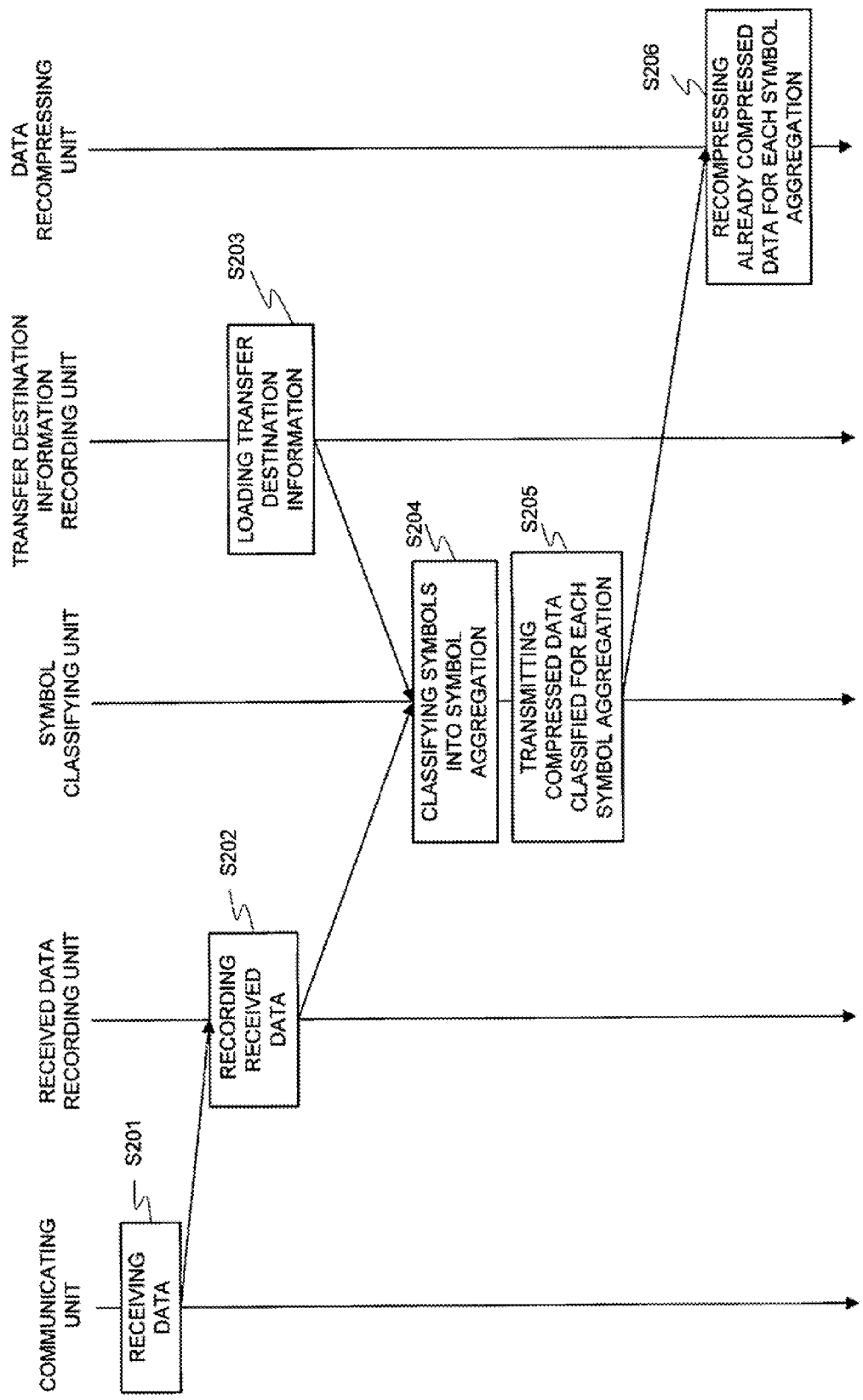
FIG. 10 is a flowchart illustrating an example of an operation of the data relaying device.
Figure 11:
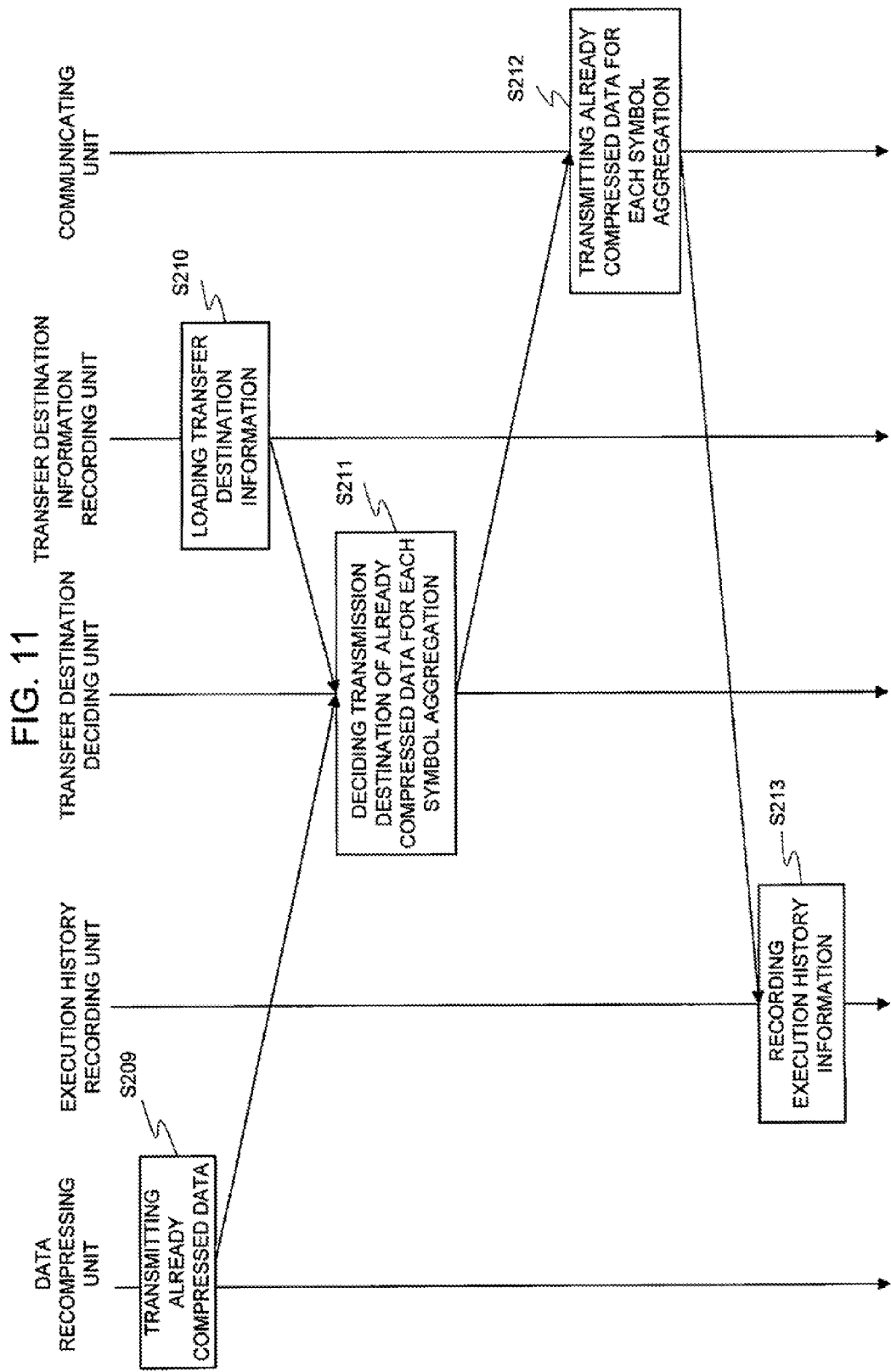
FIG. 11 is a flowchart illustrating an example of an operation of the data relaying device.

Next, an operation of the data relaying device will be explained by making a reference to FIG. 3, FIG. 10, and FIG. 11. Each of FIG. 10 and FIG. 11 is a flowchart illustrating an example of an operation of the data relaying device.

The data relaying device firstly receives the already compressed data from the low-place data relaying device group via the communicating unit 41 (step S201). Additionally, the data relaying devices of the lowest-place hierarchy (in an example shown in FIG. 1, the data relaying device 3,1 to the data relaying device 3,5) receive the already compressed data from the data compressing device via the communicating unit 41.

After the step S201, the data relaying device causes the received data recording unit 42 that the data relaying device includes to store the already compressed data received in S201 by the communicating unit 41. This operation is performed, for example, by the CPU that the data relaying device includes. Further, this CPU causes the received data recording unit 42 to store, together with the received already compressed data, the receiving time as well of the above already compressed data.

Next, the symbol classifying unit 43 loads the transfer destination information stored in the transfer destination information recording unit 45 (step S203). After the S203, the symbol classifying unit 43 converts the compressed codes into the symbols by employing the data conversion information within the already compressed data, and classifies respective symbols obtained by the conversion into the symbol aggregation that has been defined for each data relaying device, being a transfer destination, in the transfer destination information loaded in S203 (step S204).

Next, the symbol classifying unit 43 transmits the already compressed data and the symbol classified in S204 to the data recompressing unit 44 (step S205). At this time, the symbol classifying unit 43 classifies the code, data conversion information, and data analysis result as well contained in the already compressed data in line with the symbol, and transmits them to the data recompressing unit 44.

After receiving the already compressed data from the symbol classifying unit 43 in S205, the data recompressing unit 44 performs the recompressing process for the already compressed data transmitted in S205 by the symbol classifying unit 43 for each symbol aggregation (step S206).

After the already compressed data has been generated in the recompressing process of S206, the data recompressing unit 44 transmits the above already compressed data to the transfer destination deciding unit 46 (step S209). Next, the transfer destination deciding unit 46 loads the transfer destination information from the transfer destination information recording unit 45 (step S210), and decides the destination to which the already compressed data acquired in S209 is transmitted (step S211). Next, the transfer destination deciding unit 46 transmits the already compressed data to the device, being a destination, by employing the communicating unit 41 (step S212). Continuously, the transfer destination deciding unit 46 causes the execution history recording unit 471 that the symbol aggregation clustering information acquiring unit 47 includes to store the execution history information containing the communication speed at the time of transmitting the already compressed data or the like (step S213).

Figure 12:
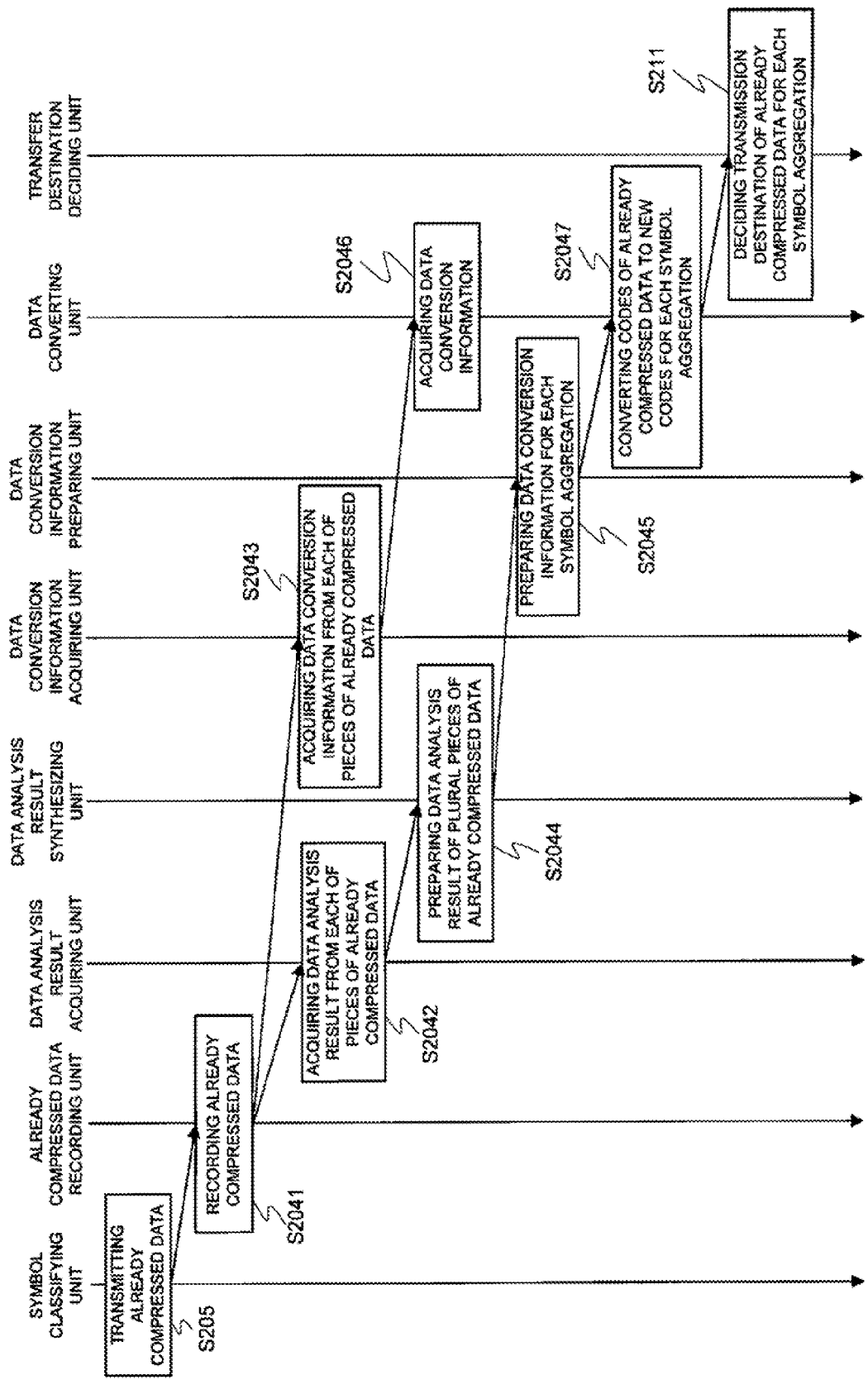
FIG. 12 is a flowchart illustrating an example of an operation of the recompressing means.

Next, an operation of the recompressing unit 44 that the data relaying device includes will be explained by making a reference to FIG. 5 and FIG. 12. FIG. 12 is a flowchart illustrating an example of an operation of the recompressing unit 44.

At first, the already compressed data recording unit 441 within the data recompressing unit 44 records the already compressed data sent in S205 from the symbol classifying unit 43 (step S2041).

The data analysis result acquiring unit 442 acquires the data analysis result symbol aggregation by symbol aggregation from the already compressed data recording unit 441 (step S2042).

Next, the data conversion information acquiring unit 444 acquires the data conversion information symbol aggregation by symbol aggregation from the already compressed data recording unit 441 (step S2043).

The data analysis result synthesizing unit 443 prepares the data analysis result for the already compressed data within the symbol aggregation from the by-symbol-aggregation data analysis result acquired in S2042 by the data analysis result acquiring unit 442 (step S2044). At this time, it may derive the total number of the codes.

Next, the data conversion information preparing unit 445 preparers new data conversion information symbol aggregation by symbol aggregation from the data analysis result for the already compressed data with the symbol aggregation prepared in S2044 by the data analysis result synthesizing unit 443 (step S2045). It may employ the total number of the codes when preparing the new data conversion information.

The data converting unit 446 acquires the by-symbol-aggregation data conversion information (old data conversion information) acquired in S2043 by the data conversion information acquiring unit 444, and further, acquires the by-symbol-aggregation data conversion information (new data conversion information) prepared in S2045 by the data conversion information preparing unit 445 (step S2046). And, the data converting unit 446 replaces the codes listed in the old data conversion information with the codes listed in the new data conversion information with regard to the codes of the already compressed data recorded in the already compressed data recording unit 441. And, the data converting unit 446 generates the already compressed data containing the above code, the new data conversion information, and the new data analysis result prepared in the step S2044. The data converting unit 446 transmits the above already compressed data to the transfer destination deciding unit 46 (step S2047). Thereafter, the transfer destination deciding unit 46 performs the operation of the step S211 already explained.

Figure 13:
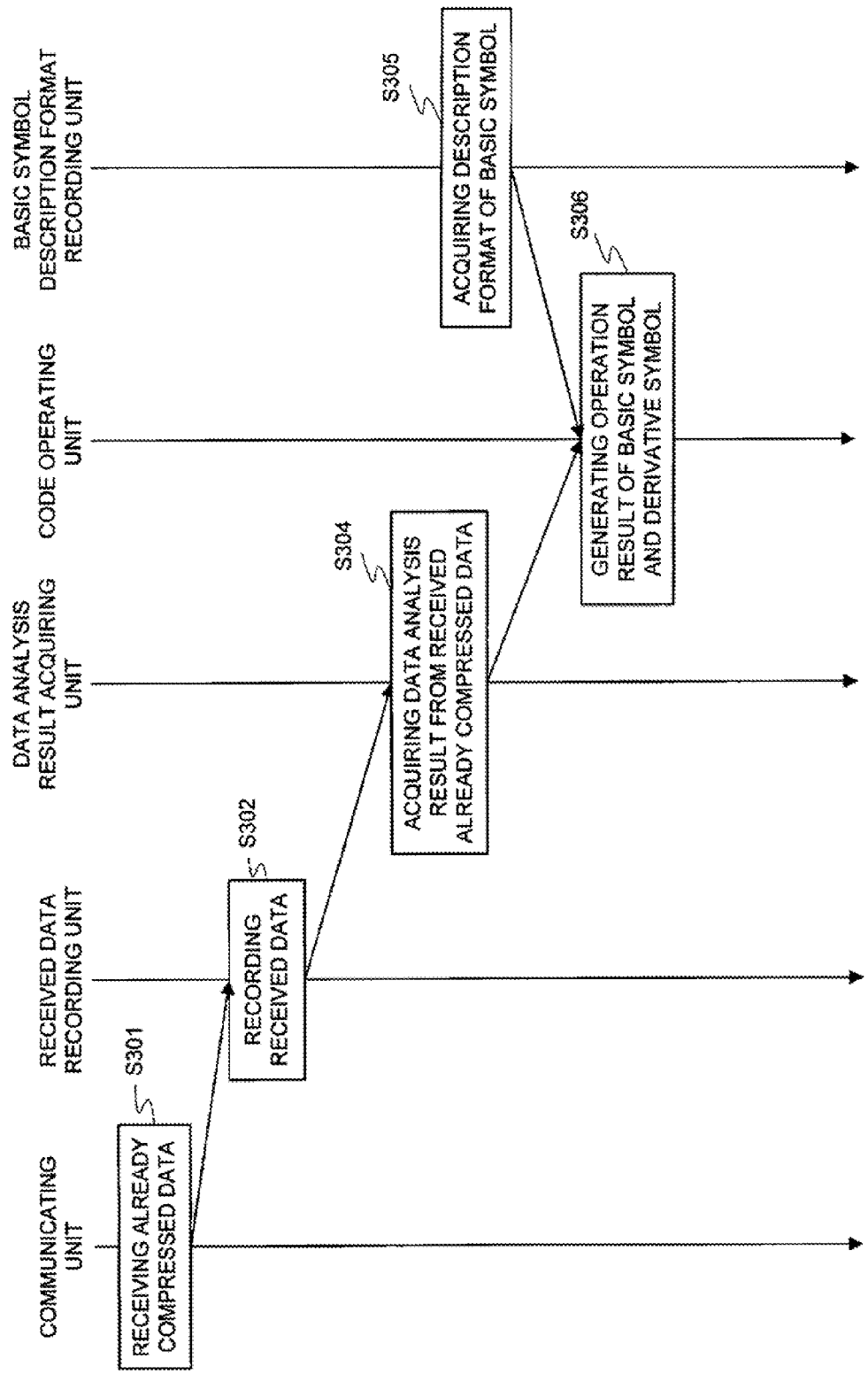
FIG. 13 is a flowchart illustrating an example of an operation of the data collecting device.
Figure 14:
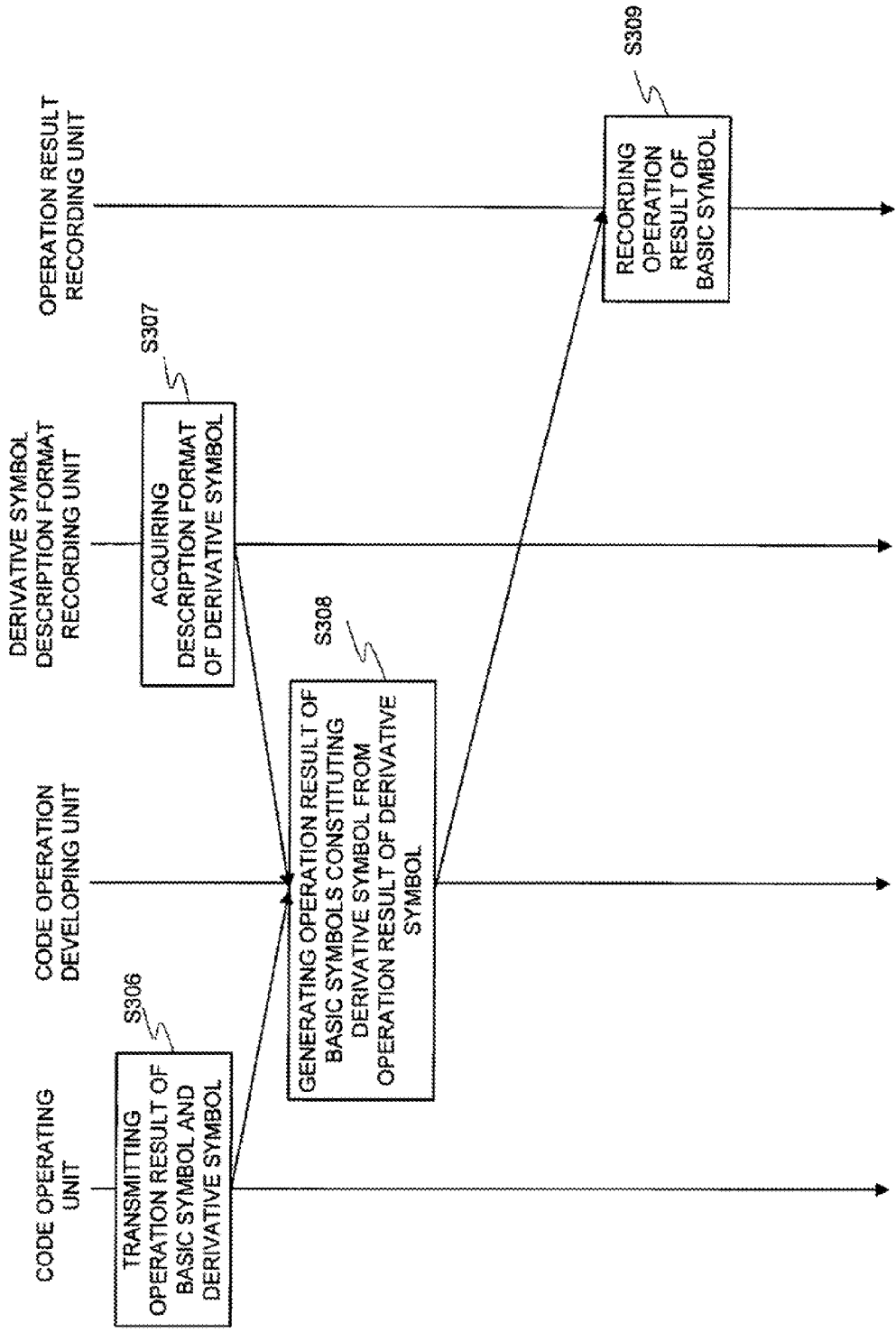
FIG. 14 is a flowchart illustrating an example of an operation of the data collecting device.

Next, an operation of the data collecting device 7 will be explained by making a reference to FIG. 6, FIG. 13 and FIG. 14. Each of FIG. 13 and FIG. 14 is a flowchart illustrating an example of an operation of the data collecting device 7.

At first, the communicating unit 11 receives the already compressed data from the data relaying devices of which the hierarchy number is smallest (i.e. the data relaying devices of the highest-place hierarchy) (step S301), and causes the received data recording unit 12 to store the already compressed data (step S302). The operation of causing the received data recording unit 12 to store the already compressed data is performed, for example, by the CPU that the data collecting device 7 includes. The data analysis result acquiring unit 13 acquires the data analysis result from the already compressed data recorded in the receive data recording unit 12 (step S304).

The code operating unit 14 acquires the symbol description information from the basic symbol description format recording unit 15, and acquires the description format of the derivative symbol expressed in a combination of the basic symbols recorded in the dictionary data from the derivative symbol format recording unit 17 (step S305).

Next, the code operating unit 14 derives the statistical value (for example, the frequency table) of the symbols recorded in the data conversion information contained in the already compressed data from the data analysis result acquired in S304 by the data analysis result acquiring unit 13. And the code operating unit 14 computes the statistical value (for example, the frequency table) of the basic symbols and the derivative symbols by making a reference to the symbol description information acquired in S305 (step S306).

Next, the code operation developing unit 16 acquires a combination of the basic symbols constituting the derivative symbol from the derivative symbol description format recording unit 17 (step S307), and computes the statistical value of the basic symbols constituting the derivative symbol from the statistical value of the derivative symbols computed in S306 by the code operating unit 14. The code operation developing unit 16 couples the statistical value of the basic symbols and the statistical value of the basic symbols computed in S306 by the code operating unit 14, and newly computes the statistical value of the basic symbols (step S308).

Finally, the code operation developing unit 16 records the statistical value of the basic symbols computed in S308 into the operation result recording unit 18 (step S309).

Figure 15:
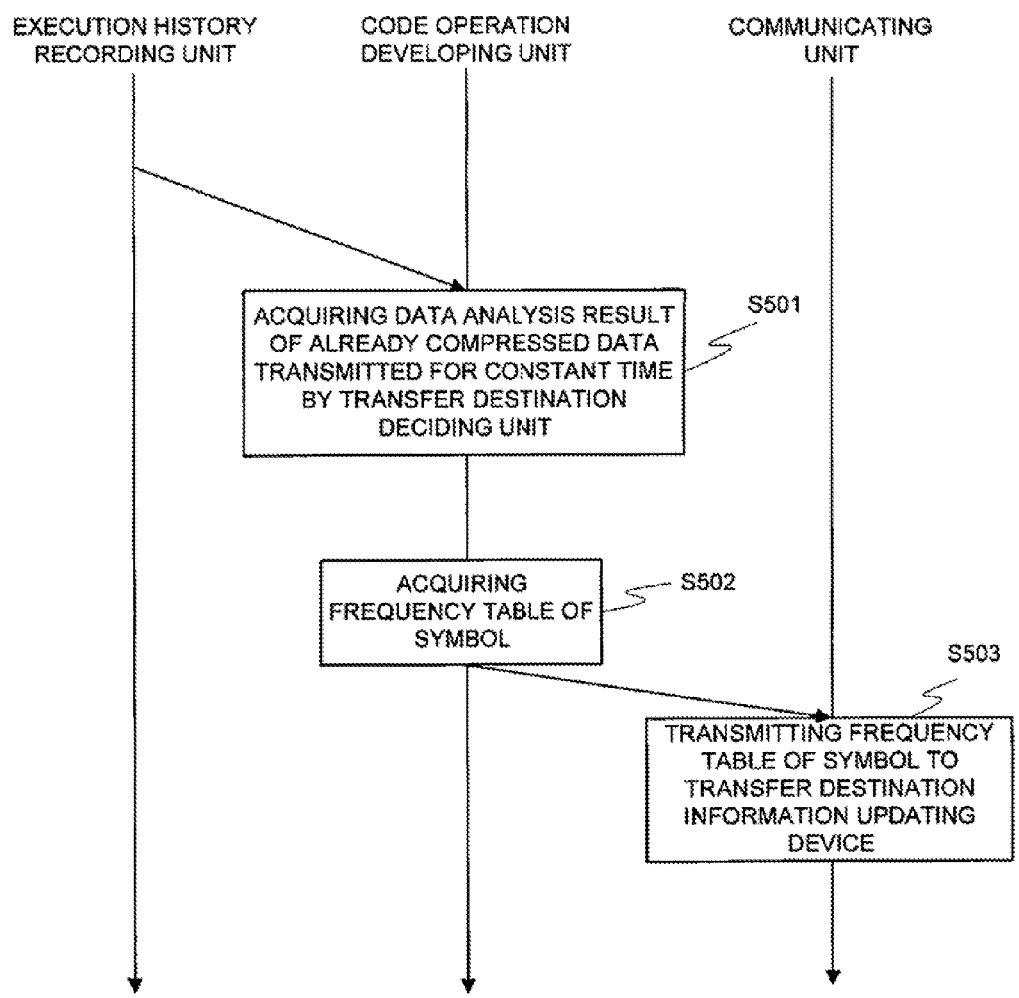
FIG. 15 is a flowchart illustrating an example of an operation of the symbol aggregation clustering information collecting means.
Figure 16:
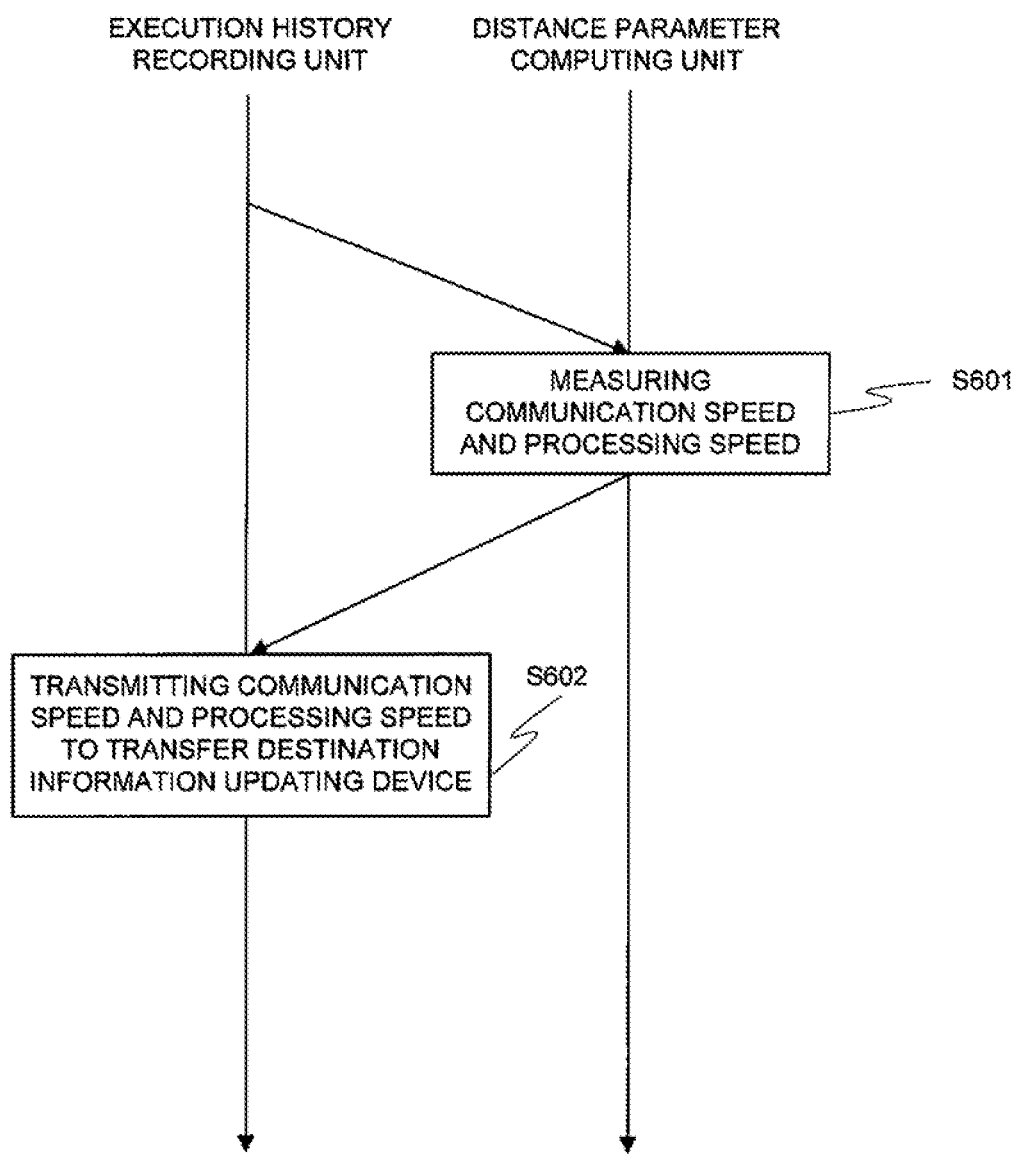
FIG. 16 is a flowchart illustrating an example of an operation of the symbol aggregation clustering information collecting means.

Next, an operation of the symbol aggregation clustering information collecting unit 47 that the data relaying device includes will be explained by making a reference to FIG. 4, FIG. 15 and FIG. 16. Each of FIG. 15 and FIG. 16 is a flowchart illustrating an example of an operation of the symbol aggregation clustering information collecting unit 47.

The compression information acquiring unit 473 acquires the execution history information recorded in the execution history recording unit 471, and acquires the data analysis result of the already compressed data processed for a constant time by the transfer destination deciding unit 46 from the acquired execution history information (step S501).

Further, the compression information acquiring unit 473 acquires the frequency table of the symbol (step S502). When the frequency table of the symbol has been derived as a data analysis result, the data analysis result acquired in step S501 becomes a frequency table of the symbol. Further, when the information other than the frequency table of the symbol has been derived as a data analysis result, the symbol classifying unit 43 (see FIG. 3) generates the frequency table of the symbol. In this case, the compression information acquiring unit 473 acquires the frequency table of the symbol from the symbol classifying unit 43 (step S502).

The compression information acquiring unit 473 transmits the frequency table of the symbol to the transfer destination information updating device 5 by employing the communicating unit 41 (step S503).

The distance parameter computing unit 472 acquires the communication speed (communication speed at the time of transmitting the already compressed data) being contained in the execution history information that the transfer destination deciding unit 46 has caused the execution history recording unit 471 to store. Further, the distance parameter computing unit 472 acquires the size of the already compressed data generated in the recompressing process, and the time required for the recompressing process from the above execution history information. And, the distance parameter computing unit 472 divides the size of the already compressed data by the time required for the recompressing process, thereby to compute the processing speed of the recompressing process (step S601). The result of the division is a processing speed of the recompressing process.

Next, the distance parameter computing unit transmits the communication speed, the computed processing speed, and the data relaying device identification information and the hierarchy number contained in the execution history information to the transfer destination information updating device 5 (step S602).

The compression information acquiring unit 473 regularly performs the process of the steps S501 to S503, and the distance parameter computing unit 472 regularly performs the process of the steps S601 and S602.

Figure 17:
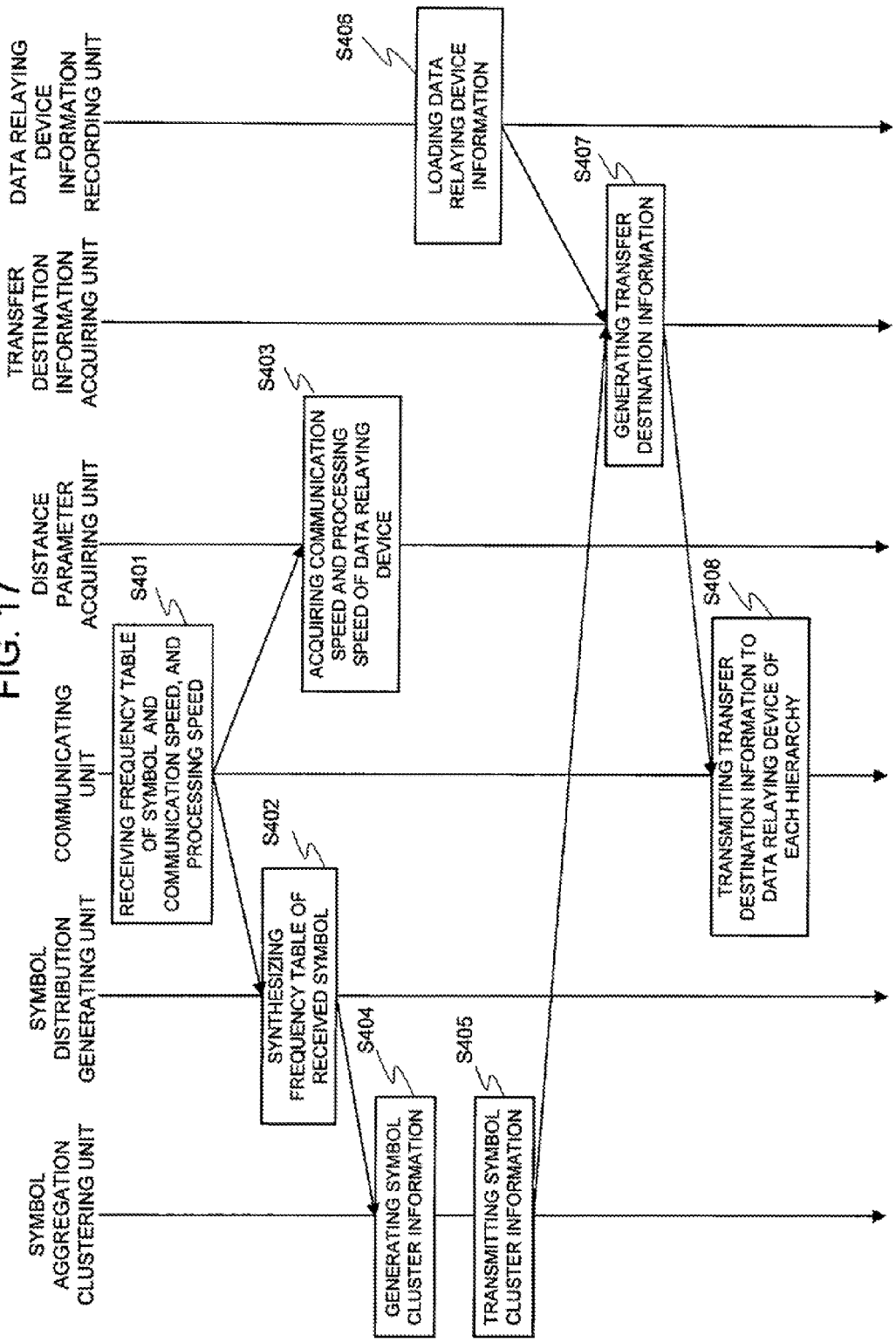
FIG. 17 is an explanatory view illustrating an example of an operation of the transfer destination information updating device.

Next, an operation of the transfer destination information updating device 5 in this embodiment will be explained by making a reference to FIG. 7 and FIG. 17. FIG. 17 is an explanatory view illustrating an example of an operation of the transfer destination information updating device 5.

At first, the communicating unit 51 receives the frequency table of the symbol within the already compressed data from the compression information acquiring unit 473 that each data relaying device includes. Further, the communicating unit 51 receives the processing speed of the compressing process or the recompressing process in each data relaying device, the communication speed of the process of transmitting the already compressed data, the data relaying device identification information, and the hierarchy number of the hierarch to which the data relaying device belongs from the distance parameter computing unit 472 that each data relaying device includes (step S401).

Next, the symbol distribution generating unit 53 acquires a plurality of the frequency tables of the symbols received in the step S401 by the communicating unit 51, and synthesizes them into one frequency table (step S402). The symbol distribution generating unit 53 performs the process of the step S402 hierarchy by hierarchy. That is, it synthesizes a plurality of the frequency tables into one frequency table hierarchy by hierarchy. In the step S402, it generates the frequency table of the symbol within the data received for a constant time by all data relaying devices. Further, the distance parameter acquiring unit 52 acquires the communication speed and the processing speed received in the step S401 by the communicating unit 51 (step S403).

Figure 18:
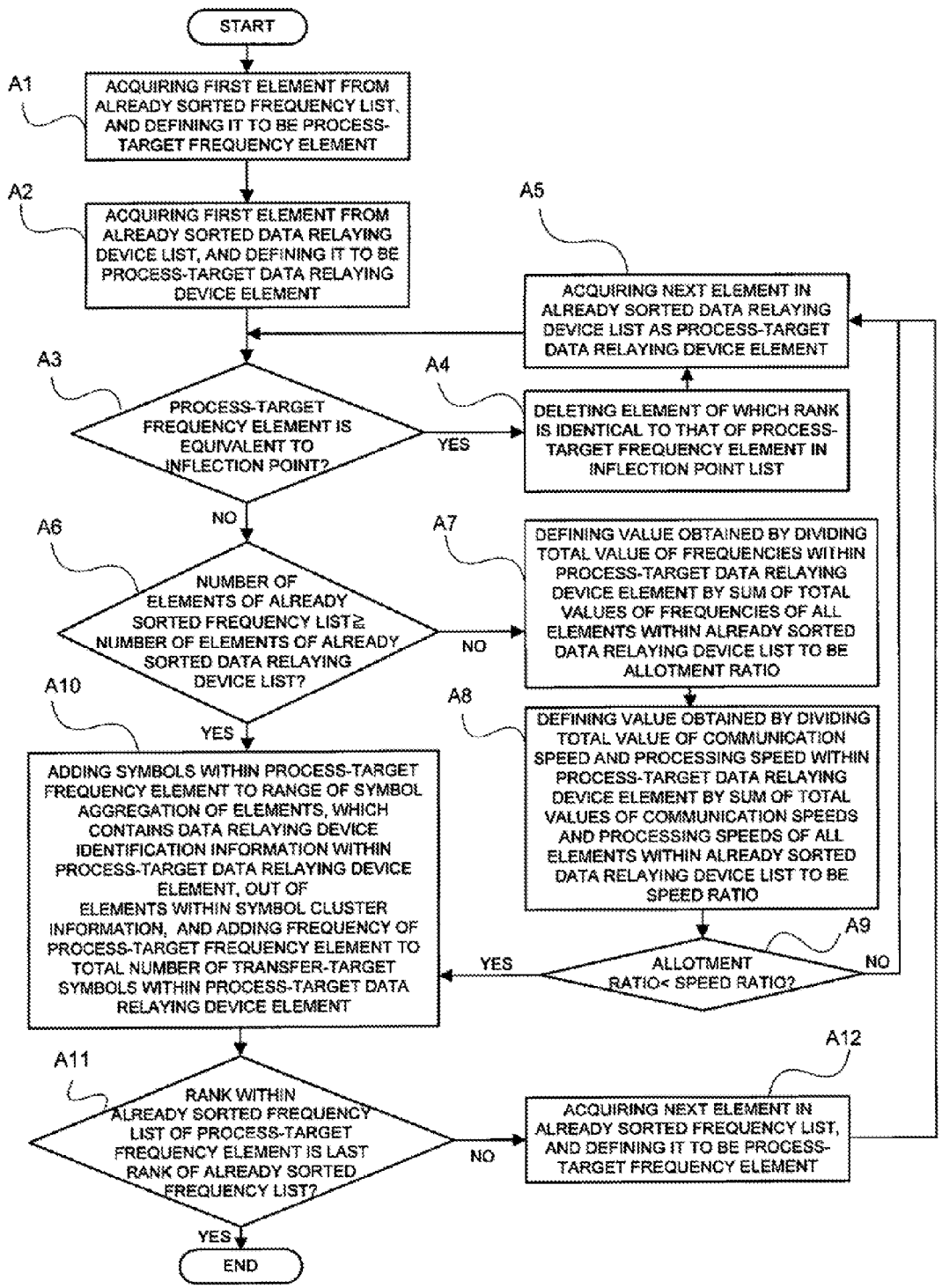
FIG. 18 is a flowchart illustrating an example of an operation of generating the symbol cluster information.

Next, the symbol aggregation clustering unit 54 generates the symbol cluster information (step S404). FIG. 18 is a flowchart illustrating an example of an operation of generating the symbol cluster information. The symbol aggregation clustering unit 54 performs an operation shown below before commencing the process of step A1 shown in FIG. 18.

The symbol aggregation clustering unit 54 sorts a combination of the symbol and the frequency of the above symbol in the descending order of the frequency in the frequency table (the frequency table generated in the step S402) in which the symbol and the frequency (the number of times of the appearances) of the symbol have been caused to correspond to each other. The frequency table sorted in such a manner is called an already sorted frequency list. FIG. 19 is an explanatory view illustrating an example of the already sorted frequency list. The symbol aggregation clustering unit 54 sorts a combination of the symbol and the frequency of the above symbol in the descending order of the frequency, and affixes the rank to each element (herein, a combination of the symbol and the frequency of the above symbol), thereby to generates the already sorted frequency list.

Additionally, FIG. 19, and FIG. 20 to FIG. 23 shown below are an exemplification of each item of the information, respectively.

Further, the symbol aggregation clustering unit 54 extracts the data relaying device identification information of the data relaying devices to which the identical hierarchy number has been allotted from the received communication speed, processing speed, hierarchy number, and data relaying device identification information, and generates the information in which the data relaying device identification information has been listed hierarchy by hierarchy. In addition, the symbol aggregation clustering unit 54 prepares the information in which the listed data relaying device identification information, the total value of the communication speed and the processing speed corresponding to the data relaying device identification information, and the total number of the symbols each of which is a target of transfer have been caused to correspond to each other, and sorts a combination of the listed data relaying device identification information, the total value of the communication speed and the processing speed, and the total number of the symbols each of which is a target of transfer in the descending order of the total value of the communication speed and the processing speed. The symbol aggregation clustering unit 54 affixes the after-sorting rank to each of these combinations. The information prepared in such a manner is referred to as an already sorted data relaying device list. The symbol aggregation clustering unit 54 extracts the data relaying device identification information for each identical hierarchy, and prepares the already sorted data relaying device list hierarchy by hierarchy. Thus, it follows that the symbol aggregation clustering unit 54 generates the already sorted data relaying device lists of which the list number is equal to the number of the hierarchies of the data relaying devices.

FIG. 20 is an explanatory view illustrating an example of the already sorted data relaying device list. FIG. 20 exemplifies the already sorted data relaying device list of the hierarch number 2. Herein, the total number of the symbols each of which is a target of transfer is a total value of the frequencies of the symbols that are transferred to the data relaying devices. When the symbol aggregation clustering unit 54 generates the already sorted data relaying device list, it defines the total number of the symbols each of which is a target of transfer to be "0". That is, the already sorted data relaying device list is generated with an initial value of the total number of the symbols each of which is a target of transfer defined to be 0 (zero).

Next, the symbol aggregation clustering unit 54 derives the inflection point list from the already sorted frequency list. The inflection point list is derived, for example, as described below. At first, the symbol aggregation clustering unit 54 generates a first-order differential value list from the already sorted frequency list, and in addition, generates a second-order differential value list from the first-order differential value list.

The symbol aggregation clustering unit 54 subtracts the frequency of the symbol of which the rank is an n-th place from the frequency of symbol of which the rank is an (n+1)-th place in the already sorted frequency list, and decides the rank of its subtraction result (referred to be as a first-order differential value) to be an n-th place. The symbol aggregation clustering unit 54 continues this process in the order of n=1, 2, . . . until the process of the subtraction is completed. The information obtained as a result is called a first-order differential value list. FIG. 21 is an explanatory view illustrating an example of the first-order differential value list. In FIG. 21, for example, the rank of "0", being a result of having subtracted the frequency "400" of the first-place symbol from the frequency "400" of the second-place symbol exemplified in FIG. 19, is defined to be a first place. The other first-order differential values shown in FIG. 21 are also values similarly derived.

In addition, the symbol aggregation clustering unit 54 subtracts the first-order differential value of which the rank is a n-th place from the first-order differential value of which the rank is an (n+1)-th place in the first-order differential value list, and decides the rank of its subtraction result (referred to be as a second-order differential value) to be an n-th place. The symbol aggregation clustering unit 54 continues this process in the order of n=1, 2, . . . until the process of the subtraction is completed. The information obtained as a result is called a second-order differential value list. FIG. 22 is an explanatory view illustrating an example of the second-order differential value list. In FIG. 22, for example, the rank of "−300", being a result of having subtracted the first-place first-order differential value "0" from the second-place first-order differential value "−300" exemplified in FIG. 21, is defined to be a first place. The other second-order differential values shown in FIG. 22 are also values similarly derived.

In addition, when a mark of the second-order differential value has been changed from that of the second-order differential value that ranks higher by one in the second-order differential value list, the symbol aggregation clustering unit 54 extracts the rank of the second-order differential value of which the mark has been changed. The symbol aggregation clustering unit 54 extracts the rank of the second-order differential value of which the mark has been changed in the order of the rank of the second-order differential value list, and decides the new rank for the extracted rank in the order of extraction. For example, in the second-order differential value list shown in FIG. 22, the mark of "the second-place" second-order differential value is positive, and a change from the mark of the first-place second-order differential value (negative) has occurred. Thus, the symbol aggregation clustering unit 54 extracts the above rank "second place" as an inflection point. Further, when a determination is made as to which rank is extracted as an inflection point in the order of the second-order differential value list, to begin with the first place, the above-mentioned "second place" is an inflection point that has been firstly extracted, so the rank of the above inflection point "second place" is newly decided to be a first place. The information of the inflection point and its rank acquired at the time of having completed the extraction of the inflection point is referred to as an inflection point list. FIG. 23 is an explanatory view illustrating one example of the inflection point list derived as described above.

Further, the symbol aggregation clustering unit 54 firstly generates the part in which the hierarchy number and the data relaying device identification information have been caused to correspond to each other, out of the symbol cluster information. While the symbol cluster information is generated by causing the hierarchy number, the symbol aggregation, the data relaying device identification information of the data relaying device that ranks by one higher than the above hierarchy number to correspond to each other, the symbol aggregation clustering unit 54 firstly generates the part in which the hierarchy number and the data relaying device identification information have been caused to correspond to each other with an initial value of the symbol aggregation defined to be an empty aggregation.

Next, the symbol aggregation clustering unit 54 executes the process of steps A1 to A12 shown in FIG. 18. The process of the steps A1 to A12 below is executed hierarchy by hierarchy by employing the already sorted frequency list, the already sorted data relaying device list, and the inflection point lists each of which has been generated hierarchy by hierarchy.

The symbol aggregation clustering unit 54 acquires the first (first-place) element from the already sorted frequency list (step A1). The so-called element in the already sorted frequency list is a combination of "the rank", "the symbol", and "the frequency" for each rank (see FIG. 19). In the step A1, the symbol aggregation clustering unit 54 acquires a combination the rank, "being a first place", and "the symbol" and "the frequency" corresponding to the above rank. The element (a combination of "the rank, "the symbol", and "the frequency") that is acquired from the already sorted frequency list in the step A1 and the step A12 to be later described is referred to as a process-target frequency element. For example, when the already sorted frequency list exemplified in FIG. 19 has been prepared, the symbol aggregation clustering unit 54 acquires a combination of the rank "first place", the symbol "1111" and the frequency "400" as a process-target frequency element in the step A1.

Continuously, the symbol aggregation clustering unit 54 acquires the first (first-place) element from the already sorted data relaying device list (step A2). The so-called element in the already sorted data relaying device list is a combination of "the rank", "the data relaying device", "the total value of the communication speed and the processing speed", and "the total number of the transfer-target symbols" for each rank (see FIG. 20). In the step A2, the symbol aggregation clustering unit 54 acquires a combination of the rank, being "a first place", "the data relaying device" corresponding to the above rank, "the total value of the communication speed and the processing speed" and "the total number of the transfer-target symbols". The element (a combination of "the rank", "the data relaying device", "the total value of the communication speed and the processing speed", and "the total number of the transfer-target symbols") that is acquired from the already sorted data relaying device list in the step A2 and the step A5 to be later described is referred to as a process-target data relaying device element. For example, when the already sorted data relaying device list exemplified in FIG. 20 has been prepared, the symbol aggregation clustering unit 54 acquires a combination of the rank "first place", the data relaying device identification information "2,1" the total value of the communication speed and the processing speed "210", and the total number of the transfer-target symbols "0" as a process-target data relaying device element in the step A2.

After the step A2, the symbol aggregation clustering unit 54 determines whether or not the rank in the already sorted frequency list of the process-target frequency element coincides with the element (inflection point) within the inflection point list (step A3). For example, when a combination of the rank "first place", the symbol "1111" and the frequency "400" has been acquired as a process-target frequency element, and the inflection point list exemplified in FIG. 23 has been prepared, the symbol aggregation clustering unit 54 determines whether or not the rank (first place) of the process-target frequency element coincides with the inflection point ("2" in an example of FIG. 23) within the inflection point list. In this example, it is determined that they do not coincide with each other.

When the rank in the already sorted frequency list of the process-target frequency elements coincides with the element (inflection point) within the inflection point list in the step A3 (yes of the step A3), the symbol aggregation clustering unit 54 deletes the element (inflection point) with which the rank of the process-target frequency element coincides from the inflection point list (step A4). Continuously to the step A4, the symbol aggregation clustering unit 54 acquires the element of the rank obtained by adding 1 (one) to the rank of the process-target data relaying device element recently acquired (the rank lower by one than that of recently acquired process-target data relaying device element) as a process-target data relaying device element from the already sorted data relaying device list (step A5). The process-target data relaying device element being acquired in the step A5 is also a combination of "the rank", "the data relaying device", "the total value of the communication speed and the processing speed", and "the total number of the transfer-target symbols". After the step A5, the symbol aggregation clustering unit 54 proceeds to the step A3, and repeats the process of the step A3 and the steps subsequent hereto.

When the rank in the already sorted frequency list of the process-target frequency elements does not coincide with the element (inflection point) within the inflection point list in the step A3 (no of the step A3), the symbol aggregation clustering unit 54 compares the number of the elements of the already sorted frequency list with the number of the elements of the already sorted data relaying device list, and determines whether or not the number of the elements of the already sorted frequency list is larger than the number of the elements of the already sorted data relaying device list (step A6). For example, it is assumed that the already sorted frequency list exemplified in FIG. 19 and the already sorted data relaying device list exemplified in FIG. 20 have been prepared. In this case, the number of the elements of the already sorted frequency list exemplified in FIG. 19 is "5", and the number of the elements of the already sorted data relaying device list exemplified in FIG. 20 is "3". The symbol aggregation clustering unit 54 compares these two elements, and determines whether or not the number of the elements of the already sorted frequency list is larger than the number of the elements of the already sorted data relaying device list. In the case of the foregoing exemplification, it results in being determined that the number of the elements of the already sorted frequency list is larger than the number of the elements of the already sorted data relaying device list.

When the number of the elements of the already sorted frequency list is less than the number of the elements of the already sorted data relaying device list in the step A6 (no of the step A6), the symbol aggregation clustering unit 54 divides the total value (i.e. the total number of the transfer-target symbols) of the frequencies within the process-target data relaying device element by a sum of the total numbers of the frequencies within all elements of the already sorted data relaying device list (i.e. a sum of the total numbers of the transfer-target symbols), and obtains a value of its division result (this value is referred to as an allotment ratio) (step A7).

After the step A7, the symbol aggregation clustering unit 54 divides "the total value of the communication speed and the processing speed" within the process-target data relaying device element by a sum of "the total values of the communication speeds and the processing speeds" within all elements of the already sorted data relaying device list, and obtains a value of its division result (this value is referred to as a speed ratio) (step A8).

After the step A8, the symbol aggregation clustering unit 54 determines whether or not the allocation ratio is less than the speed ratio (step A9).

When the allocation ratio is less than the speed ratio in the step A9 (yes of the step A9), the symbol aggregation clustering unit 54 adds "the symbol" being contained in the process-target frequency element to "the symbol aggregation" that corresponds to the data relaying device identification information within the process-target data relaying device element in the symbol cluster information. In addition, the symbol aggregation clustering unit 54 adds the value of the frequency being contained in the process-target frequency element to the total number of the transfer-target symbols within the process-target data relaying device element (step A10).

Further, when the allocation ratio is equal to or more than the speed ratio in the step A9 (no of the step A9), the symbol aggregation clustering unit 54 proceeds to the step A5, and repeats the process of the step A5 and the steps subsequent hereto.

Further, after the step A10, the symbol aggregation clustering unit 54 investigates the number of the elements of the already sorted frequency list, and determines whether or not the rank of the process-target frequency element is the last rank of the already sorted frequency list (step A11). When the rank of the process-target frequency element is the last rank (i.e. the lowest-place rank) of the already sorted frequency list (yes of the step A11), the process is finished.

When the rank of the process-target frequency element is not the last rank of the already sorted frequency list (no of the step A11), the symbol aggregation clustering unit 54 acquires the element of the rank obtained by adding 1 (one) to the rank of the process-target frequency element recently acquired (the rank that is by one lower than that of the process-target frequency element recently acquired), and defines the above element to be a process-target frequency element (step A12). After the step A12, the symbol aggregation clustering unit 54 proceeds to the step A5, and repeats the process of the step A5 and the steps subsequent hereto.

The symbol cluster information is obtained by performing the process shown in FIG. 18 hierarch by hierarchy.

Performing an operation of the step A1 to A12 allows a plurality of the symbols sectioned by the inflection point in the already sorted frequency list to be equally transferred to the data relaying device. As a result, a deviation in the frequency table of the symbol that corresponds to the codes being transferred to the data relaying device becomes larger as compare with a deviation in the already sorted frequency list because the total number of the frequencies is decreased while a tendency of an increase in the frequency attended by a rise in the rank in the already sorted frequency list is maintained. Further, performing an operation of the step A1 to A12 allows the symbol cluster information to be generated so that a magnitude relation of the total number of the codes being transferred to the data relaying device between the data relaying devices coincides with a magnitude relation of the total value of the communication speed and the processing speed of the data relaying device, thereby enabling a deviation of the processing loads imposed upon the data relaying devices of the identical hierarchy number to be alleviated.

With the operation above, the symbol cluster information satisfying the first condition and the second condition already explained is generated, and the symbol cluster information generation of the step S404 is completed.

Further, omitting an operation of the foregoing step A6 allows a ratio of the frequency of the symbol being transferred to the data relaying device to come close to a ratio of the total value of the communication speed and the processing speed of the data relaying device, thereby making it possible to give the processing speed precedence over the compression ratio.

After the step S404, the symbol aggregation clustering unit 54 sends the symbol cluster information to the transfer destination information generating unit 55, and the transfer destination information generating unit 55 acquires the above symbol cluster information (step S405). Further, the transfer destination information generating unit 55 loads the data relaying device information from the data relaying device information recording unit 56 (step S406). Next, the transfer destination information generating unit 55 converts the data relaying device identification information within the symbol cluster information acquired in the step S405 into the destination information caused to correspond to the identical data relaying device identification information within the data relaying device information acquired in the step S406, and divides it hierarchy number by hierarchy number, thereby to generate the transfer destination information in which the destination information of the upper-place data relaying device, out of the data relaying devices of each hierarchy, and the aggregation of the symbols being transmitted to the upper-place data relaying device have been caused to correspond to each other (step S407).

Finally, the transfer destination information generating unit 55 transmits the transfer destination information associated with the upper-place data relaying device groups to a plurality of the data relaying device groups constituting each hierarchy by employing the communicating unit 51 (step S408). Next, the communicating unit 41 of each data relaying device receives the transfer destination information transmitted in the step S408, and, for example, the CPU of each data relaying device causes the transfer destination information recording unit 45 to store the above transfer destination information.

In the explanation above, the case that the data compressing devices 1 to N5 were devices different from the data generating devices 1' to N5', respectively, was exemplified; however the data generating units 1' to N5' may be configured to have a function similar to the function of the data compressing devices 1 to N5, respectively.

Next, an effect of the present invention will be explained. In the present invention, the data compressing devices 1 to N5 are independent of the data relaying device 3,1 to the data relaying device 3,5 each of which has the largest hierarchy number, and further, one data compressing device is used for each of the data generating devices 1' to N5', whereby the compressing process time of the data generated by the data generating devices 1' to N5' is not increased even though a large number of the data generating devices exit.

Further, in the present invention, when recompressing the code being contained in the already compressed data, the data recompressing unit 44 converts the codes into the other codes based upon the data analysis result being contained in the already compressed data so as to recompress the data without converting the code into the symbol and recompressing the above symbol. Further, the new data conversion information indicative of a correspondence between the after-recompression code and the original symbol is prepared. Thus, the process of recompressing the data being collected can be performed at a high speed.

Further, in the present invention, when the already compressed data is transferred to the upper-place data relaying devices, the already compressed data is transferred to the data relaying device that corresponds to the symbol being converted from the code. At this time, the data relaying device, being a transfer destination, is decided by employing the transfer destination information derived based upon the symbol cluster information by the transfer destination information updating device. Thus, the communication amount at the time that the data collecting device 7 collects the data can be suppressed to a low level, and the data collection speed can be raised.

That is, the symbol aggregation clustering unit 54 (see FIG. 7) generates the symbol cluster information so that the data amount being transferred to the data relaying device is regulated responding to the communication speed and the processing speed of the data relaying device. At this time, the symbol cluster information is generated so that the appearance frequency of the specific bit string within the data being transferred to the data relaying device becomes numerous. And, the data compressed at a high speed, as described above, is transmitted to the upper-place data relaying devices based upon the transfer destination information generated by the transfer destination information updating device 5. Thus, the communication amount that is required at the moment of collecting the data from a plurality of the appliances can be reduced, and further, it can be realized that the speed of the recompressing process for furthermore recompressing the compressed data being collected is also made fast.

The data collecting device 7 for collecting the data includes the data analysis result acquiring unit 13 for acquiring the data analysis result obtained in the compressing process at the moment of compressing the collected already-compressed data, the basic symbol description format recording unit 15 for recording different description formats for the identical bit string in the already compressed data, and the derivative symbol description format recording unit 17 for recording a set of the derivative symbol that is configured of the identical bit string in the already compressed data, and a plurality of the symbols constituting the derivative symbol. The data collecting device 7 configured in such a manner performs the process such as the statistical operation for the bit string by employing the data analysis result generated at the time of compressing the data without expanding the collected already-compressed data for the time being, and then performing the operating process, thereby making it possible to quicken the operating speed of the derivation of the statistical value (for example, the frequency table) that the data collecting device carries out.

An example of the alteration to the above-mentioned embodiment will be explained below.

The data relaying devices of the lowest-place hierarchy (the data relaying device 3,1 to the data relaying device 3.5 in an example shown in FIG. 1) may be configured to include the data compressing devices 1 to N5. Such a configuration enables a rise in the cost attended by an increase in the number of the data generating devices to be suppressed because even though the number of the data generating devices is increased, there is no necessity for increasing the data compressing devise for performing the compressing process in line with the above increase.

Further, the data collection system may be configured to include a plurality of the transfer destination information updating devices 5. For example, it may include the transfer destination information updating devices 5 for each hierarchy of the data relaying device. Such a configuration enables the processing load imposed upon the transfer destination information updating device 5 to be dispersed.

EXAMPLE 1

Hereinafter, an example of the present invention will be explained by making a reference to the accompanied drawings.

In this example, the data collection system includes an RFID reader as the data generating devices 1' to N5', and includes a personal computer as the data compressing devices 1 to N5, the data collecting device 7, the data relaying devices (the data relaying device 1,1 to the data relaying device K,J), and the transfer destination information updating device 5. The RFID reader, being the data generating device, is connected to the data compressing devices 1 to N5 through a serial cable etc. Each of the data compressing device 1 to N5, the data relaying devices (the data relaying device 1,1 to the data relaying device K,J), the transfer destination information updating device 5, and the data collecting device 7 is connected to LAN by Ethernet, and makes communication by TCP/IP. ETHERNET is a Registered Trademark.

The personal computer, being the data compressing device, includes an Ethernet card that functions as the communicating unit 31, a magnetic disc device that functions as the received data recording unit 34 and the symbol dictionary recording unit 33, and a central processing device (CPU) that functions as the data compressing unit 32.

The personal computer, being the data relaying device, includes an Ethernet card that functions as the communicating unit 41, a magnetic disc device that functions as the received data recording unit 42, the transfer destination information recording unit 45, the already compressed data recording unit 441, and the execution history recording unit 471, and a central processing device that functions as the symbol classifying unit 43, the transfer destination deciding unit 46, the data analysis result acquiring unit 442, the data analysis result synthesizing unit 443, the data conversion information acquiring unit 444, the data conversion information preparing unit 445, the data converting unit 446, the distance parameter computing unit 472, and the compression information acquiring unit 473.

The personal computer, being the transfer destination information updating device 5, includes an Ethernet card that functions as a communicating unit 51, a magnetic disc device that functions as the data relaying device information recording unit 56, and a central processing device that functions as the distance parameter acquiring unit 52, the symbol distribution generating unit 53, the symbol aggregation clustering unit 54, and the transfer destination information generating unit 55.

The personal computer, being the data collecting device 7, includes an Ethernet card that functions as the communicating unit 11, a magnetic disc device that functions as the received data recording unit 12, the basic symbol description format recording unit 15, the derivative symbol description format recording unit 17, and the operation result recording unit 18, and a central processing device that functions as the data analysis result acquiring unit 13, the code operating unit 14, and the code operation developing unit 16.

Hereinafter, the case that the data relaying device 3,1 shown in FIG. 1 receives the already compressed data from the low-place device (herein the data compressing device 1 to N1) is exemplified for explanation.

FIG. 24 shows an example of the data being generated by each data generating device. In this example, the data that each of the data generating devices 1' to N5' generates is configured of the bit string that is comprised of 0 and 1 as shown in FIG. 24. In an example shown in FIG. 24, three symbols, i.e. "0000", "1111", and "0110" are contained. After each data compressing device acquires the data as exemplified in FIG. 24 from the data generating device, it performs the compressing process. FIG. 25 is an explanatory view illustrating an example of the dictionary data being stored by the magnetic storing device that functions as the symbol dictionary recording unit 33 of the data compressing device. In an example shown in FIG. 25, five bit string, i.e. "0000", "1111", "0110", and "1001", and "00001111" have been decided. Further, in this example, the case that the data compressing device derives the frequency table of the symbol as a data analyzing process of the compressing process, and performs the Huffman coding process as a data converting process is exemplified. The dictionary data exemplified in FIG. 25 has decided that the frequency (the number of times of the appearances) is obtained for the above-mentioned five bit strings (symbols), and the Huffman code is derived, thereby to make a conversion to the code.

FIG. 26 shows an example of the data analysis result and the data conversion information in this example. The data compressing unit 32 (the central processing device of the data compressing device) counts the number of times of the appearances (appearance frequency) of each symbol decided within the dictionary data, which exists within the data generated by the generating device, and obtains the by-symbol number of times of the appearances as a frequency table. FIG. 26(b) is an example of the frequency table that is obtained as a result.

Next, the data compressing unit 32 performs the Huffman coding process based upon the number of times of the appearances of each symbol that the above frequency table indicates, and derives the Huffman code of each symbol. And, it generates the information in which the symbol and the Huffman code have been caused to correspond to each other symbol by symbol as data conversion information. And, the data compressing unit 32 replaces the symbol being contained in the bit string generated by the data generating device with the code corresponding to the symbol (herein, the Huffman code) based upon the data conversion information, and derives code data exemplified in FIG. 26(a). In an example of the code data shown in FIG. 26(a), the code of which the code number goes as far as three is shown. The data compressing unit 32 replaces the symbol with the code in such a manner so as to compresses the data.

The data compressing unit 32 generates the data analysis result, the data conversion information, and the code data as exemplified in FIG. 26. The data compressing unit 32 generates the already compressed data containing the code data, the data analysis result, and the data conversion information, and transmits it to the data relaying device via the communicating unit 31. Additionally, the data compressing unit 32 may cause the already compressed data to contain information of the total number of the codes. FIG. 27 is an explanatory view illustrating an example of the data analysis result and the data conversion information generated by a plurality of the data compressing devices. It is assumed that the data compressing device 1 has generated the data analysis result and the data conversion information exemplified in FIG. 27(a). Hereinafter, these data analysis result and data conversion information are referred to as a data analysis result A1, and a data conversion information A1, respectively. Further, it is assumed that the data compressing device 2 has generated the data analysis result and the data conversion information exemplified in FIG. 27(b). Hereinafter, these data analysis result and data conversion information are referred to as a data analysis result A2, and a data conversion information A2, respectively.

Next, it is assumed that the personal computer, being the data relaying device in this example, receives the data analysis result A1, the data conversion information A1, and the code data as shown in FIG. 27(a) from the data compressing device 1 as the already compressed data, and likewise, receives the data analysis result A2, the data conversion information A2, and the code data as shown in FIG. 27(b) from the data compressing device 2.

It is assumed that the transfer destination information (the hierarchy number 3) shown in FIG. 28 has been recorded as transfer destination information in the magnetic disc device (the transfer destination information recording unit 45) within the personal computer, being the data relaying device in this example. However, in this example, it is assumed that the hierarchy of the data relaying device is the hierarchy 3, and the data relaying device having the hierarchy number 1 has stored the transfer destination information exemplified in FIG. 28(a). Likewise, it is assumed that the data relaying devices having the hierarchy number 2 and the hierarchy number 3 have stored the transfer destination information exemplified in FIG. 28(b) and in FIG. 28(c), respectively. Herein, for explanation, attention is paid to the data relaying device 3,1 storing the transfer destination information exemplified in FIG. 28(c).

Each symbol equivalent to the symbol aggregation is shown in a column of the symbol aggregation of each of the transfer destination information (the hierarchy number 1), the transfer destination information (the hierarchy number 2), and the transfer destination information (the hierarchy number 3) shown in FIG. 28. Further, the information in which the destination IP address and the destination port number have been coupled by means of the character of ":", being information of the destination to which the already compressed data of each symbol of the symbol aggregation is transferred, is shown in a column of the data relaying device destination information thereof.

The magnetic storing device (the received data recording unit 42) within the personal computer, being the data relaying device in this example (herein, the case of the hierarchy number 3 is exemplified), stores the already compressed data received from a plurality of the data compressing devices.

Next, the central processing device within the personal computer, being the data relaying device in this example, converts the codes within the already compressed data into the symbols by employing the data conversion information within the already compressed data recorded by the above magnetic storing device. Next, the central processing device of the data relaying device having the hierarchy number 3 extracts the symbols of "0000", "1111", and "00001111" as a symbol aggregation A, the symbol of "0110" as a symbol aggregation B, and the symbol of "1001" as a symbol aggregation C by making a reference to the transfer destination information shown in FIG. 28(*c*).

In this extraction operation, for example, performing only the determining process of the symbol "0110" and the symbol "1001" for the bit string within the data, and classifying the symbol, which is not decided to be "0110" or "1001", into the symbol aggregation A, makes it possible to execute the extraction operation at higher speed as compared with the case of classifying the symbol one by one. That is, in the ascending order of number of the symbols belonging to the symbol aggregation, specifying the symbols (symbols converted from the codes) belonging to the above symbol aggregation allows the classification to be carried out at a high speed.

With regard to the symbol aggregations A, B, and C, the code data corresponding hereto within the already compressed data received from the data compressing device 1, and the code data corresponding hereto within the already compressed data received from the data compressing device 2 are separately preserved within the magnetic storing device that operates as the already compressed data recording unit 441. For example, the code data corresponding to the symbol aggregation A within the already compressed data received from the data compressing device 1, and the code data corresponding to the symbol aggregation A within the already compressed data received from the data compressing device 2 are separately preserved. The situation of other symbol aggregations is also similar.

Next, the central processing device of the data relaying device performs the recompressing process symbol aggregation by symbol aggregation. Hereinafter, the details of the recompressing process will be explained by exemplifying the case of the symbol aggregation A.

Figure 29:
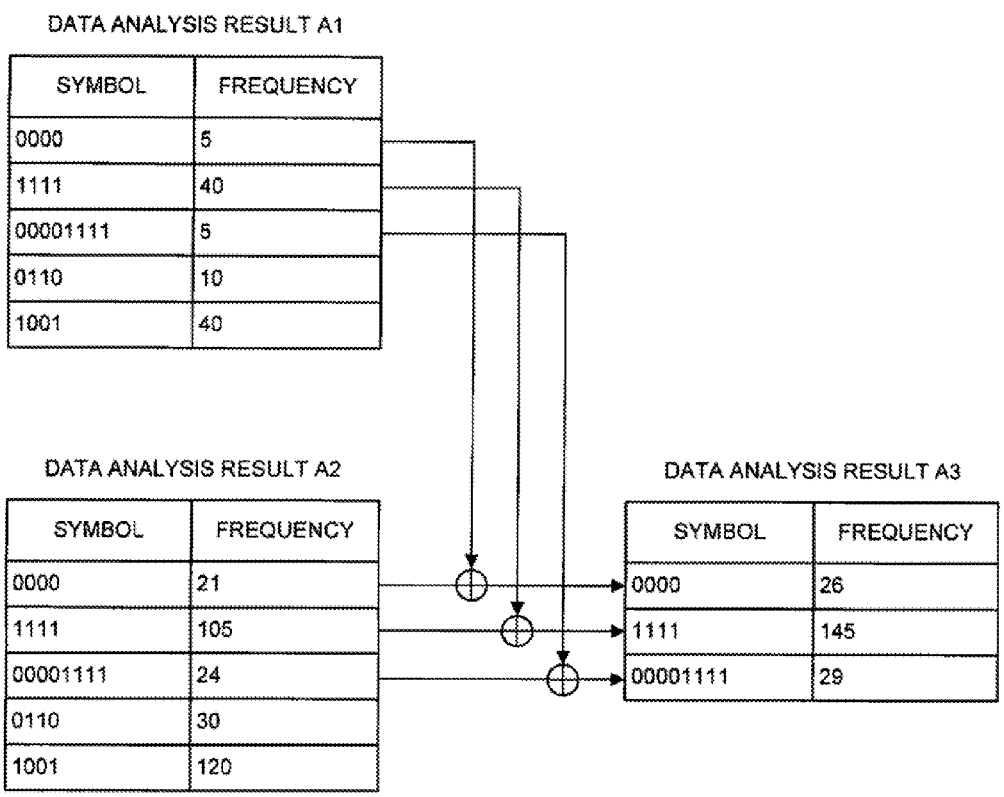
FIG. 29 is an explanatory view illustrating an example of generating one data analysis result from a plurality of the data analysis results.

FIG. 29 is an explanatory view illustrating an example of generating one data analysis result from a plurality of the data analysis results. The central processing device of the data relaying device acquires a plurality of the data analysis results from a plurality of pieces of the already compressed data as shown in FIG. 29, and generates one data analysis result. FIG. 29 shows the case of generating one data analysis result from the two data analysis results within the already compressed data. The central processing device of the data relaying device, for each symbol of the symbol aggregation A being contained in two data analysis results A1 and A2, calculates a sum of the frequency (the number of times of the appearances) of the above symbol. Specifically, it obtains a sum of the frequency of "0000" being contained in two data analysis results A1 and A2, and further, likewise, obtains a sum of the frequency, with regard to the other symbols "1111" and "00001111" as well belonging to the symbol aggregation A similarly to the above case, respectively. In such a manner, it derives one data analysis result A3 shown in FIG. 29.

Figure 30:
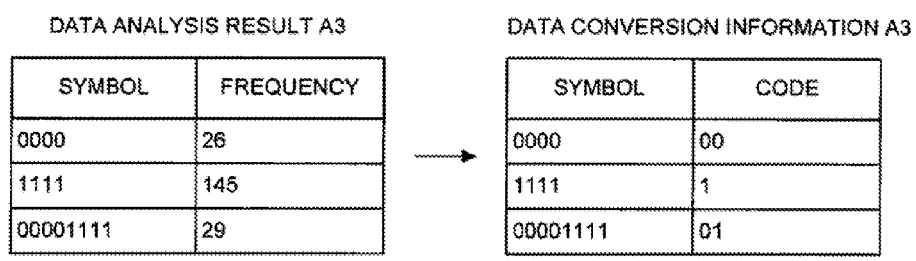
FIG. 30 is an explanatory view illustrating an example of the data conversion information.

And, the central processing device of the data relaying device performs the Huffman coding for each symbol (each symbol of the symbol aggregation A), and generates the data conversion information in which each symbol and the Huffman code have been caused to correspond each other from the data analysis result A3 shown in FIG. 29 as an operation equivalent to the data conversion information preparing unit 445. An example of the data conversion information A3 derived from the data analysis result A3 by performing the Huffman coding is shown in FIG. 30. Next, the above central processing device converts the code data within the already compressed data received from the devices that rank lower by one hierarchy into another code data shown in the new data conversion information by employing the data conversion information A1 and the data conversion information A3 as an operation equivalent to the data converting unit 446. In this example, the central processing device converts a code "0110" (see the data conversion information A1 shown in FIG. 27) corresponding to the symbol "0000" of the symbol aggregation A, being code data within the already compressed data received from the data compressing device 1, into a code "00" corresponding to "0000" in the new data conversion information A3. Likewise, it converts a code "1" (see the data conversion information A1 shown in FIG. 27) corresponding to the symbol "1111" of the symbol aggregation A into a code "1" corresponding to "1111" in the new data conversion information A3. Likewise, it converts "0111" (see the data conversion information A1 shown in FIG. 27) corresponding to the symbol "00001111" of the symbol aggregation A into a code "01" corresponding to "00001111" in the new data conversion information A3.

Likewise, the central processing device of the data relaying device converts the code data within the already compressed data received from the data compressing device 2 into another code data shown in the new data conversion information by employing the data conversion information A2 and the data conversion information A3 as an operation equivalent to the data converting unit 446. In this example, the central processing device converts a code "1010" (see the data conversion information A2 shown in FIG. 27) corresponding to the symbol "0000" of the symbol aggregation A, being code data within the already compressed data received from the data compressing device 2, into the code "00" corresponding to "0000" in the new data conversion information A3. Likewise, it converts "11" (see the data conversion information A2 shown in FIG. 27) corresponding to the symbol "1111" of the symbol aggregation A into the code "1" corresponding to "1111" in the new data conversion information A3. Likewise, it converts "1011 (see the data conversion information A2 shown in FIG. 27) corresponding to the symbol "00001111" of the symbol aggregation A into the code "01" corresponding to "00001111" in the new data conversion information A3.

The central processing device of the data relaying device performs the similar recompressing process for the symbol aggregations B and C as well, respectively.

FIG. 31 is an explanatory view illustrating an example of the recompression relating to the symbol aggregations B and C. The central processing device of the data relaying device, similarly to the case of obtaining the data analysis result A3, derives one data analysis result B3 from the data analysis results A1 and A3 by computing a sum of the frequencies of the symbols belonging to the symbol aggregation B, and further, derives one data analysis result C3 from the data analysis results A1 and A3 by computing a sum of the frequencies of the symbols belonging to the symbol aggregation C (see FIG. 31). In addition, it, similarly to the case of obtaining the data conversion information A3, derives data conversion information B3 and C3 from the data analysis results B3 and C3, respectively (see FIG. 31).

Next, the central processing device of the data relaying device converts the code data within the already compressed data received from the devices that rank lower by one hierarchy into another code data shown in the new data conversion information by employing the data conversion information A1 and A2, and the data conversion information B3 as an operation equivalent to the data converting unit 446, similarly to the operation by the data converting unit 446 for the symbol aggregation A. In this example, the central processing device converts a code "010" corresponding to the symbol "0110" of the symbol aggregation B, being code data within the already compressed data received from the data compressing device 1, into the code "0" corresponding to "0110" in the new data conversion information B3 (see the data conversion information A1 shown in FIG. 27 and the data conversion information B3 shown in FIG. 31). Likewise, it converts a code "100" corresponding to the symbol "0110" of the symbol aggregation B, being code data within the already compressed data received from the data compressing device 2, into the code "0" corresponding to "0110" in the new data conversion information B3 (see the data conversion information A2 shown in FIG. 27 and the data conversion information B3 shown in FIG. 31).

Further, the central processing device of the data relaying device converts the code data within the already compressed data received from the devices that rank lower by one hierarchy into another code data shown in the new data conversion information by employing the data conversion information A1 and A2, and the data conversion information C3 as an operation equivalent to the data converting unit 446, similarly to the operation by the data converting unit 446 for the symbol aggregations A and B. In this example, the central processing device converts the code "00" corresponding to the symbol "1001" of the symbol aggregation C, being code data within the already compressed data received from the data compressing device 1, into thea code "1" corresponding to "1001" in the new data conversion information C3. Further, it converts the code "0" corresponding to the symbol "1001" of the symbol aggregation C, being code data within the already compressed data received from the data compressing device 2, into the code "1" corresponding to "1001" in the new data conversion information C3.

Next, the central processing device of the data relaying device makes a reference to the transfer destination information (hierarchy number 3) shown in FIG. 28(c), and transmits the already compressed data generated in the recompressing process for the symbol aggregation A, being an operation equivalent to the data converting unit 446, to the data relaying device of which the IP address and the port number are 192.168.2.1 and 5060, respectively as an operation of the transfer destination deciding unit 46. Likewise, the central processing device of the data relaying device makes a reference to the transfer destination information (hierarchy number 3) shown in FIG. 28(c), and transmits the already compressed data generated in the recompressing process for the symbol aggregation B, being an operation equivalent to the data converting unit 446, to the data relaying device of which the IP address and the port number are 192.168.2.2 and 5060, respectively as an operation of the transfer destination deciding unit 46. Likewise, the central processing device of the data relaying device transmits the already compressed data generated in the recompressing process for the symbol aggregation C to the data relaying device of which the IP address and the port number are 192.168.2.3 and 5060, respectively.

The size of the code data within the already compressed data is computed with the total sum of the length of the codes constituting the code data. With the foregoing recompressing process, the size of the code data within the already compressed data is changed from 470 to 255 with the symbol aggregation A, from 90 to 40 with the symbol aggregation B, and from 240 to 160 with the symbol aggregation C, respectively, and the communication amount is reduced all the more as compared with the case of communicating the already compressed data without recompressing it.

Further, the above-mentioned recompressing process is a process of, after expanding the already compressed data recorded in the already compressed data recording unit 441, performing the data analysis and the data conversion for the entirety of the after-expansion data, which is performed by the symbol classifying unit 43. At this time, the data analysis result and the data conversion information of the symbol being contained in the before-compression already-compressed data, i.e. the data equivalent to the original data, are generated from the data analysis result and the data conversion information of which the size is smaller that of the after-expansion data. Thus, the processing amount as well required for curtailing the communication amount is curtailed as compared with the case of generating the data analysis result and the data conversion information of the symbol being contained in the before-compression already-compressed-data, i.e. the data equivalent to the original data.

All data relaying devices in this example perform a process similar to the process that the above-mentioned data relaying device 3,1 performs, and finally, the data relaying devices 1,1 and 1,2 make a reference to the transfer destination information (hierarchy number 1) shown in FIG. 28, and transmits the already compressed data, which has been recompressed symbol aggregation by symbol aggregation, to the personal computer, being the data collecting devoice 7. In this example, it is assumed that the data relaying device 1,1 and the data relaying device 1,2 can the TCP/IP communication with the personal computer, being the data collecting devoice 7, by employing the IP address "192.168.0.1 and the port number "5060".

Next, when the personal computer, being the data collecting device 7 in this example, receives the already compressed data transmitted by the data relaying device 1,1 and the data relaying device 1,2 by employing the Ethernet device, being the communicating unit 11, it causes the magnetic storing device that functions as the received data recording unit 12 to store the above already compressed data.

Next, the central processing device within the personal computer, being the data collecting devoice 7, acquires the data analysis result symbol aggregation by symbol aggregation from the already compressed data recorded in the magnetic storing device as an operation equivalent to the data analysis result acquiring unit 13.

An example of the data analysis result is shown in FIG. 32. An example shown in FIG. 32 shows that a data analysis result A4 has been obtained from the already compressed data of the symbol aggregation A (see FIG. 32(a)). Likewise, it shows that a data analysis result B4 has been obtained from the already compressed data of the symbol aggregation B (see FIG. 32(b)). Further, it shows that a data analysis result C4 has been obtained from the already compressed data of the symbol aggregation C (see FIG. 32(c)).

In this example, it is assumed that the symbol description information as shown in FIG. 33 has been recorded within the magnetic storing device within the personal computer, being the data collecting device 7, which operates as the basic symbol description format recording unit 15. An example of the symbol description information shown in FIG. 33 signifies that the symbol "0110" is listed as another symbol "1001".

Further, in this example, the derivative symbol configuration information as shown in FIG. 34 has been recorded within the magnetic storing device within the personal computer, being the data collecting device 7, which operates as the derivative symbol description format recording unit 17. An example of the derivative symbol configuration information shown in FIG. 34 signifies that the symbol "00001111" is configured of two symbols, i.e. "0000" and "1111".

Next, the central processing device of the data collecting device 7 computes the statistical value relating to the symbol converted into the code within the code data of the already compressed data from data analysis results A4, B4, and C4 shown in FIG. 32 as an operation equivalent to the code operating unit 14. In this example, the case of generating a histogram (frequency table) as a statistical value will be explained.

The central processing device of the data collecting device 7 firstly acquires the total number of the symbols within the symbol aggregations A, B, and C contained within the already compressed data from the data analysis results A4, B4, and C4 shown in FIG. 32. For example, the total number of the symbol "0000" is frequency "200" of the symbol "0000" that the data analysis result A indicates, and the central processing device of the data collecting device 7 acquires this value.

Figures 35, 36:
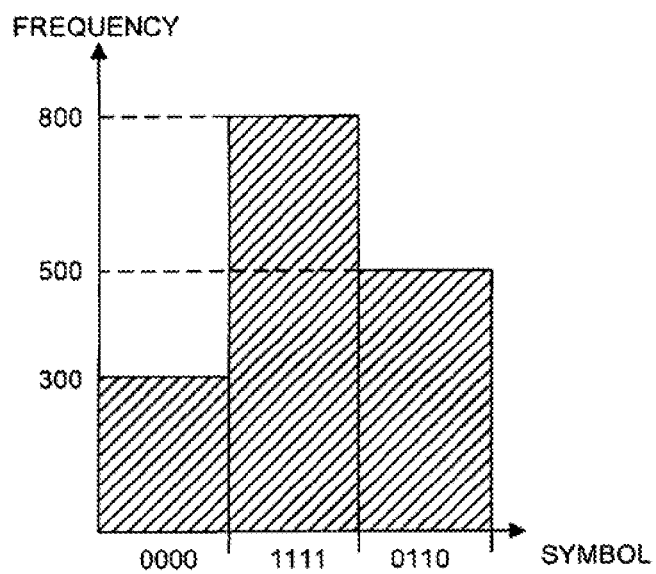
FIG. 35 is an explanatory view illustrating an example of the frequency table.
FIG. 36 is an explanatory view illustrating an example of a histogram.

The central processing device of the data collecting device 7 acquires the total number of the other symbols with the similar process, and generates the frequency table of the symbol being contained within the collected data. A frequency table 1 of the symbol exemplified in FIG. 35(a) signifies an example of the histogram (frequency table) generated in such a manner. Additionally, FIG. 35 shows an example of the frequency table being generated by the data collecting device 7.

Next, the central processing device of the data collecting device 7 regards the total number of the symbol "1001" as the number of times of the appearances of the symbol "0110" and adds it to the total number of the symbol "0110" by employing the symbol description information shown in FIG. 33. A frequency table 2 of the symbol shown in FIG. 35(b) signifies an example of the frequency table obtained by the addition based upon such symbol description information.

Next, the central processing device of the data collecting device 7 makes a reference to the derivative symbol configuration information exemplified in FIG. 34, regards the total number of the symbol "00001111" as the number of times of the appearances of the symbols "0000" and "1111", and adds it to the total number of the symbol "0000" and the total number of the symbol "1111", respectively, as an operation equivalent to the code operation developing unit 16. That is, it regards the number of times of the appearances of the derivative symbol as the number of times of the appearances of each symbol being contained in the description format of the derivative symbol, and adds it to the number of the symbols being contained in the description format of the derivative symbol. A frequency table 3 of the symbol shown in FIG. 35(c) signifies an example of the frequency table obtained by the addition based upon such derivative symbol configuration information. The central processing device of the data collecting device 7 finally generates the histogram exemplified in FIG. 36, and records it in the magnetic storing device that functions as the operation result recording unit 18.

With the operation above, the personal computer, being the data collecting device 7 in this example, obtains a histogram 3 (the frequency table 3 of the symbol) exemplified in FIG. 35(c), being a histogram of the symbol being contained within the data generated from the RFID reader, being a data generating device. This operation is performed by the data analysis result acquiring unit 13, the code operating unit 14, and the code operation developing unit 16 each of which performs an arithmetic operation by employing the data analysis result of which the size is smaller than that of the after-expansion data. Thus, the processing amount of the central processing device can be curtailed as compared with the case of generating the frequency table 3 of the symbol by expanding the collected already-compressed data, and thereafter, summing up the total number of the symbols.

Next, an operation of the symbol aggregation clustering information acquiring unit 47, which is performed by the central processing device within the personal computer, being the data relaying device in this example, and an operation of the personal computer, being the transfer destination information updating device 5, will be explained by making a reference to FIG. 37 and FIG. 38.

The execution history information, which is configured of the communication speed of the already compressed data transferred by the transfer destination deciding unit 46, the time required for the recompressing process by the data recompressing unit 44, the size of the already compressed data generated by the recompressing process, the data analysis result of the already compressed data, and the data conversion information, has been recorded in the magnetic storing device within the personal computer that operates as the data relaying device, which operates as the execution history recording unit 471.

FIG. 37 is an explanatory view illustrating an example of the execution history information. An example shown in FIG. 37 signifies that, when the central processing device of the data relaying device including the magnetic storing device in which the execution history information shown in FIG. 37 was recorded generated the already compressed data of which the size was 8,000 kilobits, the time required for the recompressing process was 50 milliseconds, a data analysis result 131 was generated, and the communication speed at the moment of transmitting it to the upper-place data relaying device was 50 Mbps. Further, it signifies that the data relaying device identification information of the above data relaying device is "3,1", and the hierarchy number is "3".

The central processing device within the personal computer, being the data relaying device in this example, acquires the communication speed "50 (Mbps)" from the execution history information as an operation of the distance parameter computing unit 472. Further, it also acquires the already compressed data size "8,000 (Kbits), and the recompressing process time "50 (ms)" from the execution history information, and calculates "160 (Mbps)", being a value obtained by dividing the above data size "8,000 (Kbits) by the recompressing process time "50 (ms)", as a processing speed. And, it transmits the above-mentioned communication speed "50 (Mbps)" and processing speed "160 (Mbps)", and data relaying device identification information "3,1" and hierarchy number "3" to the personal computer, being the transfer destination information updating device 5 in this example, by employing the Ethernet device within the personal computer (data relaying device) including the above central processing device.

Next, the central processing device within the personal computer, being the data relaying device in this example, acquires the data analysis result 131 (see FIG. 37) recorded in the execution history recording unit 471 as an operation of the compression information acquiring unit 473. Further, when generating the information other than the frequency table as a data analysis result, the central processing device of the data relaying device generates a frequency table 4 of the symbol as shown in FIG. 38 with a method similar to the method of generating the frequency table 1 of the symbol exemplified in FIG. 35(*a*). And, the central processing device of the data relaying device employs the Ethernet device within the personal computer (data relaying device) including the above central processing device, and transmits the above frequency table 4 of the symbol (see FIG. 38) to the personal computer, being the transfer destination information updating device 5 in this example. With an example of the execution history information shown in FIG. 37, the data analysis result 131 can be employed as the frequency table 4 shown in FIG. 38 as it stands because the frequency table is generated as a data analysis result in this example.

Next, the central processing device within the personal computer, being the transfer destination information updating device 5 in this example, receives the communication speed, the processing speed, the data relaying device identification information, and the hierarchy number that are transmitted from the data relaying device, by employing the Ethernet device that functions as the communicating unit 51 as an operation of the distance parameter acquiring unit 52. FIG. 39 is an explanatory view illustrating an example of the communication speed, the processing speed, the hierarchy number, and the data relaying device identification information that the transfer destination information updating device 5 receives. For example, the information exemplified in the first line of FIG. 39 signifies that the communication speed and the processing speed acquired from the data relaying device of which the hierarchy number and the data relaying device identification information are 2, and 2,1, respectively, are 50 and 160, respectively.

Further, the central processing device of the transfer destination information updating device 5 receives a frequency table 4 (see FIG. 38) of the symbol by employing the Ethernet device that functions as the communicating unit 51, and generates the frequency table in which the number obtained by adding the frequency of the symbol within each frequency table is defined as a new total number of the symbols from the other frequency tables received within the past constant time, and the frequency table 4 of the symbol as an operation of the symbol distribution generating unit 53. An example of the frequency table of the symbol obtained by adding the total of the by-symbol number of times of the appearances in such a manner is exemplified in FIG. 40. However, as already explained, when the frequency table is contained in the execution history information as a data analysis result, the central processing device of the transfer destination information updating device 5 receives the above frequency table.

Next, the central processing device of the transfer destination information updating device 5 generates the symbol cluster information by performing the following operation as an operation of the symbol aggregation clustering unit 54. The central processing device sorts a combination of the symbol and the frequency of the above symbol in the descending order of the frequency in the frequency table exemplified in the frequency table (FIG. 40) generated as mentioned above, and generates the already sorted frequency list exemplified in FIG. 19.

In addition, the central processing device that operates as the symbol aggregation clustering unit 54 extracts the data relaying device identification information of the data relaying devices to which the identical hierarchy number has been allotted from the received communication speed, processing speed, hierarchy number, and data relaying device identification information exemplified in FIG. 39, and generates the information in which the data relaying device identification information has been listed hierarchy by hierarchy. In addition, it generates the information in which the listed data relaying device identification information, and the total value of the communication speed and the processing speed corresponding to the data relaying device identification information, and the total number of the transfer-target symbols have been caused to correspond to each other, and sorts a combination of the data relaying device identification information, the total value of the communication speed and the processing speed, and the total number of transfer-target symbols in the descending order of the total value of the communication speed and the processing speed. And, it affixes an after-sorting rank to each of these combinations, thereby to prepare the already sorted data relaying device list. For example, the already sorted data relaying device list exemplified in FIG. 20 is generated based upon the information exemplified in FIG. 39.

In addition, the central processing device subtracts the frequency of the symbol of which the rank is an n-th place from the frequency of the symbol of which the rank is an (n+1)-th place in the already sorted frequency list, and decides the rank of the first-order differential value, being its subtraction result, to be an n-th place. It continues this process in the order of n=1, 2, . . . until the process of the subtraction is completed thereby to generate the first-order differential value list exemplified in FIG. 21.

In addition, the central processing device subtracts the first-order differential value of which the rank is an n-th place from the first-order differential value of which the rank is an (n+1)-th place in the first-order differential list, and decides the rank of the second-order differential value, being its subtraction result, to be an n-th place. It continues this process in the order of n=1, 2, . . . until the process of the subtraction is completed thereby to generate the second-order differential value list exemplified in FIG. 22.

And, when a mark of the second-order differential value in the second-order differential value list has been changed from that of the second-order differential value that ranks higher by one, the central processing device extracts the rank of the second-order differential value of which the mark has been changed. The central processing device performs this extraction operation in the order of the rank in the second-order differential value list and decides new rank for the extracted rank in the order of extraction. With this operation, the inflection point list as exemplified in FIG. 23 is derived.

An operation of the steps A1 to A12 shown in FIG. 18 is performed by employing the already sorted frequency list (see FIG. 19), the already sorted data relaying device (see FIG. 20), and the inflection point list (see FIG. 23) derived above. Performing the above operation hierarch by hierarchy allows the symbol cluster information to be generated.

An example of the symbol cluster information being obtained with the above operation is shown in FIG. 41.

The data relaying device information has been recorded in the magnetic storing device that operates as the data relaying device information recording unit 56 within the personal computer, being the transfer destination information updating device 5 in this example. FIG. 42 is an explanatory view illustrating an example of the data relaying device information stored in the transfer destination information updating device 5. In the data relaying device information shown in FIG. 42, the hierarch number 0 signifies the data collecting device 7. For example, the second line of the table shown in FIG. 42 signifies that the personal computer, being the data relaying device having the hierarch number 1 to which the data relaying device identification information "1,1" has been allotted, can the TCP/IP communication by employing the destination IP address 192.168.1.1 and the port number 5060. In FIG. 42, the destination information is signified with the character string in which the IP address and the port number have been coupled by means of the letter of ":"

The central processing device of the transfer destination information updating device 5 converts the data relaying device identification information being contained in the symbol cluster information shown in FIG. 41 into the destination information caused to correspond to the identical data relaying device identification information in the data relaying device information shown in FIG. 42, and divides it for each hierarchy number, thereby to generate the transfer destination information shown in FIG. 28 as an operation equivalent to the transfer destination information generating unit 55.

Next, the central processing device of the transfer destination information updating device 5 acquires the destination information of the data relaying devices of each hierarch number from the data relaying device information shown in FIG. 42, and transmits the by-hierarchy-number transfer destination information shown in FIG. 28 to all of the data relaying devices of which a hierarchy number identical to the above hierarchy number has been allotted by employing the Ethernet device within the personal computer, being the transfer destination information updating device 5, as an operation equivalent to the transfer destination information generating unit 55. For example, the central processing device of the transfer destination information updating device 5 makes a reference to the destination information of the data relaying devices of which the hierarch number is 3 within the data relaying device information of FIG. 42, and transmits the transfer destination information (hierarch number 3) of FIG. 42 by use of the TCP/IP to the personal computer that operates as the data relaying devices of which the destination IP address and the destination port number are "192.168.3.1" and "5060", "192.168.3.2" and "5060", "192.168.3.3" and "5060", "192.168.3.4" and "5060", and "192.168.3.5" and "5060", respectively, by employing the Ethernet device.

In the above-mentioned example, the case of recording the data relaying device identification information in the execution history recording unit 471 of each data relaying device, and the data relaying device information recording unit 56 within the transfer destination information updating device 5 was explained; however the data relaying device identification information can be managed by employing a name solving method such as DNS (Domain Name Service).

The present invention described above is preferredly applicable to the data collection system for collecting the data via the communication network.

This application is based upon and claims the benefit of priority from Japanese patent application No. 2007-047118, filed on Feb. 27, 2007, the disclosure of which is incorporated herein in its entirety by reference.

The invention claimed is:

1. A data collection system comprising a plurality of data compressing devices for compressing data, a plurality of data relaying devices for relaying the data, and a data collecting device for collecting the data, said plurality of said data relaying devices being arranged hierarchy by hierarchy responding to the number of hops or a round trip time up to the data collecting device so that the smaller the number of the hops or the round trip time of the data relaying device up to the data collecting device is, the higher the hierarchy of the data relaying device becomes, said data collecting device receiving already compressed data containing a data analysis result, being an analysis result of a statistical special feature of the data that is a target of compression, a code that is decided for a symbol, being a before-compression bit string, responding to the analysis result, and data conversion information indicative of a correspondence between the symbol and the code from each relaying device of a highest-place hierarchy, wherein the data collecting device comprises:

a basic symbol description format recording means for storing symbol description information in which a basic symbol, being a symbol divided into a minimum unit, and a description format in which the basic symbol has been expressed with other formats have been caused to correspond to each other;

a derivative symbol format recording means for storing information in which a derivative symbol, being a symbol in which the basic symbols have been combined, and an aggregation of the basic symbols constituting the derivative symbol have been caused to correspond to each other;

a code operating means for deriving a frequency of the symbol for each symbol corresponding to the code being contained in the already compressed data based upon the data analysis result being contained in the received already compressed data; and a code operation developing means for adding the frequency of the description format, out of the frequencies obtained by the code operating means, to the frequency of the basic symbol corresponding to the above description format, and adding the frequency of the derivative symbol to the frequency of each basic symbol constituting the derivative symbol.

2. A data collection method that is applied for a data collection system comprising a plurality of data compressing devices for compressing data, a data collecting device for collecting the data, and data relaying devices being arranged hierarchy by hierarchy responding to the number of hops or a round trip time up to the data collecting device so that the smaller the number of the hops or the round trip time of the data relaying device up to the data collecting device is, the higher the hierarchy of the data relaying device becomes, said data collecting device receiving already compressed data containing a data analysis result, being an analysis result of a statistical special feature of the data that is a target of compression, a code that is decided for a symbol, being a before-compression bit string, responding to the analysis result, and data conversion information indicative of a correspondence between the symbol and the code from each relaying device of a highest-place hierarchy:

wherein the data collecting device stores symbol description information in which a basic symbol, being a symbol divided into a minimum unit, and a description format in which the basic symbol has been expressed with other formats have been caused to correspond to each other;

wherein the data collecting device stores information in which a derivative symbol, being a symbol in which the basic symbols have been combined, and an aggregation of the basic symbols constituting the derivative symbol have been caused to correspond to each other;

wherein the data collecting device derives a frequency of the symbol for each symbol corresponding to the code being contained in the already compressed data, based upon the data analysis result being contained in the received already compressed data; and wherein the data collecting device adds the frequency of the description format, out of the frequencies, to the frequency of the basic symbol corresponding to the above description format, and adds the frequency of the derivative symbol to the frequency of each basic symbol constituting the derivative symbol.

3. A data collecting device for collecting already compressed data containing a data analysis result, being an analysis result of a statistical special feature of data that is a target of compression, a code that is decided for a symbol, being a before-compression bit string, responding to the analysis result, and data conversion information indicative of a correspondence between the symbol and the code, said data collecting device comprising:

a basic symbol description format recording means for storing symbol description information in which a basic symbol, being a symbol divided into a minimum unit, and a description format in which the basic symbol has been expressed with other formats have been caused to correspond to each other;

a derivative symbol format recording means for storing information in which a derivative symbol, being a symbol in which the basic symbols have been combined, and an aggregation of the basic symbols constituting the derivative symbol have been caused to correspond to each other;

a code operating means for deriving a frequency of the symbol for each symbol corresponding to the code being contained in the already compressed data based upon the data analysis result being contained in the received already compressed data; and a code operation developing means for adding the frequency of the description format, out of the frequencies obtained by the code operating means, to the frequency of the basic symbol corresponding to the above description format, and adding the frequency of the derivative symbol to the frequency of each basic symbol constituting the derivative symbol.

4. A non-transitory computer-readable data storage medium storing a data collection program causing a computer to implement functions comprising: a basic symbol description format recording means for collecting already compressed data containing a data analysis result, being an analysis result of a statistical special feature of data that is a target of compression, a code that is decided for a symbol, being a before-compression bit string, responding to the analysis result, and data conversion information indicative of a correspondence between the symbol and the code, and storing symbol description information in which a basic symbol, being a symbol divided into a minimum unit, and a description format in which the basic symbol has been expressed with other formats have been caused to correspond to each other; and a derivative symbol format recording means for storing information in which a derivative symbol, being a symbol in which the basic symbols have been combined, and an aggregation of the basic symbols constituting the derivative symbol have been caused to correspond to each other to execute:

a code operating process of deriving a frequency of the symbol for each symbol corresponding to the code being contained in the already compressed data, based upon the data analysis result being contained in the received already compressed data; and a code operation developing process of adding the frequency of the description format, out of the frequencies obtained in the code operating process, to the frequency of the basic symbol corresponding to the above description format, and adding the frequency of the derivative symbol to the frequency of each basic symbol constituting the derivative symbol.

* * * * *